(12) United States Patent
Tsukuba

(10) Patent No.: US 12,549,768 B2
(45) Date of Patent: *Feb. 10, 2026

(54) IMAGE PROCESSING DEVICE AND METHOD

(71) Applicant: Sony Group Corporation, Tokyo (JP)

(72) Inventor: Takeshi Tsukuba, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 129 days.

This patent is subject to a terminal disclaimer.

(21) Appl. No.: 18/540,952

(22) Filed: Dec. 15, 2023

(65) Prior Publication Data

US 2024/0121438 A1    Apr. 11, 2024

Related U.S. Application Data

(62) Division of application No. 17/436,077, filed as application No. PCT/JP2020/009027 on Mar. 4, 2020, now Pat. No. 11,882,311.

(Continued)

(51) Int. Cl.
*H04N 11/02* (2006.01)
*H04N 19/124* (2014.01)
(Continued)

(52) U.S. Cl.
CPC ........... *H04N 19/61* (2014.11); *H04N 19/124* (2014.11); *H04N 19/18* (2014.11); *H04N 19/46* (2014.11)

(58) Field of Classification Search
CPC ...... H04N 19/61; H04N 19/124; H04N 19/18; H04N 19/46
(Continued)

(56) References Cited

U.S. PATENT DOCUMENTS 11,882,311 B2 *   1/2024   Tsukuba .............. H04N 19/124
2008/0055435 A1   3/2008   Kawamura et al.
(Continued)

FOREIGN PATENT DOCUMENTS

WO       2020/066641 A1    4/2020

OTHER PUBLICATIONS

International Search Report and Written Opinion mailed on May 26, 2020, received for PCT Application PCT/JP2020/009027, Filed on Mar. 4, 2020, 12 pages.

(Continued)

*Primary Examiner* — Jayanti K Patel
*Assistant Examiner* — Richard B Carter
(74) *Attorney, Agent, or Firm* — XSENSUS LLP

(57) ABSTRACT

The present disclosure relates to an image processing device and method capable of reducing an increase in processing delay.

A data path of a one-dimensional input signal array of residual data is switched in a forward direction or a reverse direction, and matrix operation of one-dimensional orthogonal transform is performed on the one-dimensional input signal array input via the switched data path. The present disclosure can be applied to, for example, an image processing device, an image coding device, an image decoding device, a transmission device, a reception device, a transmission/reception device, an information processing device, an imaging device, a regeneration device, an electronic apparatus, an image processing method, an information processing method, or the like.

13 Claims, 39 Drawing Sheets

Related U.S. Application Data

(60) Provisional application No. 62/817,880, filed on Mar. 13, 2019, provisional application No. 62/816,750, filed on Mar. 11, 2019, provisional application No. 62/816,670, filed on Mar. 11, 2019.

(51) Int. Cl.
  *H04N 19/18* (2014.01)
  *H04N 19/46* (2014.01)
  *H04N 19/61* (2014.01)

(58) Field of Classification Search
  USPC .................................. 375/240.18, 240.12
  See application file for complete search history.

(56) References Cited

U.S. PATENT DOCUMENTS

| | | | | |
|---|---|---|---|---|
| 2013/0128972 | A1* | 5/2013 | Yamaguchi | H04N 19/61 375/240.12 |
| 2019/0342580 | A1* | 11/2019 | Zhao | H04N 19/70 |
| 2020/0186835 | A1* | 6/2020 | Said | H04N 19/157 |
| 2020/0280737 | A1 | 9/2020 | Ikai et al. | |
| 2021/0321134 | A1* | 10/2021 | Koo | H04N 19/91 |

OTHER PUBLICATIONS

Lim et al., "CE6: DST-VII with Residual Flipping (Test 1.4)", Joint Video Experts Team (JVET) of ITU-T SG 16 WP 3 and ISO/IEC JTC 1/SC 29/WG 11, JVET-K0167_r1, Jul. 10-18, 2018, pp. 1-8.
Tsukuba et al., "CE6: Transform Matrix Replacement (CE 6.1.8.1)", Joint Video Experts Team (JVET) of ITU-T SG 16 WP 3 and ISO/IEC JTC 1/SC 29/WG 11, JVET-K00123-v2, Jul. 10-18, 2018, pp. 1-11.
Zhao et al., "CE6: Sub-Block Transform for Inter Blocks (CE6.4.1)", Joint Video Experts Team (JVET) of ITU-T SG 16 WP 3 and ISO/IEC JTC 1/SC 29/WG 11, JVET-M0140-v3, Jan. 9-18, 2019, pp. 1-18.
Naser et al., "CE6-Related: Reduction of the Number of Core Transforms in AMT", Joint Video Experts Team (JVET) of ITU-T SG 16 WP 3 and ISO/IEC JTC 1/SC 29/WG 11, JVET-K0265, Jul. 10-18, 2018, pp. 1-5.
Lin et al., "CE6-Related: MTS using DST-4 and Transposed DCT-2", Joint Video Experts Team (JVET) of ITU-T SG 16 WP 3 and ISO/IEC JTC 1/SC 29/WG 11, JVET-L0353-v2, Oct. 3-12, 2018, pp. 1-12.
Zhao et al., "CE6: Fast DST-7/DCT-8 with Dual Implementation Support (Test 6.2.3)", Joint Video Experts Team (JVET) of ITU-T SG 16 WP 3 and ISO/IEC JTC 1/SC 29/WG 11, JVET-M0497, Jan. 9-18, 2019, pp. 1-11.
Tsukuba et al., "Non-CE6: MTS Simplification", Joint Video Experts Team (JVET) of ITU-T SG 16 WP 3 and ISO/ IEC JTC 1/SC 29/WG 11, JVET-N0121-v3, Mar. 19-27, 2019, pp. 1-14.
Zhao et al., "CE6 Related: Unification of Transform Skip mode and MTS", Joint Video Experts Team (JVET) of ITU-T SG 16 WP 3 and ISO/IEC JTC 1/SC 29/WG 11, JVET-M0501-v2, Jan. 9-18, 2019, pp. 1-6.
Yoo et al., "Non-CE7 : Residual Rearrangement for Transform Skipped Blocks", Joint Video Experts Team (JVET) of ITU-T SG 16 WP 3 and ISO/IEC JTC 1/SC 29/WG 11, JVET-M0278_v2, Jan. 9-18, 2019, pp. 1-4.
Chen et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11, JVET-M1002-v2, Jan. 9-18, 2019, pp. 1-62.
Bross WT al., "Versatile Video Coding (Draft 4)", Joint Video Experts Team (JVET) of ITU-T SG 16 WP 3 and ISO/IEC JTC 1/SC 29/WG 11, JVET-M1001-v5, Jan. 9-18, 2019, pp. 1-274.
Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, JVET-G1001-v1, Jul. 13-21, 2017, pp. 1-44.
ITU-T, "Advanced Video Coding for Generic Audiovisual Services", Series H: Audiovisual and Multimedia Systems, Infrastructure of audiovisual services—Coding of moving video, International Telecommunication Union, H.264, Apr. 2017, pp. 1-787.
ITU-T, "High Efficiency Video Coding", Series H: Audiovisual and Multimedia Systems, Infrastructure of audiovisual services—Coding of moving video, International Telecommunication Union, H.265, Dec. 2016, pp. 1-643.

* cited by examiner

The variable trTypeHor specifying the horizontal transform kernel and the variable trTypeVer specifying the vertical transform kernel are derived as follows:

- If cIdx is greater than 0, trTypeHor and trTypeVer are set equal to 0.
- Otherwise, if implicitMtsEnabled is equal to 1, the following applies:
  - If IntraSubPartitionsSplitType is not equal to ISP_NO_SPLIT, trTypeHor and trTypeVer are specified in Table 8-15 depending on intraPredMode.
  - Otherwise, if cu_sbt_flag is equal to 1, trTypeHor and trTypeVer are specified in Table 8-14 depending on cu_sbt_horizontal_flag and cu_sbt_pos_flag.
  - Otherwise (sps_explicit_mts_intra_enabled_flag and sps_explicit_mts_inter_enabled_flag are equal to 0), trTypeHor and trTypeVer are derived as follows:

trTypeHor = ( nTbW >= 4 && nTbW <= 16 && nTbH <= nTbW ) ? 1 : 0    (8-1028)

trTypeVer = ( nTbH >= 4 && nTbH <= 16 && nTbH <= nTbW ) ? 1 : 0    (8-1029)

- Otherwise, trTypeHor and trTypeVer are specified in Table 8-13 depending on tu_mts_idx[ xTbY ][ yTbY ].

322

The variable implicitMtsEnabled is derived as follows:

- If sps_mts_enabled_flag is equal to 1 and one of the following conditions is true, implicitMtsEnabled is set equal to 1:
  - IntraSubPartitionsSplitType is not equal to ISP_NO_SPLIT
  - cu_sbt_flag is equal to 1 and Max( nTbW, nTbH ) is less than or equal to 32
  - sps_explicit_mts_intra_enabled_flag and sps_explicit_mts_inter_enabled_flag are both equal to 0 and CuPredMode[ xTbY ][ yTbY ] is equal to MODE_INTRA
- Otherwise, implicitMtsEnabled is set equal to 0.

DERIVATION OF MODIFIED TRANSFORM TYPE trTypeX' (X=Hor, Ver), FLIP FLAG flipX(X=Hor, Ver) (IN CASE WHERE DCT-8 IS REPLACED WITH IDT)

The variable trTypeHor' specifying the modified horizontal transform kernel and the variable trTypeVer' specifying the modified vertical transform kernel are derived as follows:

- If transformSkipFlag is true, then
  trTypeHor' = IDT
  trTypeVer' = IDT
  flipHor = (cuPredMode==MODE_INTRA) ? true : false
  flipVer = (cuPredMode==MODE_INTRA) ? True: false
- Otherwise, if IDTEnabledFlag is true, the
  - if max(log2(nTbW), log2(nTbH)) <= MaxIDTSize, then
    trTypeHor' = ((cuPredMode==MODE_INTRA) && (trTypeHor== 2(DCT8))) ? IDT : trTypeHor
    trTypeVer' = ((cuPredMode==MODE_INTRA) && (trTypeHor== 2(DCT8))) ? IDT : trTypeVer
    flipHor = ((cuPredMode==MODE_INTRA) && trTypeHor' ==IDT) ? true: false
    flipVer = ((cuPredMode==MODE_INTER) && trTypeVer' ==IDT) ? true: false
  - otherwise
    trTypeHor' = trTypeHor
    trTypeVer' = trTypeVer
    flipHor = false
    flipVer = false HERE, IDTEnabledFlag IS TOOL ON FLAG INDICATING REPLACEMENT OF DCT-8 (OR Flip-DST-7) WITH IDT IN CASE OF SPECIFIC BLOCK SIZE OR SMALLER, AND IS SIGNALED WITH HEADER INFORMATION.
IDTEnabledFlag==true: ENABLES ONE-DIMENSIONAL TRANSFORM SKIP AND REPLACES DCT-8 (Flip-DST7) WITH IDT UNDER PREDETERMINED CONDITION.
IDTEnabledFlag==false: DISABLES ONE-DIMENSIONAL TRANSFORM SKIP. DOES NOT REPLACE DCT8 (Flip-DST7) WITH IDT.

DERIVATION OF MODIFIED TRANSFORM TYPE trTypeX' (X=Hor, Ver), FLIP FLAG flipX(X=Hor, Ver) (IN CASE WHERE FlipDST-7 IS REPLACED WITH IDT)

The variable trTypeHor' specifying the modified horizontal transform kernel and the variable trTypeVer' specifying the modified vertical transform kernel are derived as follows:

- If transformSkipFlag is true, then
  trTypeHor' = IDT
  trTypeVer' = IDT
  flipHor = (cuPredMode==MODE_INTRA) ? true : false
  flipVer = (cuPredMode==MODE_INTRA) ? True : false
- Otherwise, if IDTEnabledFlag is true, the
  - if max(log2(nTbW), log2(nTbH)) <= MaxIDTSize, then
    trTypeHor' = ((cuPredMode==MODE_INTRA) && (trTypeHor== 2(FlipDST-7))) ? IDT : trTypeHor
    trTypeVer' = ((cuPredMode==MODE_INTRA) && (trTypeHor== 2(FlipDST-7))) ? IDT : trTypeVer
    flipHor = ((cuPredMode==MODE_INTRA) && trTypeHor==2) ? true: false
    flipVer = ((cuPredMode==MODE_INTER) && trTypeVer==2) ? true: false
  - otherwise
    trTypeHor' = trTypeHor==2 ? 1 (DST7) : trTypeHor
    trTypeVer' = trTypeVer==2 ? 1 (DST7) : trTypeVer
    flipHor = (trTypeHor==2) ? true : false
    flipVer = (trTyepVer==2) ? true : false HERE, IDTEnabledFlag IS TOOL ON FLAG INDICATING REPLACEMENT OF DCT-8 (OR Flip-DST-7) WITH IDT IN CASE OF SPECIFIC BLOCK SIZE OR SMALLER, AND IS SIGNALED WITH HEADER INFORMATION.
IDTEnabledFlag==true: ENABLES ONE-DIMENSIONAL TRANSFORM SKIP AND REPLACES DCT-8 (Flip-DST7) WITH IDT UNDER PREDETERMINED CONDITION.
IDTEnabledFlag==false:DISABLES ONE-DIMENSIONAL TRANSFORM SKIP. DOES NOT REPLACE DCT-8 (Flip-DST7) WITH IDT.

If transform_skip_flag is false, a variable bFlipX(X=Hor, Ver) specifying the direction of output transformed samples are derived as follows:
    bFlipHor=bFlipVer=0
Otherwise (transform_skip_flag is true), a variable bFlipX(X=Hor, Ver) specifying the direction of output transformed samples are derived as follows:
 -- If CuPredMode[xTbY][yTbY] is not equal to MODE_INTRA, then following applies:
      bFlipHor=bFlipVer=0
 - Otherwise, if CuPredMode[xTbY][yTbY] is equal to MODE_INTRA then following applies:
      //For CE8-4.1b: rotation
      bFlipHor=bFlipVer=1

//For CE8-4.1c: combination of rotation and flip
 - If residual rearrangement is "vertically flip":
      bFlipHor=0
      bFlipVer=1
 - Otherwise, if residual rearrangement is "horizontally flip":
      bFlipHor=1
      bFlipVer=0
 - Otherwise, if residual rearrangement is "rotation":
      bFlipHor=1
      bFlipVer=1

//For CE8-4.1a: flip
 - If residual rearrangement is "vertically flip":
      bFlipHor=0
      bFlipVer=1
 - Otherwise, if residual rearrangement is "horizontally flip":
      bFlipHor=1
      bFlipVer=0

The variable implicitMtsEnabled is derived as follows:
- If sps_mts_enabled_flag is equal to 1 and one of the following conditions is true, implicitMtsEnabled is set equal to 1:
  - IntraSubPartitionsSplitType is not equal to ISP_NO_SPLIT
  - cu_sbt_flag is equal to 1 and Max( nTbW, nTbH ) is less than or equal to 32
  - sps_explicit_mts_intra_enabled_flag and sps_explicit_mts_inter_enabled_flag are both equal to 0 and CuPredMode[ xTbY ][ yTbY ] is equal to MODE_INTRA
- Otherwise, implicitMtsEnabled is set equal to 0.

The variable trTypeHor specifying the horizontal transform kernel and the variable trTypeVer specifying the vertical transform kernel are derived as follows:
- If cIdx is greater than 0, trTypeHor and trTypeVer are set equal to 0.
- Otherwise, if transform_skip_flag is equal to 0, trTypeHor and trTypeVer are set equal to "IDT".
- Otherwise, if implicitMtsEnabled is equal to 1, the following applies:
  - If IntraSubPartitionsSplitType is not equal to ISP_NO_SPLIT, trTypeHor and trTypeVer are specified in Table 8 15 depending on intraPredMode.
  - Otherwise, if cu_sbt_flag is equal to 1, trTypeHor and trTypeVer are specified in Table 8 14 depending on cu_sbt_horizontal_flag and cu_sbt_pos_flag.
  - Otherwise (sps_explicit_mts_intra_enabled_flag and sps_explicit_mts_inter_enabled_flag are equal to 0), trTypeHor and trTypeVer are derived as follows:
    trTypeHor = ( nTbW >= 4 && nTbW <= 16 && nTbW <= nTbH ) ? 1 : 0    (8-1029)
    trTypeVer = ( nTbH >= 4 && nTbH <= 16 && nTbH <= nTbW ) ? 1 : 0    (8-1030)
- Otherwise, trTypeHor and trTypeVer are specified in Table 8 13 depending on tu_mts_idx[ xTbY ][ yTbY ].

The variables nonZeroW and nonZeroH are derived as follows:
nonZeroW = Min( nTbW, ( trTypeHor > 0 ) ? 16 : 32 )(8-1031)
nonZeroH = Min( nTbH, ( trTypeVer > 0 ) ? 16 : 32 )(8-1032)

IMAGE PROCESSING DEVICE AND METHOD

CROSS-REFERENCE TO RELATED APPLICATIONS

The present application is a divisional of U.S. application Ser. No. 17/436,077 filed on Sep. 3, 2021, which is based on PCT filing PCT/JP2020/009027, filed Mar. 4, 2020, which claims priority to U.S. Provisional Patent Application No. 62/816,670, filed Mar. 11, 2019, and claims priority to U.S. Provisional Patent Application No. 62/816,750, filed Mar. 11, 2019, and claims priority to U.S. Provisional Patent Application No. 62/817,880, filed Mar. 13, 2019, the entire contents of each are incorporated herein by reference.

TECHNICAL FIELD

The present disclosure relates to an image processing device and method, and more particularly, to an image processing device and method capable of reducing an increase in processing delay.

BACKGROUND ART

Conventionally, adaptive orthogonal transform (multiple transform selection (MTS)) has been proposed for image coding. For MTS, Discrete Cosine Transform (DCT)-2/Discrete Sine Transform (DST)-7/DCT-8 can be selected as orthogonal transform. A fast algorithm supporting Dual Implementation of which result matches a result from matrix operation has been proposed for DST-7/DCT-8 (refer to, for example, Non-Patent Document 1).

Furthermore, a method for applying DST-7 by flipping/rotating two-dimensional residual signals has been proposed (refer to, for example, Non-Patent Document 2).

CITATION LIST

Non-Patent Documents

Non-Patent Document 1: Xin Zhao, Xiang Li, Yi Luo, Shan Liu, "CE6: Fast DST-7/DCT-8 with dual implementation support (Test 6.2.3)", JVET-M0497, Joint Video Experts Team (JVET) of ITU-T SG 16 WP 3 and ISO/IEC JTC 1/SC 29/WG 11 13th Meeting: Marrakech, MA, 9-18 Jan. 2019

Non-Patent Document 2: Sung-Chang Lim, Jungwon Kang, Hahyun Lee, Jinho Lee, Seunghyun Cho, Hui Yong Kim, Nam-Uk Kim, Yung-Lyul Lee, Dae-Yeon Kim, Wook Je Jeong, "CE6: DST-VII with residual flipping (Test 1.4)", JVET-K0167r1, Joint Video Experts Team (JVET) of ITU-T SG 16 WP 3 and ISO/IEC JTC 1/SC 29/WG 11, 11th Meeting: Ljubljana, SI, 10-18 Jul. 2018

SUMMARY OF THE INVENTION

Problems to be Solved by the Invention

However, in a case of hardware implementation, in the method described in Non-Patent Document 1, a sum of input signals having common coefficients is obtained in a first cycle, and matrix operation is executed in a second cycle. That is, at least two cycles are required, and there has been a possibility that a processing delay increases. Furthermore, in the method described in Non-Patent Document 2, two-dimensional residual signals are rearranged before orthogonal transform or after inverse orthogonal transform. Because the number of cycles is increased by the rearrangement processing, there has been a possibility that a processing delay increases.

The present disclosure has been made to solve the problems mentioned above, and an object of the present disclosure is to reduce an increase in processing delay in orthogonal transform processing or inverse orthogonal transform processing.

Solutions to Problems

An image processing device according to one aspect of the present technology is an image processing device including a selection unit that switches a data path of a one-dimensional input signal array of residual data in a forward direction or a reverse direction, and a matrix operation unit that performs matrix operation of one-dimensional orthogonal transform on the one-dimensional input signal array input via the data path switched by the selection unit.

An image processing method according to one aspect of the present technology is an image processing method including switching a data path of a one-dimensional input signal array of residual data in a forward direction or a reverse direction, and performing matrix operation of one-dimensional orthogonal transform on the one-dimensional input signal array input via the switched data path.

An image processing device according to another aspect of the present technology is an image processing device including a matrix operation unit that performs matrix operation of inverse one-dimensional orthogonal transform on a one-dimensional input signal array of a transform coefficient, and a selection unit that switches, in a forward direction or in a reverse direction, a data path of the one-dimensional input signal array on which the matrix operation of inverse one-dimensional orthogonal transform is performed by the matrix operation unit.

An image processing method according to another aspect of the present technology is an image processing method including performing matrix operation of inverse one-dimensional orthogonal transform on a one-dimensional input signal array of a transform coefficient, and switching, in a forward direction or in a reverse direction, a data path of the one-dimensional input signal array on which the matrix operation of inverse one-dimensional orthogonal transform is performed.

In the image processing device and method according to one aspect of the present technology, the data path of the one-dimensional input signal array of the residual data is switched in the forward direction or the reverse direction, and the matrix operation of the one-dimensional orthogonal transform is performed on the one-dimensional input signal array input via the switched data path.

In the image processing device and method according to another aspect of the present technology, matrix operation of inverse one-dimensional orthogonal transform is performed on a one-dimensional input signal array of a transform coefficient, and, in a forward direction or in a reverse direction, a data path of the one-dimensional input signal array on which the matrix operation of inverse one-dimensional orthogonal transform is performed is switched.

BRIEF DESCRIPTION OF DRAWINGS

FIG. 22 is a diagram describing an example of a method for deriving a transform type.

FIG. 23 is a diagram describing an example of a method for deriving a modified transform type.

FIG. 24 is a diagram describing an example of a method for deriving a modified transform type.

FIG. 25 is a diagram describing an example of a method for deriving a flip flag.

FIG. 26 is a diagram describing an example of a method for deriving a transform type.

MODE FOR CARRYING OUT THE INVENTION

Figure 1:
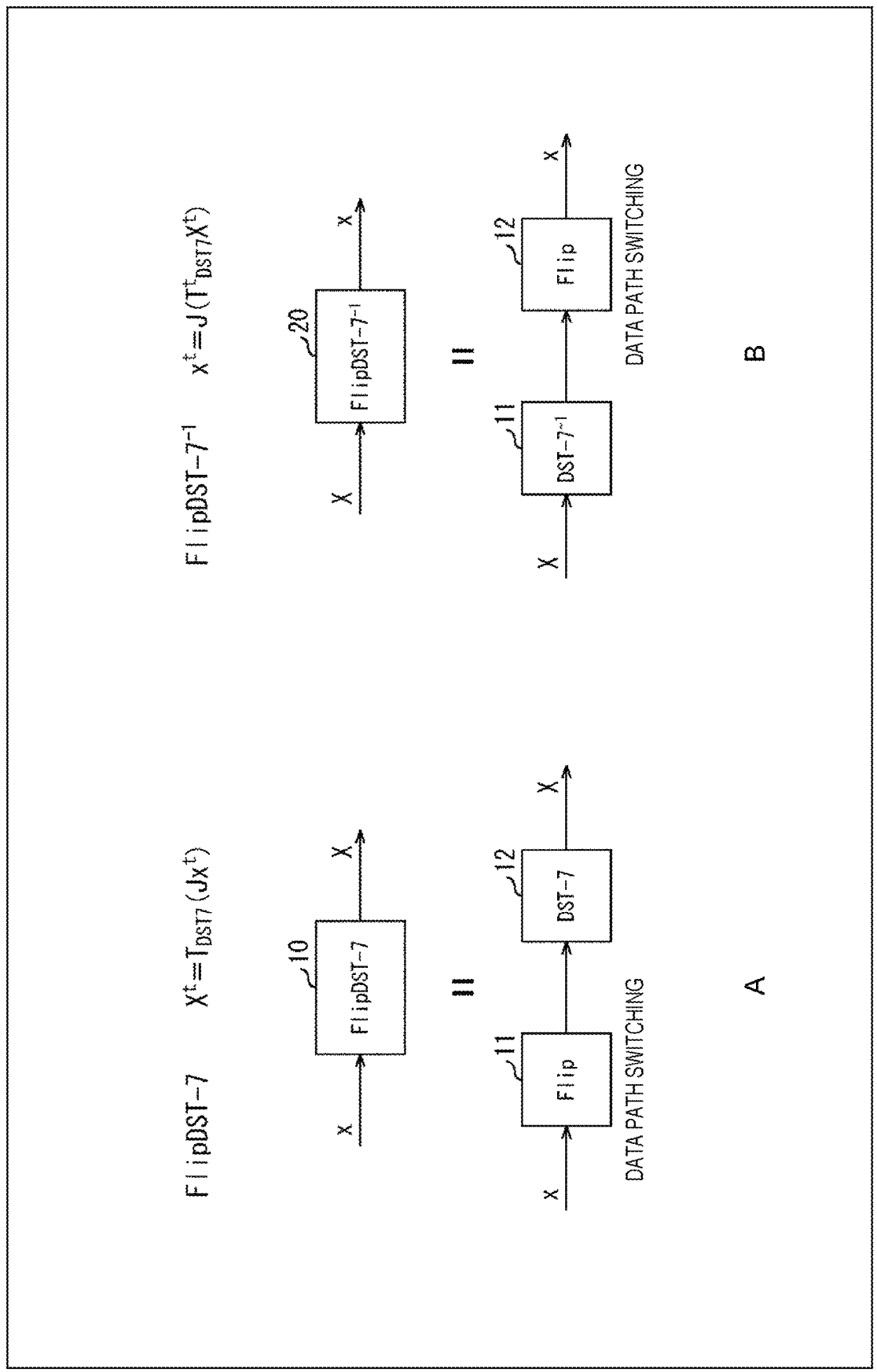
FIG. 1 is a diagram describing an example of a method for achieving one-dimensional orthogonal transform and inverse one-dimensional orthogonal transform.

Modes for carrying out the present disclosure (hereinafter, referred to as embodiments) will be described below. Note that the description will be made in the following order.
1. Hardware implementation of orthogonal transform/inverse orthogonal transform
2. First embodiment (application to one-dimensional orthogonal transform device/inverse one-dimensional orthogonal transform device)
3. Second embodiment (application to one-dimensional orthogonal transform device/inverse one-dimensional orthogonal transform device)
4. Third embodiment (application to parameter derivation device)
5. Fourth embodiment (application to image coding device)
6. Fifth embodiment (application to image decoding device)
7. Supplementary note 1. Hardware Implementation of Orthogonal Transform/Inverse Orthogonal Transform <Documents or the Like Supporting Technical Content/Technical Terms>

The scope disclosed in the present technology includes not only the content described in the embodiments but also the content described in the following non-patent documents and the like that are known at the time of filing, content of other documents referred to in the following non-patent documents, and the like.

Non-Patent Document 1: (described above)
Non-Patent Document 2: (described above)
Non-Patent Document 3: Recommendation ITU-T H.264 (04/2017) "Advanced video coding for generic audiovisual services", April 2017
Non-Patent Document 4: Recommendation ITU-T H.265 (12/2016) "High efficiency video coding", December 2016
Non-Patent Document 5: J. Chen, E. Alshina, G. J. Sullivan, J.-R. Ohm, J. Boyce, "Algorithm Description of Joint Exploration Test Model (JEM7)", JVET-G1001, Joint Video Exploration Team (JVET) of ITU-T SG 16 WP 3 and ISO/IEC JTC 1/SC 29/WG 11 7th Meeting: Torino, IT, 13-21 Jul. 2017
Non-Patent Document 6: Benjamin Bross, Jianle Chen, Shan Liu, "Versatile Video Coding (Draft 4)", JVET-M1001-v5, Joint Video Experts Team (JVET) of ITU-T SG 16 WP 3 and ISO/IEC JTC 1/SC 29/WG 11 13th Meeting: Marrakech, MA, 9-18 Jan. 2019

Non-Patent Document 7: Jianle Chen, Yan Ye, Seung Hwan Kim, "Algorithm description for Versatile Video Coding and Test Model 4 (VTM 4)", JVET-M1002-v2, Joint Video Experts Team (JVET) of ITU-T SG 16 WP 3 and ISO/IEC JTC 1/SC 29/WG 11 13th Meeting: Marrakech, MA, 9-18 Jan. 2019

Non-Patent Document 8: Takeshi Tsukuba, Masaru Ikeda, Teruhiko Suzuki, "CE6: Transform Matrix Replacement (CE 6.1.8.1)", JVET-K0123-v2, Joint Video Experts Team (JVET) of ITU-T SG 16 WP 3 and ISO/IEC JTC 1/SC 29/WG 11 11th Meeting: Ljubljana, SI, 10-18 Jul. 2018

Non-Patent Document 9: Sunmi Yoo, Jungah Choi, Jin Heo, Jangwon Choi, Ling Li, Jaehyun Lim, Seung Hwan Kim, "Non-CE7: Residual rearrangement for transform skipped blocks", JVET-M0278_v2, Joint Video Experts Team (JVET) of ITU-T SG 16 WP 3 and ISO/IEC JTC 1/SC 29/WG 11 13th Meeting: Marrakech, MA, 9-18 Jan. 2019

Non-Patent Document 10: Xin Zhao, Xiang Li, Shan Liu, "CE6 related: Unification of Transform Skip mode and MTS", JVET-M0501-v2, Joint Video Experts Team (JVET) of ITU-T SG 16 WP 3 and ISO/IEC JTC 1/SC 29/WG 11 13th Meeting: Marrakech, MA, 9-18 Jan. 2019

That is, the content described in the above-described non-patent documents also serves as a basis for determining a support requirement. For example, even in a case where a quad-tree block structure or quad tree plus binary tree (QTBT) block structure described in an above-described non-patent document is not directly described in Example, the quad-tree block structure and the quad tree plus binary tree (QTBT) block structure fall within the scope of disclosure of the present technology and satisfy support requirements of the claims. Furthermore, similarly, even in a case where a technical term such as parsing, syntax, or semantics for example, is not directly described in Example, the technical term falls within the scope of disclosure of the present technology and satisfies support requirements of the claims.

Furthermore, in the present specification, a "block" used for description as a partial region or units of processing of an image (picture) (not a block indicating a processing unit) indicates an arbitrary partial region in the picture unless otherwise specified, and a size, a shape, a characteristic, and the like thereof are not limited. For example, examples of the "block" include an arbitrary partial region (units of processing) such as a transform block (TB), a transform unit (TU), a prediction block (PB), a prediction unit (PU), a smallest coding unit (SCU), a coding unit (CU), a largest coding unit (LCU), a coding tree block (CTB), a coding tree unit (CTU), a transform block, a sub-block, a macroblock, a tile, or a slice described in an above-described Non-Patent Document.

Furthermore, when a size of such a block is specified, the block size may be specified not only directly but also indirectly. For example, a block size may be specified by using identification information for identifying a size. Furthermore, for example, a block size may be specified by a ratio to or a difference from a size of a reference block (for example, an LCU, an SCU, or the like). For example, in a case where information for specifying a block size is transmitted as a syntax element or the like, information for indirectly specifying a size as described above may be used as the information. With this arrangement, there may be a case where an amount of the information can be reduced or where coding efficiency can be improved. Furthermore, the specification of a block size also includes specification of an area of the block size (for example, specification of an area of an allowable block size, or the like).

Furthermore, in the present specification, coding includes not only entire processing of transforming an image into a bit stream, but also part of the processing. The coding includes, for example, not only processing including prediction processing, orthogonal transform, quantization, arithmetic coding, and the like, but also processing collectively referring to quantization and arithmetic coding, processing including prediction processing, quantization, and arithmetic coding, and the like. Similarly, decoding includes not only entire processing of transforming a bit stream into an image, but also part of the processing. The decoding includes, for example, not only processing including arithmetic inverse decoding, inverse quantization, inverse orthogonal transform, prediction processing, and the like, but also processing including arithmetic inverse decoding and inverse quantization, processing including arithmetic inverse decoding, inverse quantization, and prediction processing, and the like.

<Orthogonal Transform/Inverse Orthogonal Transform in Adaptive Orthogonal Transform>

Conventionally, adaptive orthogonal transform (multiple transform selection (MTS)) has been proposed for image coding. For MTS, Discrete Cosine Transform (DCT)-2/Discrete Sine Transform (DST)-7/DCT-8 can be selected as orthogonal transform. For example, as described in Non-Patent Document 1, a fast algorithm supporting Dual Implementation of which result matches a result from matrix operation has been proposed for DST-7/DCT-8.

The fast algorithm is a method for reducing the number of calculations by utilizing the following characteristics of DST-7 (DCT-8).

P1) a characteristic in which a sum of two coefficients in transformed basis vectors is equal to another coefficient P2) a characteristic in which there is repetition in transformed basis vectors P3) a characteristic in which there is a transformed basis vector having only one type of coefficient Furthermore, for example, as described in Non-Patent Document 2, a method for applying DST-7 by flipping/rotating two-dimensional residual signals has been proposed.

DST-7/DCT-8 is DCT/DST transform of an odd-number group, and there has been a possibility that a hardware (H/W) implementation cost of DST-7/DCT-8 is high as compared to DCT-2 of an even-number group. A fast algorithm described in Non-Patent Document 1 can reduce the number of calculations in software implementation. In a case of hardware implementation, parallel execution of matrix operations in one cycle in a reference operation clock is considered. At this time, in a case where a characteristic of P1 is utilized in the fast algorithm according to Non-Patent Document 1, a sum of input signals having common coefficients is obtained in a first cycle, and matrix operation is executed in a second cycle. That is, because at least two cycles are required, there is no advantage from a viewpoint of a low delay (reduction in the number of cycles).

Furthermore, by setting an operation clock of a circuit twice the reference operation clock, implementation is possible such that processing can be performed within a cycle corresponding to one cycle of the reference operation clock. However, in a case of the method, required specifications are doubled, and therefore, there has been a possibility of an increase in implementation cost. Furthermore, it is necessary to have an orthogonal transform circuit for each DST-7/DCT-8, and therefore, there has been a possibility of an increase in circuit size.

In the method described in Non-Patent Document 2, two-dimensional orthogonal transform corresponding to ZxDCT-8/DCT-8xZ is achieved by rearrangement of two-dimensional residual signals and two-dimensional orthogonal transform of ZxDST-7/DST-7xZ (Z=DCT-2 or DST-7). However, in a case of this method, two-dimensional residual signals are rearranged before orthogonal transform or after inverse orthogonal transform, and therefore, there has been a possibility that the number of cycles is increased by the rearrangement processing.

Meanwhile, for example, Non-Patent Document 8 focuses on a fact that DST-7/DCT-8 is similarity orthogonal transform (point symmetry/rotation symmetry), and describes, as a method for simplifying a transform matrix of DST-7/DCT-8, a method for replacing a transform matrix of DCT-8 to FlipDST-7 (line-symmetric/mirror-symmetric with DST-7) obtained by flipping the transform matrix of DST-7.

Focusing on a characteristic that DST-7/DCT-8 (or FlipDST-7) is similarity orthogonal transform (P1/P2 described below) and linearity of matrix operation, one-dimensional orthogonal transform by DCT-8 (or FlipDST-7) is achieved by rearrangement processing (data-path switching) of one-dimensional input signals, sign inversion processing, and one-dimensional orthogonal transform by DST-7. Similarly, inverse transform corresponding to DCT-8 (or FlipDST-7) is achieved by sign inversion processing of input signals, rearrangement processing (data-path switching) of output signals, and inverse transform of DST-7.

P1) DST-7⇔DCT-8: point symmetry (rotational symmetry)
P2) DST-7⇔FlipDST-7: line symmetry (mirror symmetry)

<Definition of DST-7/DCT-8>

From Non-Patent Document 7, coefficients (k=0, . . . , N−1, l=0, . . . , N−1) of respective (k, l) components of a transform matrix of DST-7 and transform matrix of DCT-8 are defined as in the following Mathematical Formulas (1) to (3).

[DST-7]

$$T_{DST7}(k, l) = \sqrt{\frac{4}{2N+1}} \sin\frac{(2l+2)(2k+1)\pi}{4N+2} = \beta(N)\sin\frac{(2l+2)\left(k+\frac{1}{2}\right)\pi}{2N+1} \quad (1)$$

[DCT-8]

$$T_{DCT8}(k, l) = \sqrt{\frac{4}{2N+1}} \cos\frac{(2l+1)(2k+1)\pi}{4N+2} = \beta(N)\cos\frac{(2l+1)\left(k+\frac{1}{2}\right)\pi}{2N+1} \quad (2)$$

$$\text{where } \beta(N, k, j) = \beta(N) = \sqrt{\frac{4}{2N+1}} \quad (3)$$

<Symmetry of DST-7/DCT-8>

Next, symmetry of DST-7/DCT-8 will be described. When the following Mathematical Formula (4) is substituted into Mathematical Formula (2), the following Mathematical Formula (5) is obtained. The Mathematical Formula (5) can be transformed into the following Mathematical Formula (6), and the following Mathematical Formula (7) is obtained by applying product-to-sum formulas (product and sum formulas; cos (α−β)=cos α cos β−sin α sin β).

$$l = N - l' - 1 \quad (4)$$

$$T_{DCT8}(k, l) = \beta(N)\cos\frac{(2(N-l'-1)+1)\left(k+\frac{1}{2}\right)\pi}{2N+1} \quad (5)$$

$$T_{DCT8}(k, l) = \beta(N)\cos\frac{((2N+1)-(2l'+2))\left(k+\frac{1}{2}\right)\pi}{2N+1} \quad (6)$$

$$T_{DCT8}(k, l) = \beta(N)\left\{\cos\left\{\left(k+\frac{1}{2}\right)\pi\right\}\cos\left\{\frac{(2l'+2)\left(k+\frac{1}{2}\right)\pi}{2N+1}\right\}\right\} - \sin\left\{\left(k+\frac{1}{2}\right)\pi\right\}\sin\left\{\frac{(2l'+2)\left(k+\frac{1}{2}\right)\pi}{2N+1}\right\} \quad (7)$$

Here, in Mathematical Formula (7), considering that k is an integer, the following Mathematical Formulas (8) and (9) are obtained. Therefore, Mathematical Formula (10) is obtained from Mathematical Formula (7).

$$\sin\left\{\left(k+\frac{1}{2}\right)\pi\right\} = (-1)^k \quad (8)$$

$$\cos\left\{\left(k+\frac{1}{2}\right)\pi\right\} = 0 \quad (9)$$

$$T_{DCT8}(k, l) = \beta(N)(-1)^k \sin\left\{\frac{(2l'+2)\left(k+\frac{1}{2}\right)\pi}{2N+1}\right\} \quad (10)$$

When the Mathematical Formula (1) is substituted into Mathematical Formula (10), the following Mathematical Formula (11) is obtained. Furthermore, the following Mathematical Formula (12) is obtained from Mathematical Formula (4). When the Mathematical Formula (12) is substituted into Mathematical Formula (11), Mathematical Formula (13) is obtained.

$$T_{DCT8}(k,l)=(-1)^k T_{DST7}(k,l') \quad (11)$$

$$l'=N-l-1 \quad (12)$$

$$T_{DCT8}(k,l)=(-1)^k T_{DST7}(k,N-l-1) \quad (13)$$

That is, coefficients of (k, l) components of the transform matrix of DCT-8 are obtained by multiplying (k, N−l−1) component $(-1)^k$ of the transform matrix of DST-7. That is, DCT-8 has a point-symmetric (rotationally symmetric) relation with DST-7.

Furthermore, by removing the term $(-1)^k$ in Mathematical Formula (13), FlipDST-7 having a line-symmetric (mirror-symmetric) relation with DST-7 as expressed in the following Mathematical Formula (14) is obtained.

$$T_{FlipDST7}(k,l)=T_{DST7}(k,N-l-1) \quad (14)$$

That is, the transform matrix of DCT-8 is obtained by performing a flip operation on the transform matrix of DST-7 and inverting the signs (positive/negative) of transform coefficients at an odd-numbered position. In a transform matrix of FlipDST-7 and the transform matrix of DCT-8, the signs (positive/negative) of transform coefficients at an odd-numbered position are reversed.

<One-Dimensional Orthogonal Transform by DST-7/DCT-8/FlipDST-7>

One-dimensional output signals X(u) (u=0, ..., N−1) after convolution operation (one-dimensional orthogonal transform) using N-point one-dimensional input signals x(n) (n=0, ..., N−1) and a transform matrix T (N×N) can be defined by the following Mathematical Formula (15).

$$X(u) = \sum_{l=0}^{N-1} x(l)T(k, l) \ (u = 0, \ldots, N-1) \quad (15)$$

Here, by substituting Mathematical Formulas (1), (2), and (14), convolution operations (one-dimensional orthogonal transforms) using N-point one-dimensional input signals x(n) and N-point DST-7/DCT-8/FlipDST-7 can be expressed as in the following Mathematical Formulas (16), (17), and (18), respectively.

[DST-7]

$$X_{DST7}(u) = \sum_{l=0}^{N-1} x(l)T_{DST7}(k, l) \ (u = 0, \ldots, N-1) \quad (16)$$

[DCT-8]

$$X_{DCT8}(u) = \sum_{l=0}^{N-1} x(l)(-1)^k T_{DST7}(k, N-1-l) \quad (17)$$

[FlipDST-7]

$$X_{FlipDST7}(u) = \sum_{l=0}^{N-1} x(l)T_{DST7}(k, N-1-l) \quad (18)$$

When Mathematical Formula (4) is substituted into Mathematical Formulas (17) and (18), the following Mathematical Formulas (19) and (20) are obtained.

[DCT-8]

$$X_{DCT8}(u) = (-1)^k \sum_{l'=0}^{N-1} x(N-1-l')T_{DST7}(k, l') \quad (19)$$

[FlipDST-7]

$$X_{FlipDST7}(u) = \sum_{l'=0}^{N-1} x(N-1-l')T_{DST7}(k, l') \quad (20)$$

That is, convolution operation using residual signals x and DCT-8 is equivalent to rearranged residual signals x+orthogonal transform using DST-7+sign inversion. Furthermore, convolution operation using residual signals x and FlipDST-7 is equivalent to rearranged residual signals x+orthogonal transform using DST-7.

<Matrix Form of One-Dimensional Orthogonal Transform by DST-7/DCT-8/FlipDST-7>

Next, matrix forms of one-dimensional orthogonal transforms using DST-7/DCT-8/FlipDST-7 can be expressed as in the following Mathematical Formulas (21), (22), and (23), respectively.

[DST-7]

$$X^t = T_{DST7} x^t \quad (21)$$

[DCT-8]

$$X^t = T_{DCT8} x^t \quad (22)$$

[FlipDST-7]

$$X^t = T_{FlipDST7} x^t \quad (23)$$

Note that a vector x in the Mathematical Formulas is a one-dimensional signal array of x=(x1, x2, ..., xN) and is expressed by a row vector. A matrix Tz is a transform matrix of a transform Z (Z=DST-7, DCT-8, FlipDST-7) of N rows and N columns. Furthermore, a column vector $X^t$ is a product of the matrix Tz and a column vector $x^t$ (a product of matrices), and corresponds to transform coefficients obtained by one-dimensional orthogonal transform of input signals x using the transform Z (Z=DST-7, DCT-8, FlipDST-7). Furthermore, matrix forms corresponding to Mathematical Formulas (19) and (20) can be expressed as in the following Mathematical Formulas (24) and (25).

[DCT-8]

$$X^t = D(T_{DST7}(Jx^t)) \quad (24)$$

[FlipDST-7]

$$X^t = T_{DST7}(Jx^t) \quad (25)$$

The matrix D is a diagonal matrix of N rows and N columns having diagonal components diag={1, −1, ..., $(-1)^{N-1}$}, and is a matrix that performs sign inversion. The matrix D is also referred to as a sign inversion matrix. Note that the matrix D is a symmetric matrix (D=$D^t$). The matrix J is a permutation matrix that rearranges the matrix components in a reverse order in a column direction, and is obtained by flipping an identity matrix I in the column direction. The matrix J is also referred to as a flip matrix. Note that the matrix J is a symmetric matrix (J=$J^t$).

Because the transform matrices of DST-7, DCT-8, and FlipDST-7 are orthogonal matrices ($Tz^t Tz$=I), inverse transforms corresponding to Mathematical Formulas (21) to (25) can be expressed by the following Mathematical Formulas (26) to (30), respectively.

[DST-7$^{-1}$]

$$x^t = T_{DST7}{}^t X^t \quad (26)$$

[DCT-8$^{-1}$]

$$x^t = T_{DCT8}{}^t X^t \quad (27)$$

[FlipDST-7$^{-1}$]

$$x^t = T_{FlipDST7} X^t \quad (28)$$

[DCT-8$^{-1}$]

$$x^t = J(t_{DST7}{}^t(DX^t)) \quad (29)$$

[FlipDST-7$^{-1}$]

$$x^t = J(T_{DST7}{}^t X^t) \quad (30)$$

<Concept 1>

Rearrangement of input signals in orthogonal transform as described above and rearrangement of output signals in inverse orthogonal transform as described above are achieved by data-path switching. For example, as illustrated in A of FIG. 1, a one-dimensional orthogonal transform unit 10 that performs one-dimensional orthogonal transform with FlipDST-7 on the basis of the above-described Mathematical Formula (25) is achieved by a combination of a selector 11 that performs rearrangement processing of one-dimensional input signals (data-path switching of the input signals) and a matrix operation unit 12 that performs one-dimensional orthogonal transform with DST-7.

Similarly, for example, as illustrated in B of FIG. 1, an inverse one-dimensional orthogonal transform unit 20 that performs inverse one-dimensional orthogonal transform (inverse transform of one-dimensional orthogonal transform) with FlipDST-7 on the basis of the above-described Mathematical Formula (30) is achieved by a combination of a matrix operation unit 21 that performs inverse transform of DST-7 and a selector 22 that performs rearrangement of output signals (data-path switching of the output signals).

With this arrangement, in a case of hardware implementation, it is possible to reduce an increase in circuit size required for orthogonal transform (inverse orthogonal transform) without increasing the number of cycles. Furthermore, it is possible to achieve coding efficiency equivalent to coding efficiency in a case of the one-dimensional orthogonal transform unit 10 or the inverse one-dimensional orthogonal transform unit 20.

<Concept 2>

Figure 2:
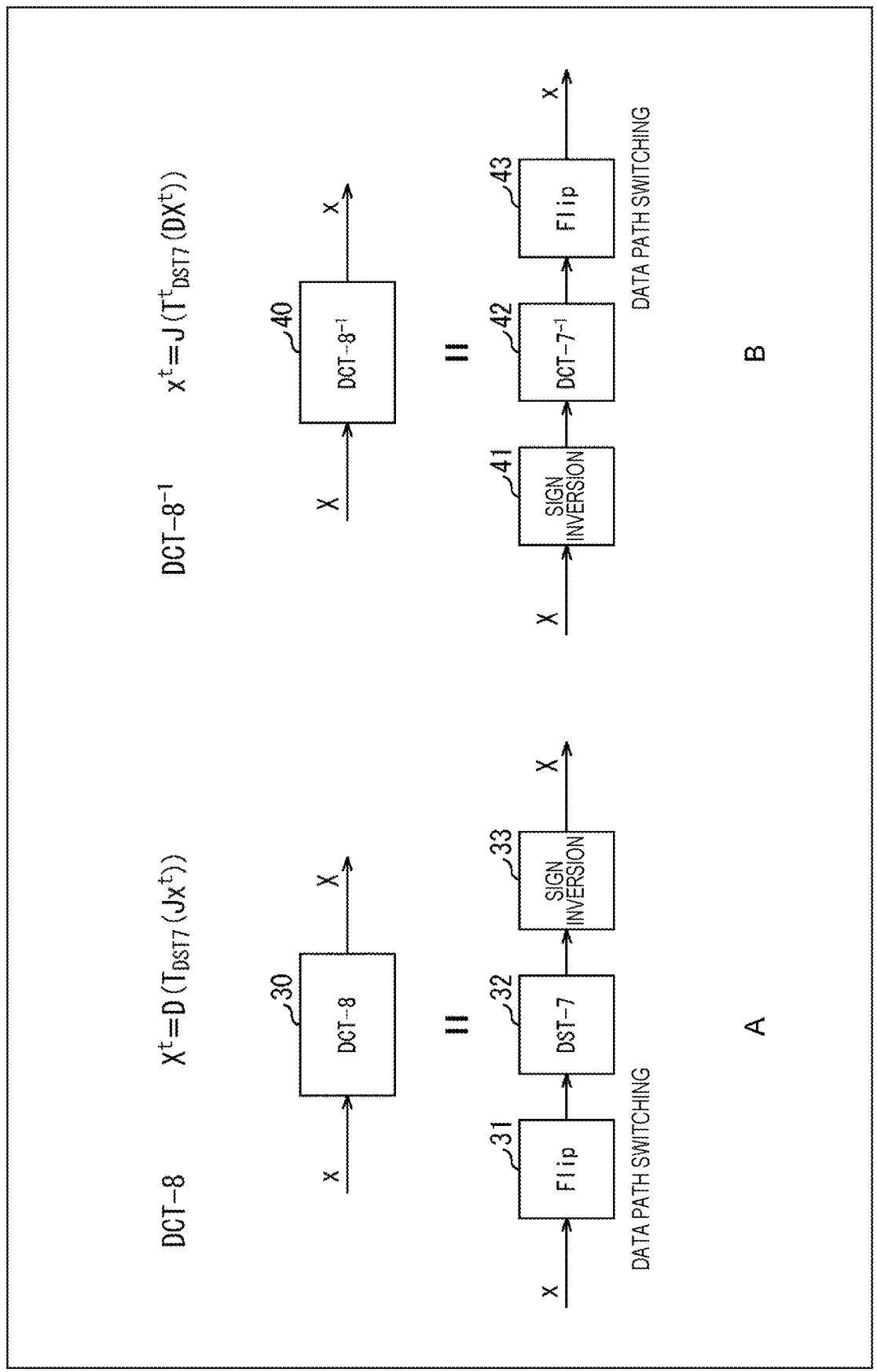
FIG. 2 is a diagram describing an example of a method for achieving one-dimensional orthogonal transform and inverse one-dimensional orthogonal transform.

Furthermore, for example, as illustrated in A of FIG. 2, a one-dimensional orthogonal transform unit 30 that performs one-dimensional orthogonal transform with DCT-8 on the basis of the above-described Mathematical Formula (24) is achieved by a combination of a selector 31 that performs rearrangement processing of one-dimensional input signals (data-path switching of the input signals), a matrix operation unit 32 that performs one-dimensional orthogonal transform with DST-7, and a sign inversion unit 33 that performs sign inversion processing on output signals after the one-dimensional orthogonal transform.

Moreover, for example, as illustrated in B of FIG. 2, inverse one-dimensional orthogonal transform unit 40 that performs inverse one-dimensional orthogonal transform (inverse transform of one-dimensional orthogonal transform) with DCT-8 on the basis of the above-described Mathematical Formula (29) is achieved by a combination of a sign inversion unit 41 that performs sign inversion processing on input signals, a matrix operation unit 42 that performs inverse transform of DST-7, and a selector 43 that performs rearrangement of output signals (data-path switching of the output signals).

With this arrangement, in a case of hardware implementation, it is possible to reduce an increase in circuit size required for orthogonal transform (inverse orthogonal transform) without increasing the number of cycles. Furthermore, because of being an equivalent transform, it is possible to achieve coding efficiency equivalent to coding efficiency in a case of the one-dimensional orthogonal transform unit 30 or the inverse one-dimensional orthogonal transform unit 40.

<Transform Skip>

Furthermore, in image coding, transform skip (transform skip (TS)) has been proposed. In TS, up to 32×32 two-dimensional transform skips can be selected as transform skip.

For example, Non-Patent Document 9 proposes a technique of rearranging residual signals in a residual domain (pixel domain) for two-dimensional transform skip. Furthermore, Non-Patent Document 10 introduces one-dimensional identity transform (identify transform (IDT)) in adaptive orthogonal transform, and proposes a method for performing two-dimensional transform skip and one-dimensional transform skip in a horizontal direction and a vertical direction in a framework of adaptive orthogonal transform (MTS).

However, in the method described in Non-Patent Document 9, two-dimensional residual signals are rearranged after two-dimensional transform skip, and therefore, there has been a possibility that the number of cycles is increased by the rearrangement processing from a view point of hardware implementation. Furthermore, there has been a possibility that rearrangement processing of two-dimensional signals increases a circuit size from a view point of hardware implementation. Furthermore, there has been a possibility that residual rearrangement processing cannot be applied as is on the one-dimensional transform skip introduced in Non-Patent Document 10.

Furthermore, in the method described in Non-Patent Document 10, improvement of coding efficiency can be expected by applying residual rearrangement processing on two-dimensional transform skip, the residual rearrangement processing being introduced in Non-Patent Document 9. However, in this case, it is necessary to perform the residual rearrangement processing after adaptive orthogonal transform, and therefore, there has been a possibility that the number of cycles increases from a view point of hardware implementation. Furthermore, there has been a possibility that the residual rearrangement processing introduced in Non-Patent Document 9 cannot be applied as is on one-dimensional transform skip.

<Identify Transform>

Let V and V' be linear spaces. A map f (f: a→a) that causes the a itself to correspond to a member a∈ V is a linear map from V to V, and is referred to as an identity map or identity transform of V.

Next, a matrix form of an identity transform (IDT) that associates N-point one-dimensional signals x[i] (i=0, . . . , N−1) with the one-dimensional signals x[i] themselves can be defined as in the following Mathematical Formula (31).

$$T_{IDT} x^t = x^t \quad (31)$$

Here, the matrix $T_{IDT}$ is a transform matrix of an identity transform. Coefficients (k=0, . . . , N−1, l=0, . . . , N−1) of respective (k, l) components of a transform matrix $T_{IDT}$ are defined as in the next Kronecker delta Formulas (32) and (33).

$$T_{IDT}(k,l) = \delta_{kl} \quad (32)$$

where $$\delta_{kl} = \begin{cases} 1 & (k = l) \\ 0 & (k \neq l) \end{cases} \quad (33)$$

That is, the transform matrix $T_{IDT}$ having N rows and N columns is an identity matrix I. In general, in an identity matrix I, a commutative property of multiplication is established for the matrix as in the following Mathematical Formula (34).

$$I \cdot A = A \cdot I = A \quad (34)$$

When Mathematical Formula (34) is substituted into Mathematical Formula (31), the following Mathematical Formula (35) is obtained.

$$T_{IDT} \cdot A = A \cdot T_{IDT} = A \quad (35)$$

A matrix form of a linear map g that rearranges (flips) N-point one-dimensional signals x[i] (i=0, . . . , N−1) to x[i]=x[N−1−i] (i=0, . . . , N−1) can be defined as in the following Mathematical Formula (36).

$$X^t = J x^t \quad (36)$$

The matrix J is a permutation matrix that rearranges the matrix components in a reverse order in a column direction, and is obtained by flipping an identity matrix I in the column direction. The matrix J is also referred to as a flip matrix. Note that the matrix J is a symmetric matrix ($J = J^t = J^{-1}$).

Therefore, from Mathematical Formulas (35) and (36), the following Mathematical Formula (37) holds for combined transform (g*f) of identity transform f and rearrangement g, and combined transform (g*f).

$$X^t = J x^t = (T_{IDT} \cdot J) x^t = (J \cdot T_{IDT}) x^t = T_{IDT} (J x^t) \quad (37)$$

That is, combined transform (f*g) of identity transform f and rearrangement g is equivalent to combined transform (g*f) Furthermore, the following Mathematical Formula (38) holds between inverse transform (f*g)−1 of combined transform (f*g) and inverse transform (g*f)−1 of the combined transform (g*f).

$$x^t = (T_{IDT} \cdot J)^{-1} X^t = (J \cdot T_{IDT})^{-1} X^{-t} = (T_{IDT} \cdot J)^t X^t = (J \cdot T_{IDT}^t)$$
$$X^t = (J \cdot T_{IDT}^t) X^t = J(T_{IDT}^t X^t) \quad (38)$$

<Concept 3>

From the above, for example, as expressed in the following Mathematical Formula (39), one-dimensional transform skip and residual rearrangement processing (data-path switching) are achieved by rearrangement of one-dimensional input signals and one-dimensional identity transform.

$$X^t = T_{IDT}(Jx^t) \quad (39)$$

Figure 3:
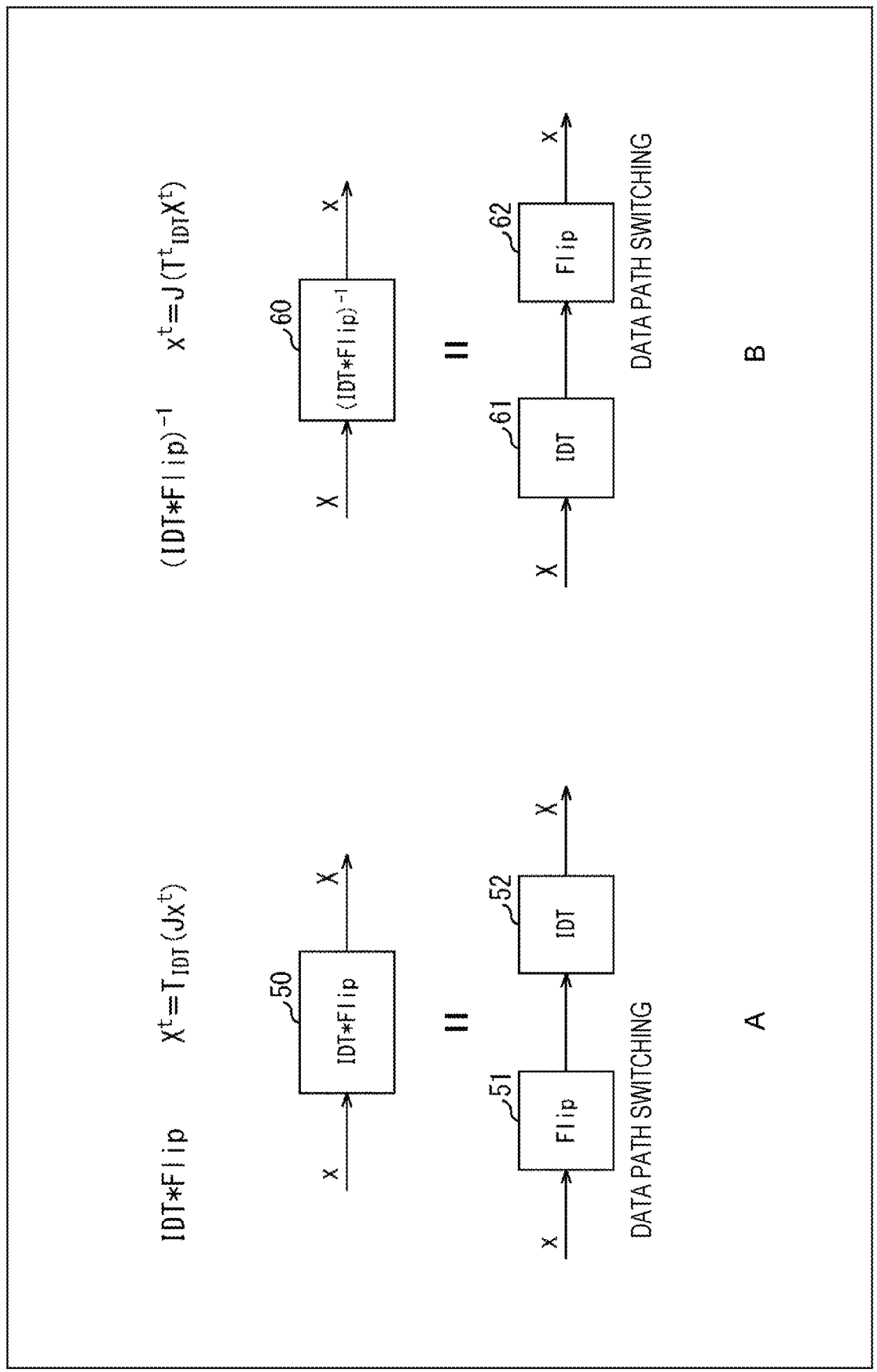
FIG. 3 is a diagram describing an example of a method for achieving one-dimensional orthogonal transform and inverse one-dimensional orthogonal transform.

For example, as illustrated in A of FIG. 3, a one-dimensional orthogonal transform unit 50 that performs one-dimensional transform skip and residual rearrangement processing (IDT*Flip) on the basis of the above-described Mathematical Formula (39) is achieved by a combination of a selector 51 that performs rearrangement processing of one-dimensional input signals (data-path switching of the input signals) and a matrix operation unit 52 that performs one-dimensional identity transform.

Similarly, as expressed in the following Mathematical Formula (40), inverse processing of the one-dimensional transform skip and residual rearrangement processing is achieved by (inverse) one-dimensional identity transform and rearrangement (data-path switching) of output signals.

$$x^t = J(T_{IDT}^t X^t) \quad (40)$$

For example, as illustrated in B of FIG. 3, inverse one-dimensional orthogonal transform unit 60 that performs inverse processing of one-dimensional transform skip and residual rearrangement processing (IDT*Flip)$^{-1}$ on the basis of the above-described Mathematical Formula (40) is achieved by a combination of a matrix operation unit 61 that performs (inverse) one-dimensional identity transform and a selector 62 that performs rearrangement processing of one-dimensional output signals (data-path switching of the output signals).

For example, one-dimensional transform skip and residual rearrangement processing in the horizontal direction are achieved by rearrangement processing (data-path switching) of one-dimensional input signals in the horizontal direction, one-dimensional identity transform in the horizontal direction, and one-dimensional orthogonal transform in the vertical direction. Similarly, inverse processing of one-dimensional transform skip and residual rearrangement processing in the horizontal direction are achieved by inverse one-dimensional orthogonal transform in the vertical direction, (inverse) one-dimensional identity transform in the horizontal direction, and rearrangement processing (data-path switching) of one-dimensional output signals in the horizontal direction after the (inverse) one-dimensional identity transform.

Furthermore, one-dimensional transform skip and residual rearrangement processing in the vertical direction are achieved by one-dimensional orthogonal transform in the horizontal direction, rearrangement processing (data-path switching) of one-dimensional input signals in the vertical direction, and one-dimensional identity transform in the vertical direction. Similarly, inverse processing of one-dimensional transform skip and residual rearrangement processing in the vertical direction are achieved by (inverse) one-dimensional identity transform in the vertical direction, rearrangement processing (data-path switching) of one-dimensional output signals in the vertical direction after the (inverse) one-dimensional identity transform, and inverse one-dimensional orthogonal transform in the horizontal direction.

Moreover, two-dimensional transform skip and residual rearrangement processing are achieved by rearrangement processing (data-path switching) of one-dimensional input signals in the horizontal direction, one-dimensional identity transform in the horizontal direction, rearrangement processing (data-path switching) of one-dimensional input signals in the vertical direction, and one-dimensional identity transform in the vertical direction. Similarly, inverse processing of two-dimensional transform skip and residual rearrangement processing are achieved by (inverse) one-dimensional identity transform in the vertical direction, rearrangement processing (data-path switching) of one-dimensional output signals in the vertical direction after the (inverse) one-dimensional identity transform, (inverse) one-dimensional identity transform in the horizontal direction, and rearrangement processing (data-path switching) of one-dimensional output signals in the horizontal direction after the (inverse) one-dimensional identity transform.

With this arrangement, from a view point of hardware implementation, it is possible to reduce an increase in circuit size required for one-dimensional transform skip and residual rearrangement processing without increasing the number of cycles. Furthermore, similarly, it is possible to reduce an increase in circuit size required for two-dimensional transform skip and residual rearrangement processing.

That is, as compared with a method described in Non-Patent Document 9 or a method described in Non-Patent Document 10, an increase in circuit size can be reduced, and moreover, a reduction in coding efficiency can be reduced. Furthermore, one-dimensional transform skip and residual rearrangement processing can be executed as one mode of adaptive orthogonal transform.

<Concept 4>

In order to incorporate one-dimensional transform skip (IDT) into a framework of adaptive orthogonal transform (MTS), a modified transform type derivation unit and a flip flag derivation unit may be further added to a parameter derivation unit (transform type) included in the orthogonal transform unit.

<Concept 5>

Furthermore, rearrangement processing (data-path switching) of one-dimensional input signals (or one-dimensional output signals) may not be performed in a case where the two-dimensional transform skip is not performed, and rearrangement processing (data-path switching) of the one-dimensional input signals (or the one-dimensional output signals) may be performed only in a case where two-dimensional transform skip is performed.

2. First Embodiment

<2-1. Application to One-Dimensional Orthogonal Transform Device>

<One-Dimensional Orthogonal Transform Device>

Figure 4:
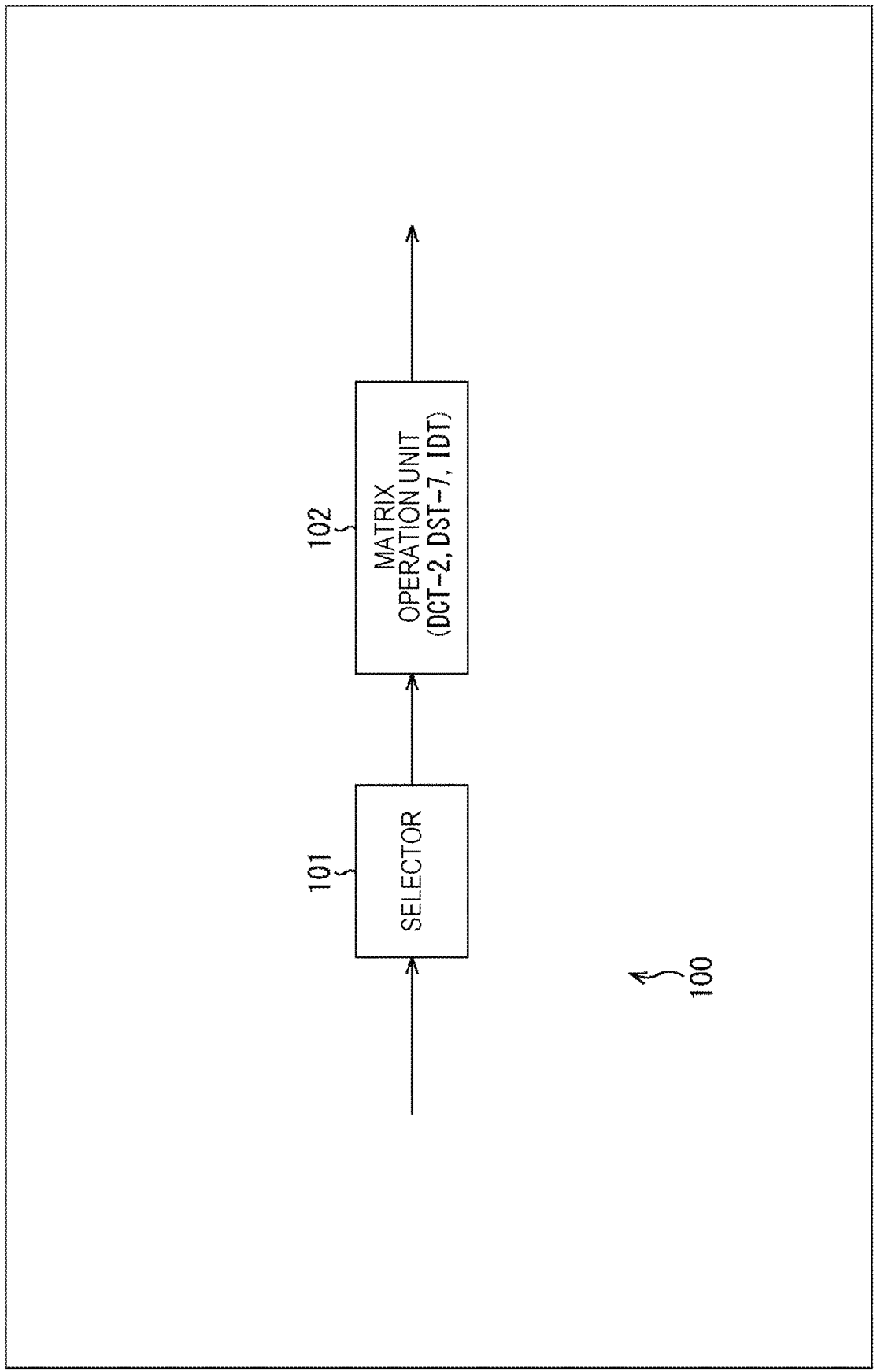
FIG. 4 is a block diagram illustrating a main configuration example of a one-dimensional orthogonal transform device.

FIG. 4 is a block diagram illustrating an example of a configuration of a one-dimensional orthogonal transform device that is an aspect of an image processing device to which the present technology is applied. A one-dimensional orthogonal transform device 100 illustrated in FIG. 4 is a device that performs one-dimensional orthogonal transform of residual data. As illustrated in FIG. 4, the one-dimensional orthogonal transform device 100 includes a selector 101 and a matrix operation unit 102.

The selector 101 performs processing related to control of a data path of input signals x[n] in the matrix operation unit 102. For example, the selector 101 selects either a data path of input signals x[n] in a forward direction or a data path of the input signals x[n] in a reverse direction. The data path in the forward direction is, for example, a data path that causes the matrix operation unit 102 to input input signals x[n], which are arranged in order of n=0 to n=N−1, without changing the order. The data path in the reverse direction is, for example, a data path that causes the matrix operation unit 102 to input input signals x[n], which are arranged in order of n=0 to n=N−1, by rearranging the order into n=N−1 to n=0 (that is, in the reverse order). That is, the input signals x[n] are input to the matrix operation unit 102 via either the data path in the forward direction or the data path in the reverse direction, whichever is selected by the selector 101.

The selector 101 performs the selection on the basis of a flip flag bFlip that is flag information for controlling the selection. The flip flag bFlip is derived on the basis of a parameter related to orthogonal transform.

The matrix operation unit 102 performs matrix operation of one-dimensional orthogonal transform on the input signals x[n]. For example, the matrix operation unit 102 can perform matrix operation of one-dimensional orthogonal transform corresponding to DST-7, matrix operation of one-dimensional orthogonal transform corresponding to DCT-2, and matrix operation of one-dimensional orthogonal transform corresponding to IDT.

The matrix operation unit 102 performs matrix operation of one-dimensional orthogonal transform corresponding to a parameter such as a transform type trType, a transform size nTbS, or an enabled transform size nonZeroS. That is, on the basis of these parameters, the matrix operation unit 102 selects and executes any one of the above-described matrix operations.

<Flow of One-Dimensional Orthogonal Transform Processing>

Figure 6:
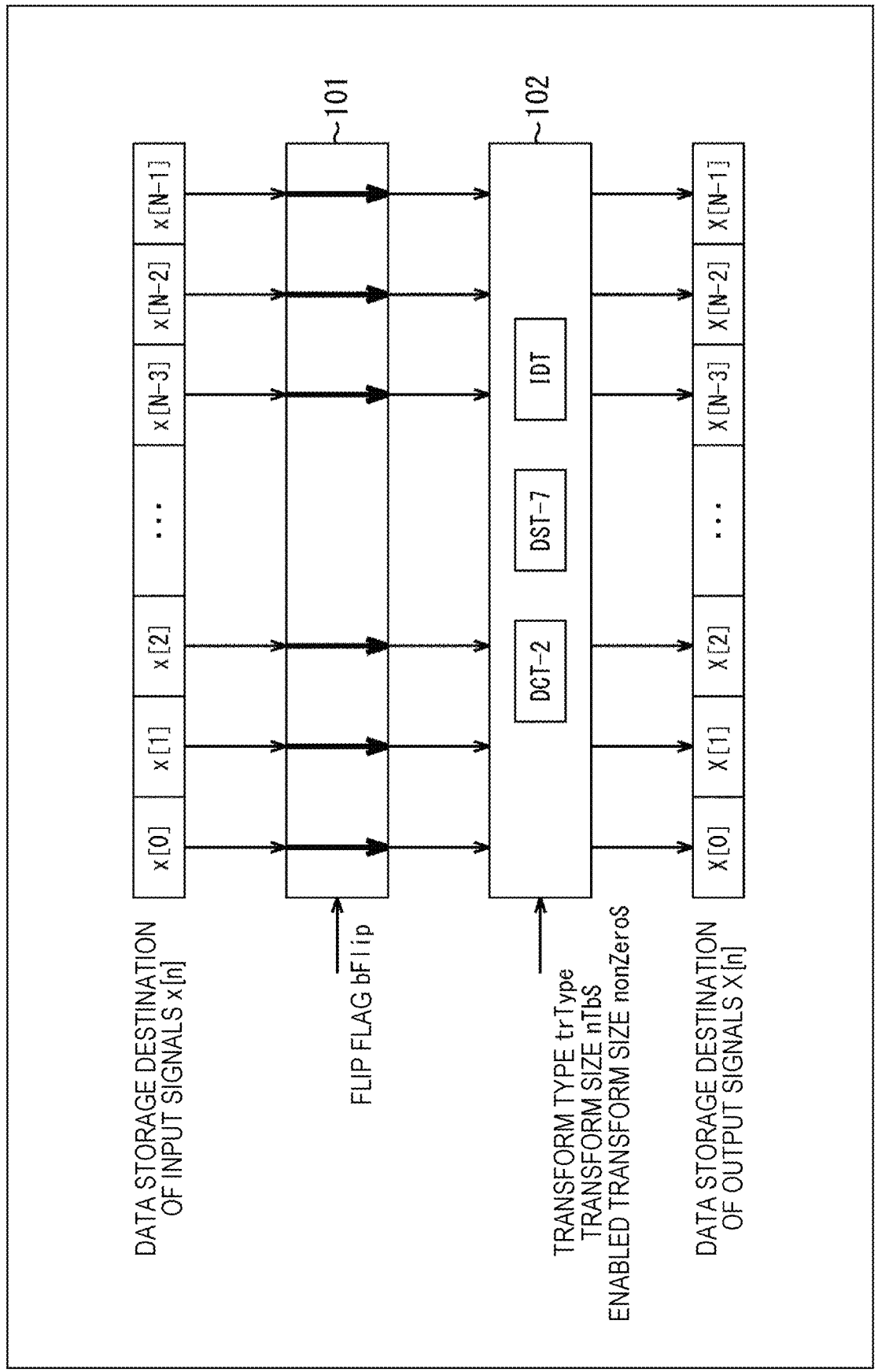
FIG. 6 is a diagram describing an example of a state of one-dimensional orthogonal transform.
Figure 7:
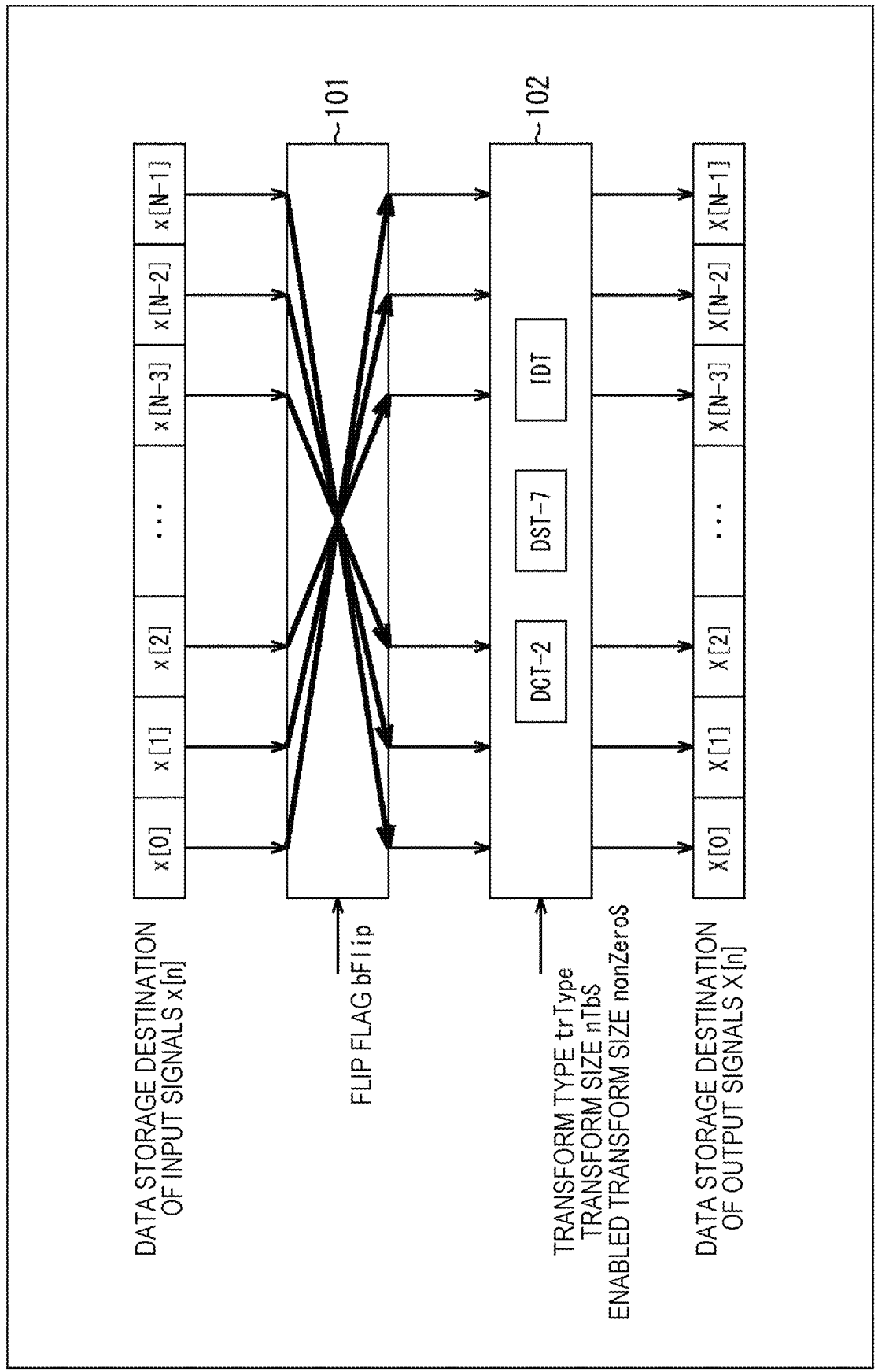
FIG. 7 is a diagram describing an example of a state of one-dimensional orthogonal transform.

An example of a flow of one-dimensional orthogonal transform processing executed by the one-dimensional orthogonal transform device 100 will be described with reference to a flowchart in FIG. 5. Furthermore, as necessary, description will be made with reference to FIGS. 6 and 7.

In step S101, when one-dimensional orthogonal transform processing is started, the matrix operation unit 102 switches to orthogonal transform corresponding to a transform type trType, a transform size nTbS, and an enabled transform size nonZeroS. That is, on the basis of these parameters, the matrix operation unit 102 selects a type (for example, any one of DST-7, DCT-2, or IDT) of one-dimensional orthogonal transform to be executed.

In step S102, the selector 101 decides whether or not a supplied flip flag bFlip is false. In a case where it is decided that the flip flag is false (False), the processing proceeds to step S103.

In this case, the selector 101 selects the data path in the forward direction. That is, in step S103, the selector 101 enables the data path in the forward direction and disables the data path in the reverse direction. With this selection, without being flipped, the input signals x[n] are input to the matrix operation unit 102 in that order as in the example in FIG. 6. When the data path selection ends, the processing proceeds to step S105.

Furthermore, in a case where it is decided in step S102 that the flip flag is true (True) (not false), the processing proceeds to step S104.

In this case, the selector 101 selects the data path in the reverse direction. That is, in step S104, the selector 101 enables the data path in the reverse direction and disables the data path in the forward direction. With this selection, being flipped, the input signals x[n] are input to the matrix operation unit 102 as in the example in FIG. 7. When the data path selection ends, the processing proceeds to step S105.

In step S105, the matrix operation unit 102 executes matrix operation of the input signals x[n] and the orthogonal transform selected in step S101, and outputs output signals X[n]. That is, the matrix operation unit 102 performs matrix operation of one-dimensional orthogonal transform of any one of DST-7, DCT-2, or IDT. When the matrix operation ends, the one-dimensional orthogonal transform processing ends.

For example, by the matrix operation unit 102 performing matrix operation of one-dimensional orthogonal transform of DST-7 (which may be DCT-2), it is possible to reduce an increase in processing delay (the number of cycles) or in circuit size in hardware implementation of a processing unit that performs one-dimensional orthogonal transform of FlipDST-7 (Mathematical Formula (25)) described above in <Concept 1>, for example. Furthermore, it is possible to achieve coding efficiency equivalent to coding efficiency of a case where matrix operation of one-dimensional orthogonal transform of FlipDST-7 is performed.

Furthermore, for example, by the matrix operation unit 102 performing matrix operation of one-dimensional orthogonal transform of IDT, it is possible to reduce an increase in processing delay (the number of cycles) or in circuit size in hardware implementation of IDT*Flip (Mathematical Formula (39)) described above in <Concept 3>, for example. Furthermore, it is possible to improve coding efficiency more than coding efficiency of a case where matrix operation of one-dimensional orthogonal transform of IDT*Flip is performed. Moreover, by performing the processing in this manner, the processing can be executed as one mode of adaptive orthogonal transform.

<2-2. Application to Inverse One-Dimensional Orthogonal Transform Device>

<Inverse One-Dimensional Orthogonal Transform Device>

Figure 8:
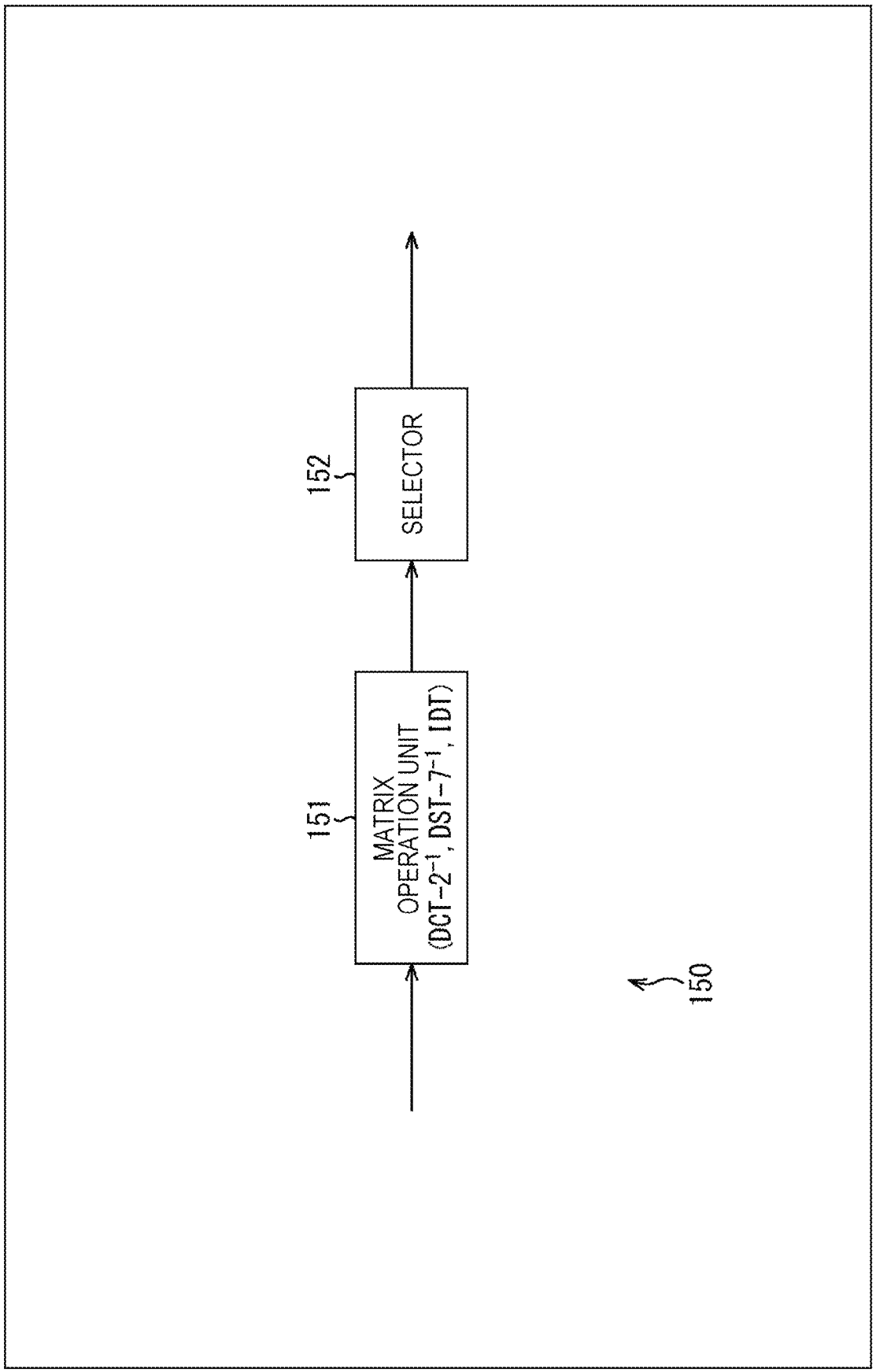
FIG. 8 is a block diagram illustrating a main configuration example of inverse one-dimensional orthogonal transform device.

FIG. 8 is a block diagram illustrating an example of a configuration of an inverse one-dimensional orthogonal transform device that is an aspect of an image processing device to which the present technology is applied. An inverse one-dimensional orthogonal transform device 150 illustrated in FIG. 8 is a device that performs inverse one-dimensional orthogonal transform of transform coefficients. As illustrated in FIG. 8, the inverse one-dimensional orthogonal transform device 150 includes a matrix operation unit 151 and a selector 152.

The matrix operation unit 151 performs matrix operation of inverse one-dimensional orthogonal transform on input signals X[n]. For example, the matrix operation unit 151 can perform matrix operation of inverse one-dimensional orthogonal transform corresponding to DST-7-1, matrix operation of inverse one-dimensional orthogonal transform corresponding to DCT-2$^{-1}$, and matrix operation of inverse one-dimensional orthogonal transform corresponding to IDT. The matrix operation unit 151 performs matrix operation of inverse one-dimensional orthogonal transform corresponding to a parameter such as a transform type trType, a transform size nTbS, or an enabled transform size nonZeroS. That is, the matrix operation unit 151 selects any one of the above-described matrix operations on the basis of these parameters, and executes the matrix operation.

The selector 152 performs processing related to control of a data path of output signals x[n] in the matrix operation unit 151. For example, the selector 152 selects either a data path of output signals x[n] in a forward direction or a data path of the output signals x[n] in the reverse direction. The data path in the forward direction is, for example, a data path that outputs output signals x[n] in the matrix operation unit 151, which are arranged in order of n=0 to n=N−1, to outside of the inverse one-dimensional orthogonal transform device 150, without changing the order. The data path in the reverse direction is, for example, a data path that outputs output signals x[n] in the matrix operation unit 151, which are arranged in order of n=0 to n=N−1, to outside of the inverse one-dimensional orthogonal transform device 150, by rearranging the order into n=N−1 to n=0 (that is, in the reverse order). That is, the output signals x[n] in the matrix operation unit 151 are output to outside of the inverse one-dimensional orthogonal transform device 150 via either the data path in the forward direction or the data path in the reverse direction, whichever is selected by the selector 152.

The selector 152 performs the selection on the basis of a flip flag bFlip that is flag information for controlling the selection. The flip flag bFlip is derived on the basis of a parameter related to inverse orthogonal transform.

<Flow of Inverse One-Dimensional Orthogonal Transform Processing>

Figure 10:
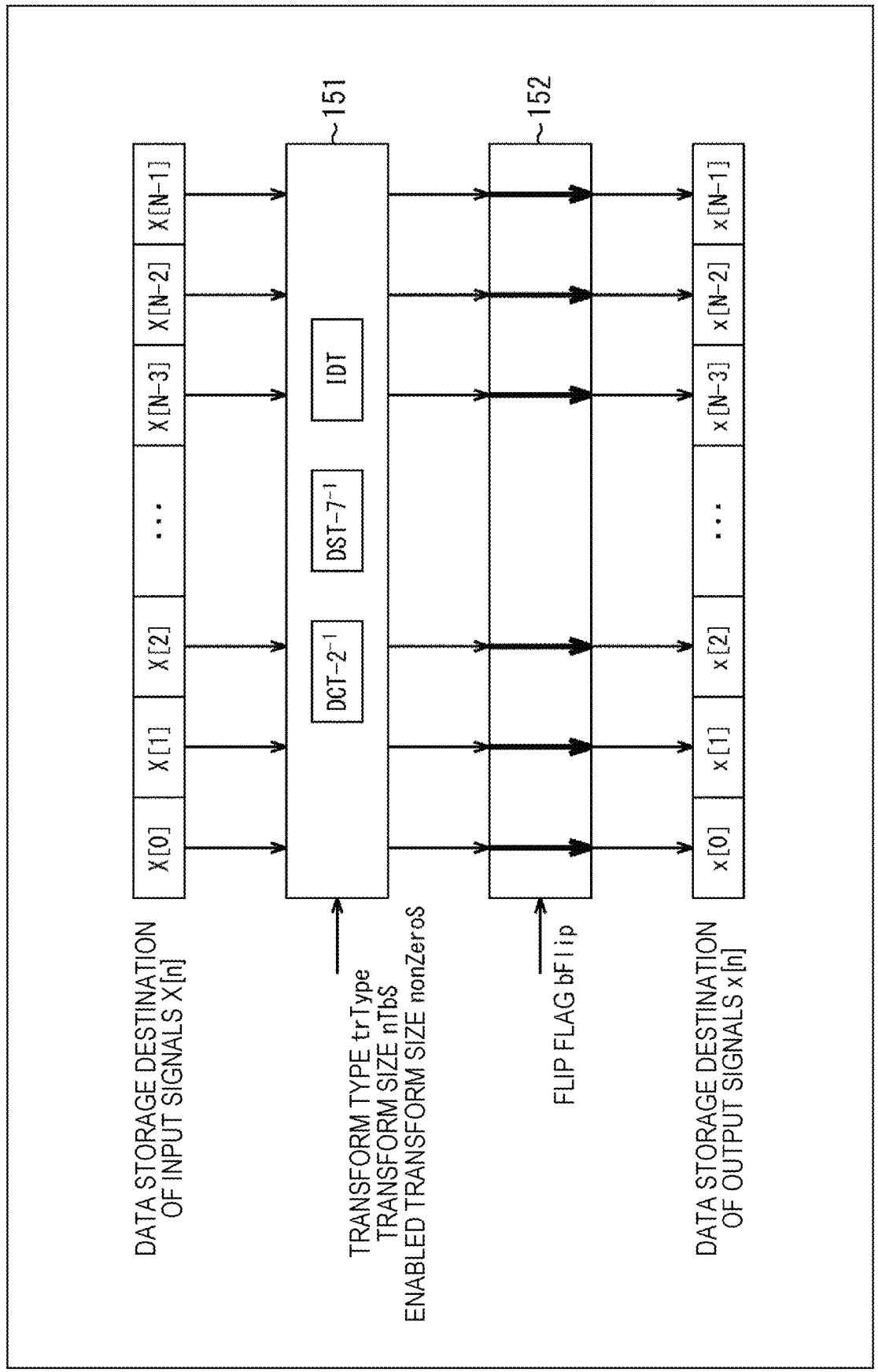
FIG. 10 is a diagram describing an example of a state of inverse one-dimensional orthogonal transform.
Figure 11:
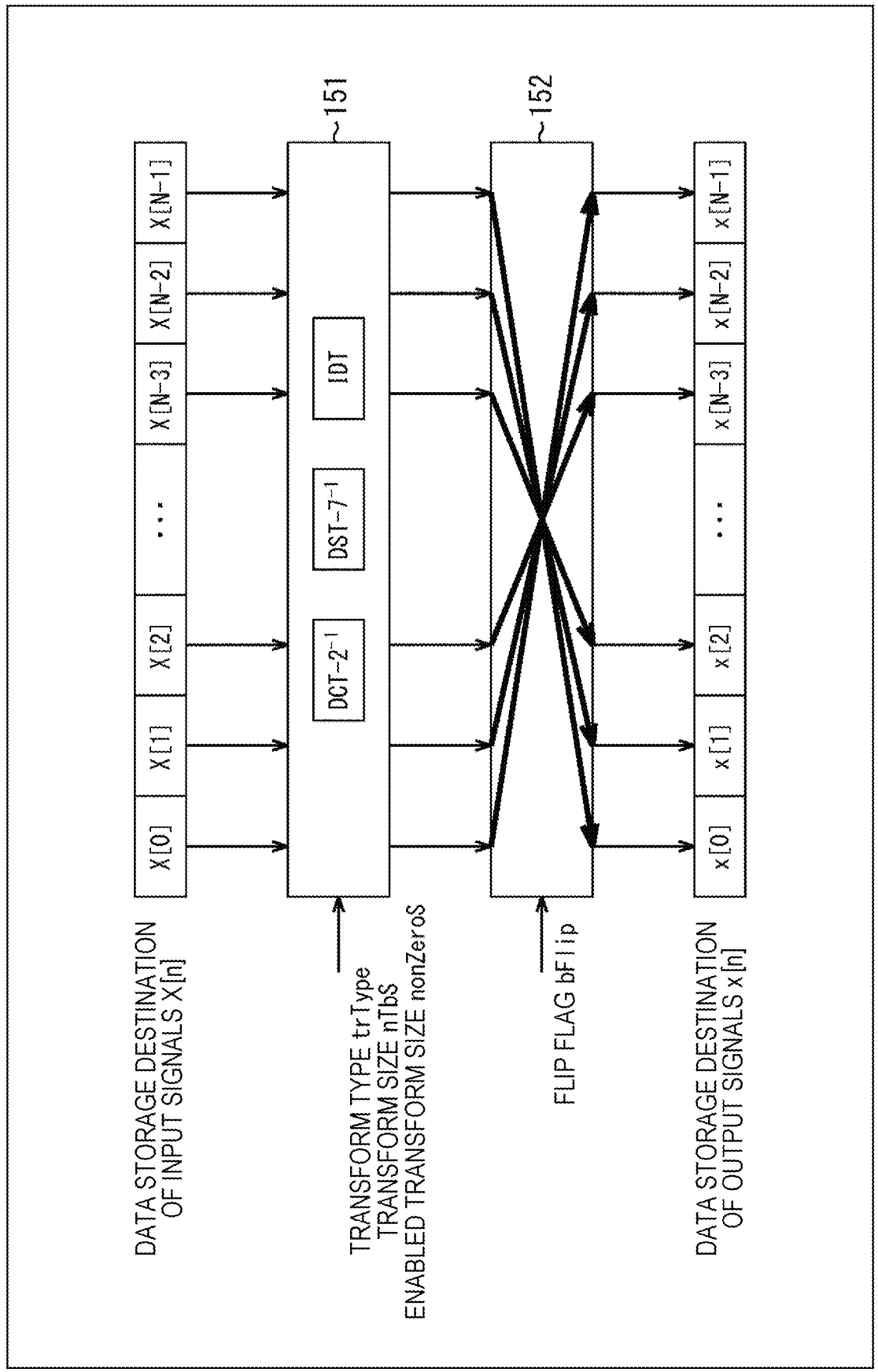
FIG. 11 is a diagram describing an example of a state of inverse one-dimensional orthogonal transform.

An example of a flow of inverse one-dimensional orthogonal transform processing executed by the inverse one-dimensional orthogonal transform device 150 will be described with reference to a flowchart in FIG. 9. Furthermore, as necessary, description will be made with reference to FIGS. 10 and 11.

In step S151, when inverse one-dimensional orthogonal transform processing is started, the matrix operation unit 151 switches to inverse orthogonal transform corresponding to a transform type trType, a transform size nTbS, and an enabled transform size nonZeroS. That is, on the basis of these parameters, the matrix operation unit 151 selects a type (for example, any one of DST-7$^{-1}$, DCT-2$^{-1}$, or IDT) of inverse one-dimensional orthogonal transform to be executed.

In step S152, the matrix operation unit 151 executes matrix operation of the input signals X[n] and the inverse orthogonal transform selected in step S151, and outputs output signals x[n]. That is, the matrix operation unit 151 performs matrix operation of inverse one-dimensional orthogonal transform of any one of DST-7-1, DCT-2$^{-1}$, or IDT.

In step S153, the selector 152 decides whether or not a supplied flip flag bFlip is false. In a case where it is decided that the flip flag is false (False), the processing proceeds to step S154.

In this case, the selector 152 selects a data path in the forward direction. That is, in step S154, the selector 152 enables the data path in the forward direction and disables the data path in the reverse direction. With this selection, without being flipped, the output signals x[n] are output to outside of the inverse one-dimensional orthogonal transform device 150 in that order as in the example in FIG. 10. When the data path selection ends, the inverse one-dimensional orthogonal transform processing ends.

Furthermore, in a case where it is decided in step S153 that the flip flag is true (True) (not false), the processing proceeds to step S155.

In this case, the selector 152 selects the data path in the reverse direction. That is, in step S155, the selector 152 enables the data path in the reverse direction and disables the data path in the forward direction. With this selection, being flipped, the output signals x[n] are output to outside of the inverse one-dimensional orthogonal transform device 150 in that order as in the example in FIG. 11. When the data path selection ends, the inverse one-dimensional orthogonal transform processing ends.

For example, by the matrix operation unit 151 performing matrix operation of inverse one-dimensional orthogonal transform of DST-7$^{-1}$ (which may be DCT-2$^{-1}$), it is possible to reduce an increase in processing delay (the number of cycles) or in circuit size in hardware implementation of a processing unit that performs inverse one-dimensional orthogonal transform of FlipDST-7$^{-1}$ (Mathematical Formula (30)) described above in <Concept 1>, for example. Furthermore, it is possible to achieve coding efficiency equivalent to coding efficiency of a case where matrix operation of inverse one-dimensional orthogonal transform of FlipDST-7$^{-1}$ is performed.

Furthermore, for example, by the matrix operation unit 151 performing matrix operation of (inverse) one-dimensional orthogonal transform of IDT, it is possible to reduce an increase in processing delay (the number of cycles) or in circuit size in hardware implementation of a processing unit that performs inverse one-dimensional orthogonal transform of (IDT*Flip)$^{-1}$ (Mathematical Formula (40)) described above in <Concept 3>, for example. Furthermore, it is possible to improve coding efficiency more than coding efficiency of a case where matrix operation of inverse one-dimensional orthogonal transform of (IDT*Flip)$^{-1}$ is performed. Moreover, by performing the processing in this manner, the processing can be executed as one mode of inverse adaptive orthogonal transform.

3. Second Embodiment

<3-1. Application to One-Dimensional Orthogonal Transform Device>

<One-Dimensional Orthogonal Transform Device>

Figure 12:
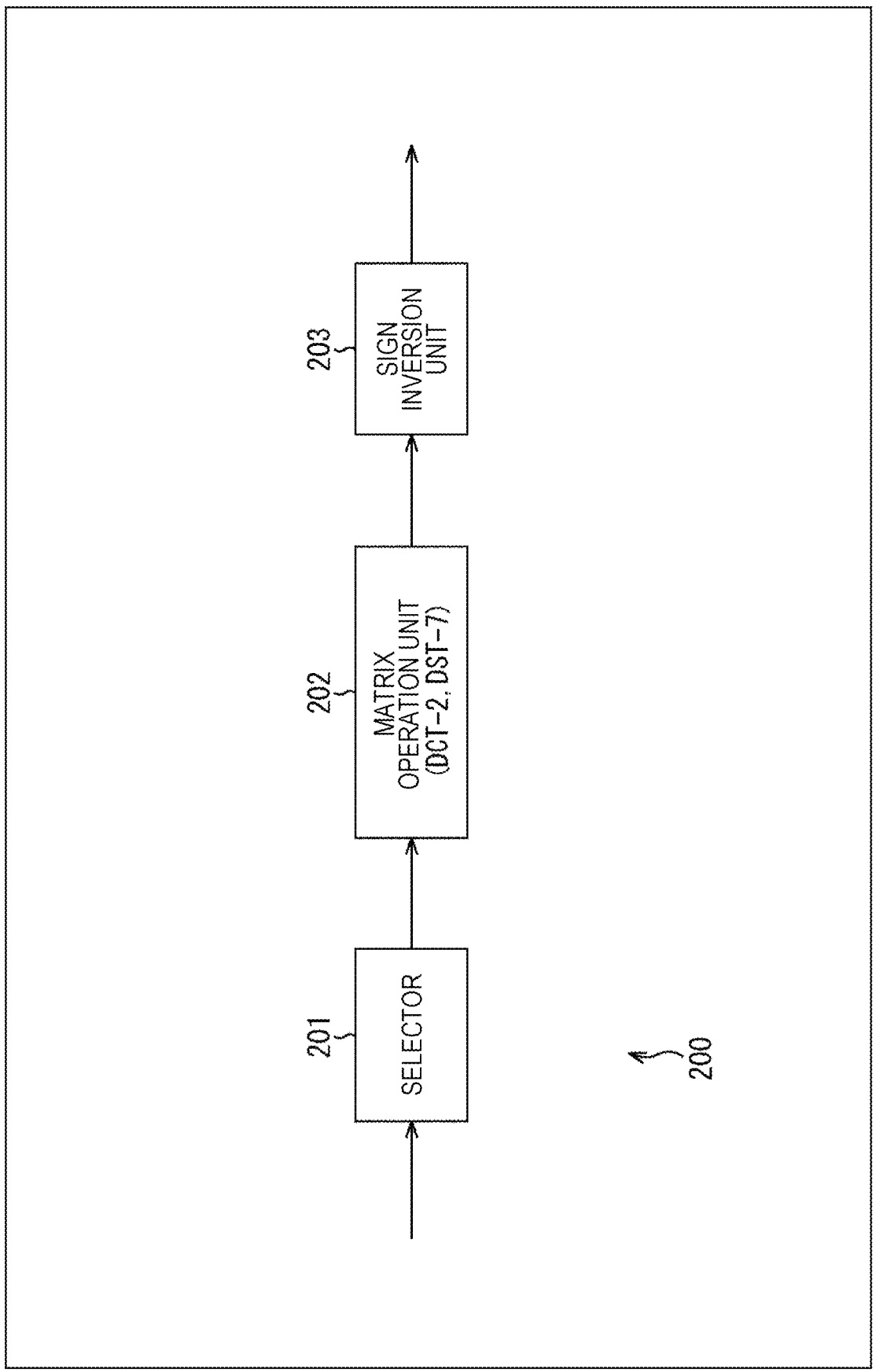
FIG. 12 is a block diagram illustrating a main configuration example of a one-dimensional orthogonal transform device.

FIG. 12 is a block diagram illustrating an example of a configuration of a one-dimensional orthogonal transform device that is an aspect of an image processing device to which the present technology is applied. A one-dimensional orthogonal transform device 200 illustrated in FIG. 12 is a device that performs one-dimensional orthogonal transform of residual data. As illustrated in FIG. 12, the one-dimensional orthogonal transform device 200 includes a selector 201, a matrix operation unit 202, and a sign inversion unit 203.

The selector 201 performs processing related to control of a data path of input signals x[n] in the matrix operation unit 202. For example, the selector 201 selects either a data path of input signals x[n] in a forward direction or a data path of the input signals x[n] in a reverse direction. The data path in the forward direction is, for example, a data path that causes the matrix operation unit 202 to input input signals x[n], which are arranged in order of n=0 to n=N−1, without changing the order. The data path in the reverse direction is, for example, a data path that causes the matrix operation unit 202 to input input signals x[n], which are arranged in order of n=0 to n=N−1, by rearranging the order into n=N−1 to n=0 (that is, in the reverse order). That is, the input signals x[n] are input to the matrix operation unit 202 via either the data path in the forward direction or the data path in the reverse direction, whichever is selected by the selector 201.

The selector 201 performs the selection on the basis of the flip flag bFlip that is flag information for controlling the selection. The flip flag bFlip is derived on the basis of a parameter related to orthogonal transform.

The matrix operation unit 202 performs matrix operation of one-dimensional orthogonal transform on the input signals x[n]. For example, the matrix operation unit 202 can perform matrix operation of one-dimensional orthogonal transform corresponding to DST-7 and matrix operation of one-dimensional orthogonal transform corresponding to DCT-2. The matrix operation unit 202 performs matrix operation of one-dimensional orthogonal transform corresponding to a parameter such as a transform type trType, a transform size nTbS, or an enabled transform size nonZeroS. That is, the matrix operation unit 202 selects any one of the above-described matrix operations on the basis of these parameters, and executes the matrix operation.

The sign inversion unit 203 inverts a sign of odd-numbered signals in the output signals X[n] in the matrix operation unit 202 and outputs the output signals to outside of the one-dimensional orthogonal transform device 200. Furthermore, the sign inversion unit 203 can output the output signals X[n] as they are to outside of the one-dimensional orthogonal transform device 200 without inverting a sign of each of the signals in the output signals X[n] in the matrix operation unit 202. That is, the sign inversion unit 203 can select whether or not to perform sign inversion as described above.

The sign inversion unit 203 performs the selection on the basis of a sign inversion flag bSign that is flag information for controlling the selection. The sign inversion flag bSign is derived on the basis of a parameter related to orthogonal transform.

<Flow of One-Dimensional Orthogonal Transform Processing>

Figure 14:
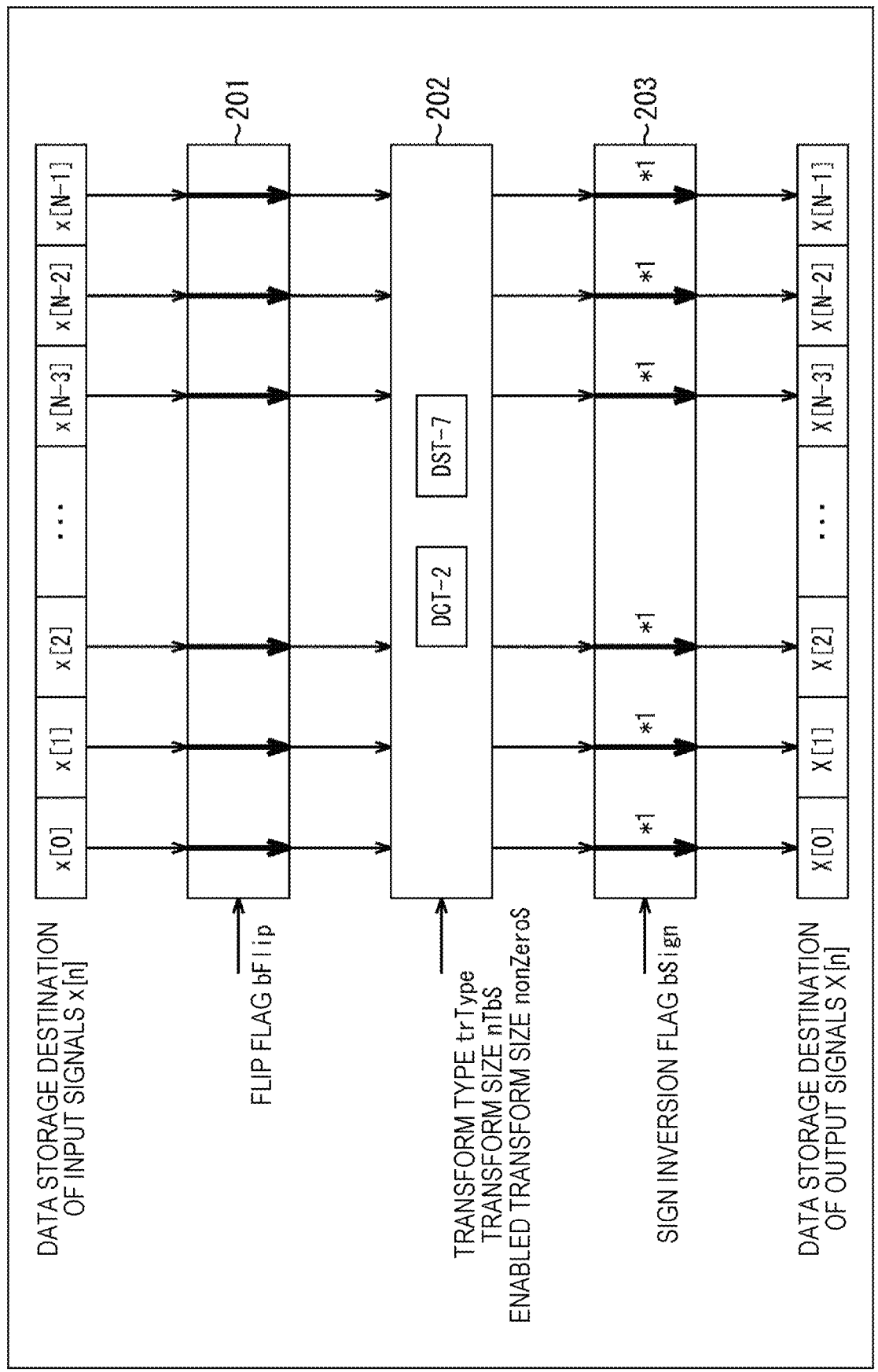
FIG. 14 is a diagram describing an example of a state of one-dimensional orthogonal transform.
Figure 15:
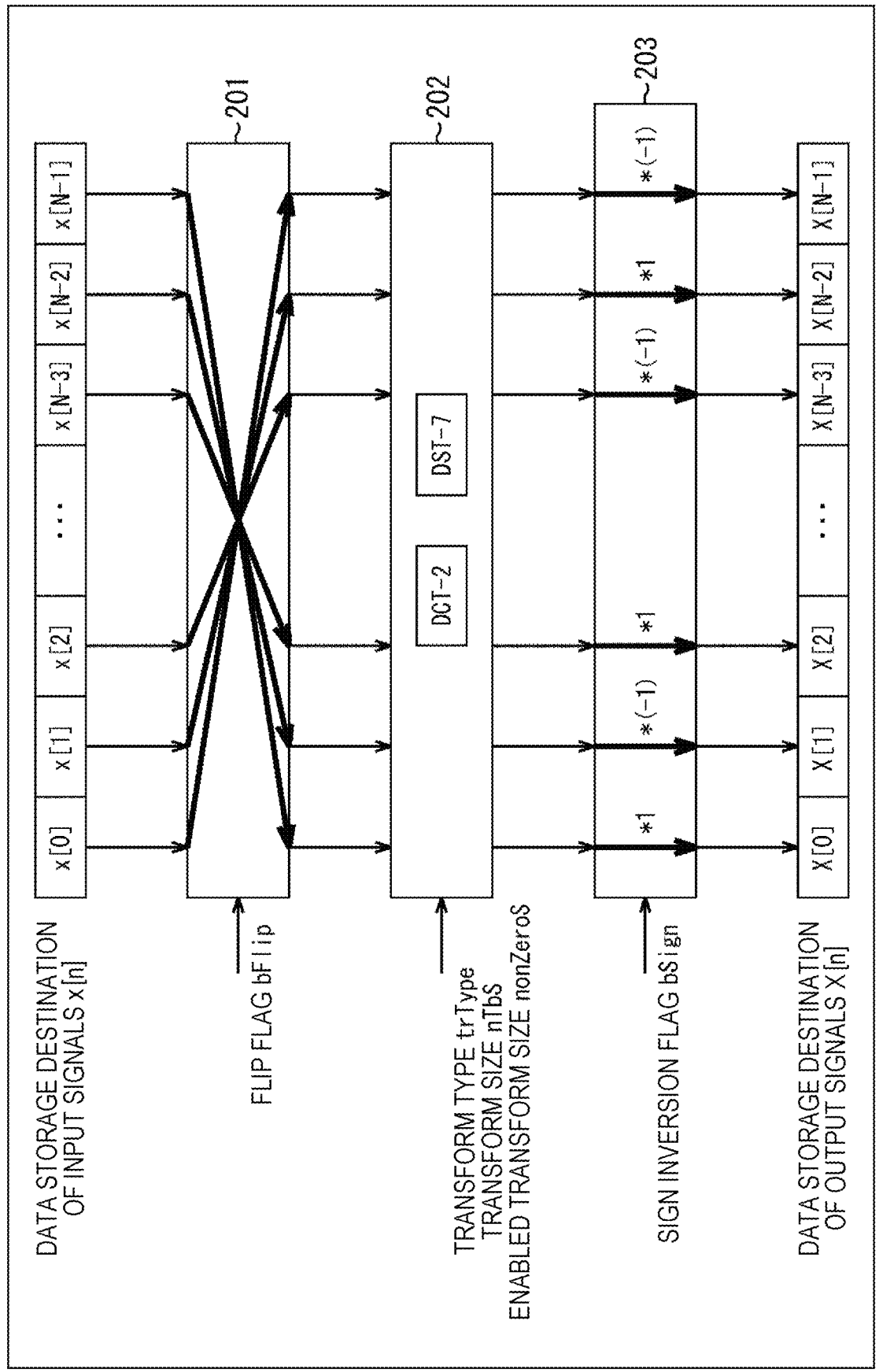
FIG. 15 is a diagram describing an example of a state of one-dimensional orthogonal transform.

An example of a flow of one-dimensional orthogonal transform processing executed by the one-dimensional orthogonal transform device 200 will be described with reference to a flowchart in FIG. 13. Furthermore, as necessary, description will be made with reference to FIGS. 14 and 15.

In step S201, when one-dimensional orthogonal transform processing is started, the matrix operation unit 202 switches to orthogonal transform corresponding to a transform type trType, a transform size nTbS, and an enabled transform size nonZeroS. That is, on the basis of these parameters, the matrix operation unit 202 selects a type (for example, DST-7 or DCT-2) of one-dimensional orthogonal transform to be executed.

In step S202, the selector 201 decides whether or not a supplied flip flag bFlip is false. In a case where it is decided that the flip flag is false (False), the processing proceeds to step S203.

In this case, the selector 201 selects a data path in the forward direction. That is, in step S203, the selector 201 enables the data path in the forward direction and disables the data path in the reverse direction. With this selection, without being flipped, the input signals x[n] are input to the matrix operation unit 202 in that order as in the example in FIG. 14. When the data path selection ends, the processing proceeds to step S205.

Furthermore, in a case where it is decided in step S202 that the flip flag is true (True) (not false), the processing proceeds to step S204.

In this case, the selector 201 selects the data path in the reverse direction. That is, in step S204, the selector 201 enables the data path in the reverse direction and disables the data path in the forward direction. With this selection, being flipped, the input signals x[n] are input to the matrix operation unit 202 as in the example in FIG. 15. When the data path selection ends, the processing proceeds to step S205.

In step S205, the matrix operation unit 202 executes matrix operation of the input signals x[n] and the orthogonal transform selected in step S201, and outputs output signals X[n]. That is, the matrix operation unit 202 performs matrix operation of one-dimensional orthogonal transform of DST-7 or DCT-2.

In step S206, the sign inversion unit 203 decides whether or not the supplied sign inversion flag bSign is false. In a case where it is decided that the sign inversion flag is false (False), the sign inversion unit 203 outputs the output signals X[n] to outside of the one-dimensional orthogonal transform device 200 without performing sign inversion as in the example in FIG. 14. Then, the one-dimensional orthogonal transform processing ends.

Furthermore, in a case where it is decided in step S206 that the sign inversion flag is true (True) (not false), the processing proceeds to step S207.

In this case, the sign inversion unit 203 performs sign inversion on the output signals X[n]. That is, the sign inversion unit 203 inverts signs (positive/negative) of odd-numbered signals in the output signals X[n], for example, as in the following Mathematical Formula (41) or the example in FIG. 15.

$$X[n]=(-1)^n*X[n] \qquad (41)$$

The sign inversion unit 203 outputs the sign-inverted output signals X[n] to outside of the one-dimensional orthogonal transform device 200. Then, the one-dimensional orthogonal transform processing ends.

For example, by the matrix operation unit 202 performing matrix operation of one-dimensional orthogonal transform of DST-7 (which may be DCT-2), it is possible to reduce an increase in processing delay (the number of cycles) or in circuit size in hardware implementation of a processing unit that performs one-dimensional orthogonal transform of DCT-8 (Mathematical Formula (24)) described above in <Concept 2>, for example. Furthermore, it is possible to achieve coding efficiency equivalent to coding efficiency of a case where matrix operation of one-dimensional orthogonal transform of DCT-8 is performed.

<3-2. Application to Inverse One-Dimensional Orthogonal Transform Device>

<Inverse One-Dimensional Orthogonal Transform Device>

Figure 16:
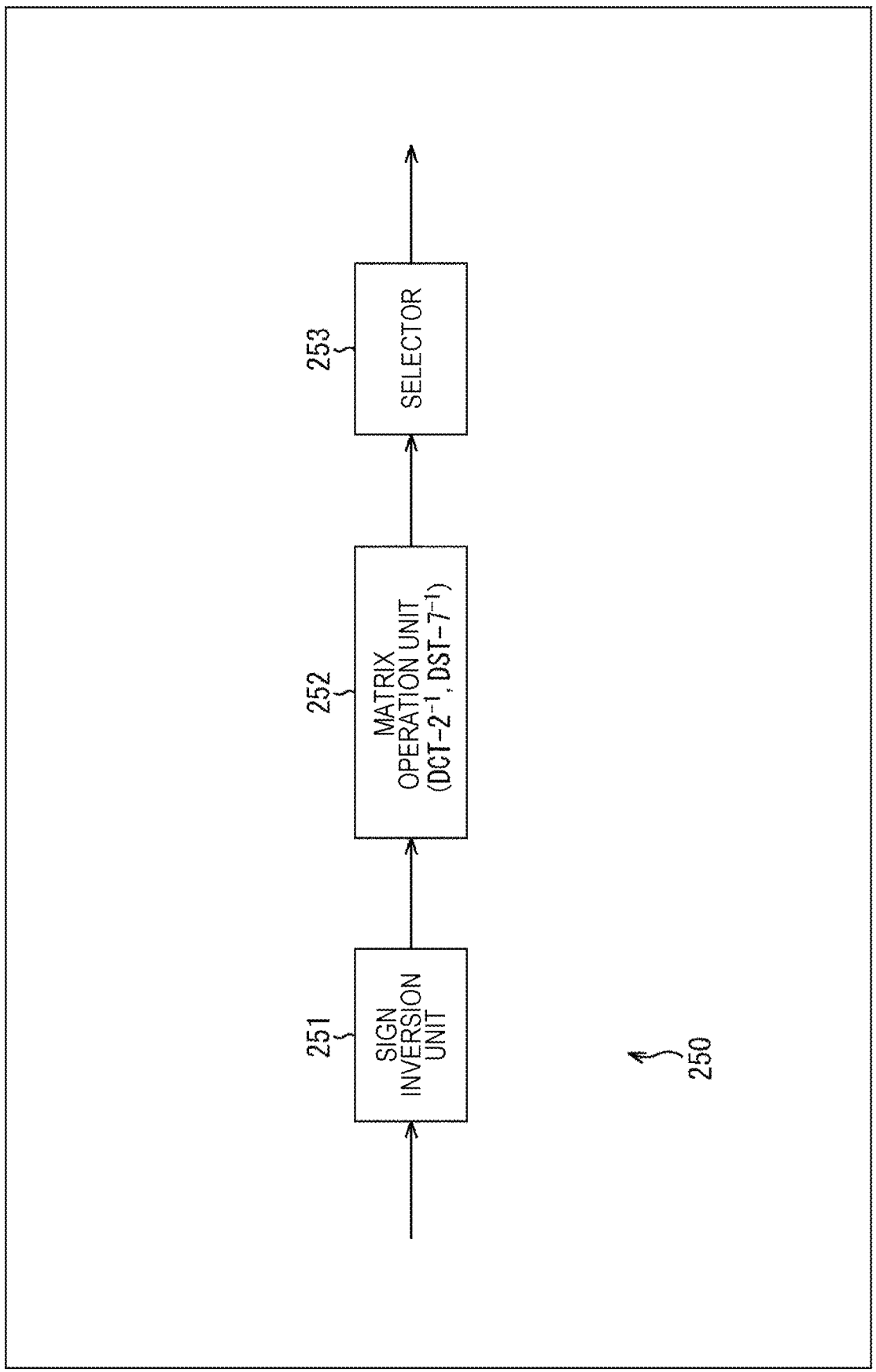
FIG. 16 is a block diagram illustrating a main configuration example of inverse one-dimensional orthogonal transform device.

FIG. 16 is a block diagram illustrating an example of a configuration of an inverse one-dimensional orthogonal transform device that is an aspect of an image processing device to which the present technology is applied. An inverse one-dimensional orthogonal transform device 250 illustrated in FIG. 16 is a device that performs inverse one-dimensional orthogonal transform of transform coefficients. As illustrated in FIG. 16, the inverse one-dimensional orthogonal transform device 250 includes a sign inversion unit 251, a matrix operation unit 252, and a selector 253.

The sign inversion unit 251 inverts a sign of odd-numbered signals in the input signals X[n] and supplies the input signals X[n] to the matrix operation unit 252. Furthermore, the sign inversion unit 251 can supply the input signals X[n] as they are to the matrix operation unit 252 without inverting a sign of each of the signals in the input signals X[n]. That is, the sign inversion unit 251 can select whether or not to perform sign inversion as described above on the input signals X[n] in the matrix operation unit 252.

The sign inversion unit 251 performs the selection on the basis of the sign inversion flag bSign that is flag information for controlling the selection. The sign inversion flag bSign is derived on the basis of a parameter related to inverse orthogonal transform.

The matrix operation unit 252 performs matrix operation of inverse one-dimensional orthogonal transform on input signals X[n]. For example, the matrix operation unit 252 can perform matrix operation of inverse one-dimensional orthogonal transform corresponding to $DST-7^{-1}$ and matrix operation of inverse one-dimensional orthogonal transform corresponding to $DCT-2^{-1}$. The matrix operation unit 252 performs matrix operation of inverse one-dimensional orthogonal transform corresponding to a parameter such as a transform type trType, a transform size nTbS, or an enabled transform size nonZeroS. That is, the matrix operation unit 252 selects any one of the above-described matrix operations on the basis of these parameters, and executes the matrix operation.

The selector 253 performs processing related to control of a data path of output signals x[n] in the matrix operation unit 252. For example, the selector 253 selects either a data path of output signals x[n] in a forward direction or a data path of the output signals x[n] in the reverse direction. The data path in the forward direction is, for example, a data path that outputs output signals x[n] in the matrix operation unit 252, which are arranged in order of n=0 to n=N−1, to outside of the inverse one-dimensional orthogonal transform device 250, without changing the order. The data path in the reverse direction is, for example, a data path that outputs output signals x[n] in the matrix operation unit 252, which are arranged in order of n=0 to n=N−1, to outside of the inverse one-dimensional orthogonal transform device 250, by rearranging the order into n=N−1 to n=0 (that is, in the reverse order). That is, the output signals x[n] in the matrix operation unit 252 are output to outside of the inverse one-dimensional orthogonal transform device 250 via either the data path in the forward direction or the data path in the reverse direction, whichever is selected by the selector 253.

The selector 253 performs the selection on the basis of a flip flag bFlip that is flag information for controlling the selection. The flip flag bFlip is derived on the basis of a parameter related to inverse orthogonal transform.

<Flow of Inverse One-Dimensional Orthogonal Transform Processing>

Figure 18:
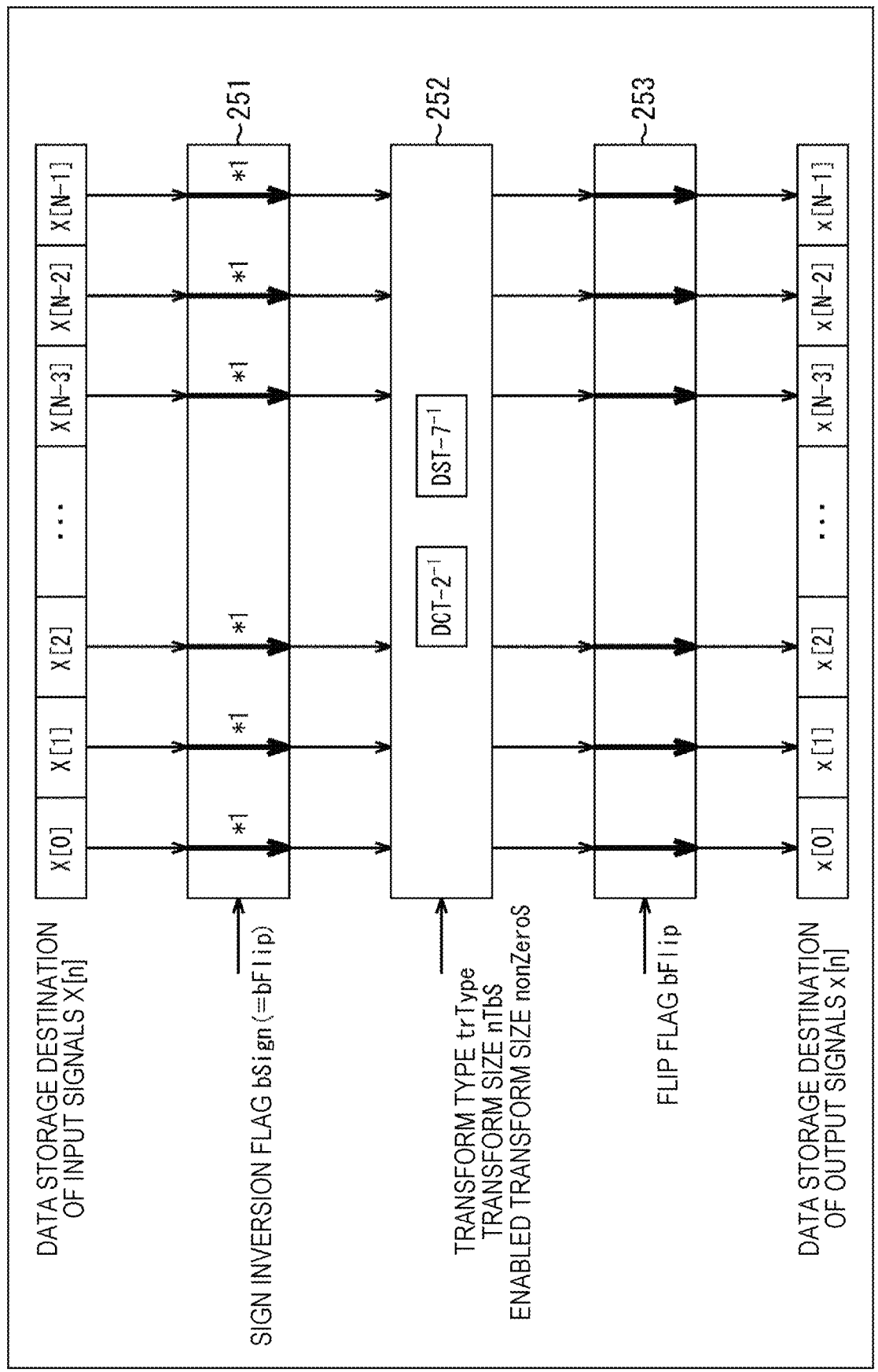
FIG. 18 is a diagram describing an example of a state of inverse one-dimensional orthogonal transform.
Figure 19:
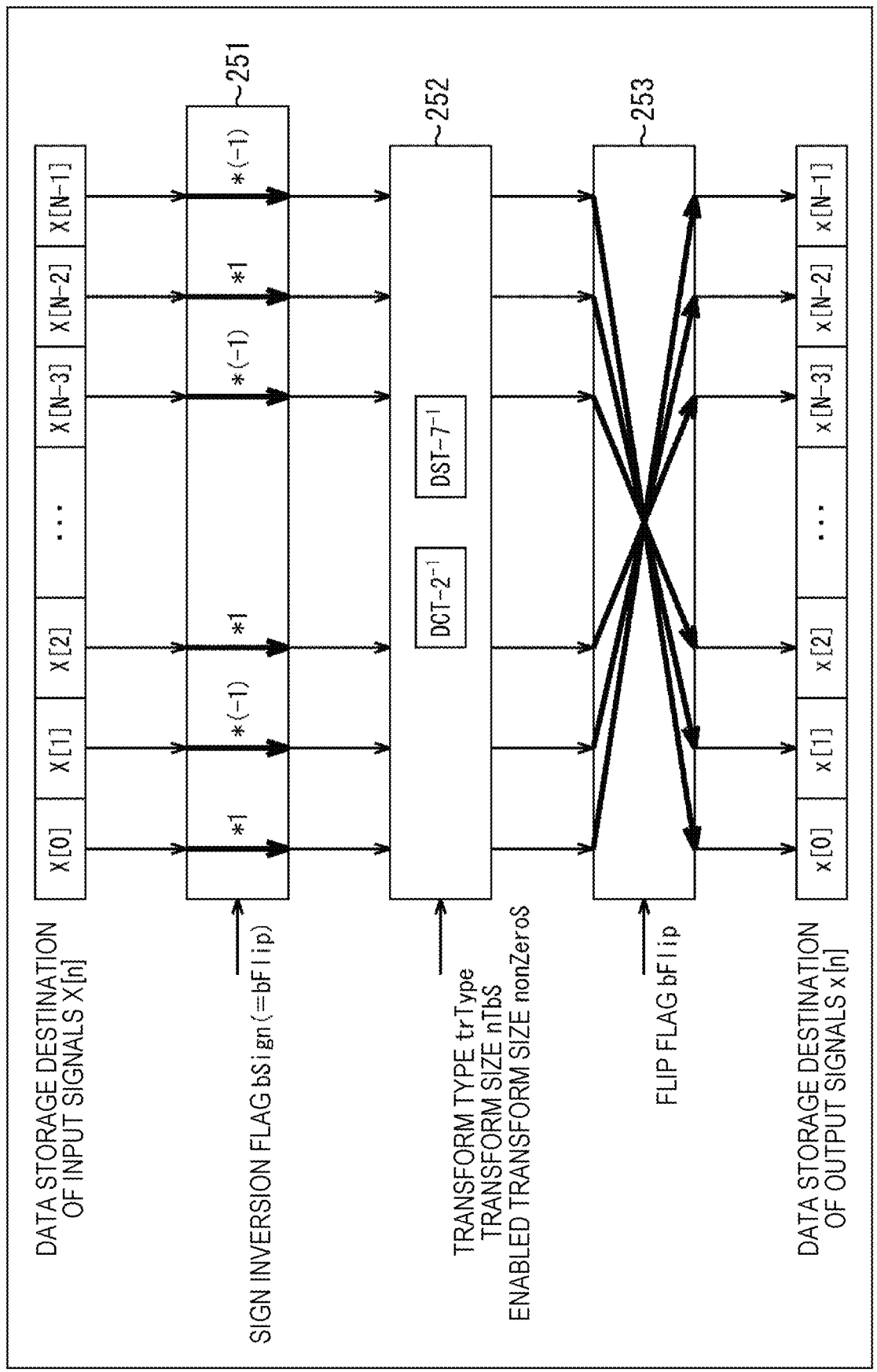
FIG. 19 is a diagram describing an example of a state of inverse one-dimensional orthogonal transform.

An example of a flow of inverse one-dimensional orthogonal transform processing executed by the inverse one-dimensional orthogonal transform device 250 will be described with reference to a flowchart in FIG. 17. Furthermore, as necessary, description will be made with reference to FIGS. 18 and 19.

In step S251, when inverse one-dimensional orthogonal transform processing is started, the matrix operation unit 252 switches to inverse orthogonal transform corresponding to a transform type trType, a transform size nTbS, and an enabled transform size nonZeroS. That is, on the basis of these parameters, the matrix operation unit 252 selects a type (for example, either $DST-7^{-1}$ or $DCT-2^{-1}$) of inverse one-dimensional orthogonal transform to be executed.

In step S252, the sign inversion unit 251 decides whether or not the supplied sign inversion flag bSign is false. In a case where it is decided that the sign inversion flag is false (False), the sign inversion unit 251 supplies the input signals X[n] to the matrix operation unit 252 without performing sign inversion as in the example in FIG. 18. That is, in a case where it is decided in step S252 that the sign inversion flag is false (False), the processing proceeds to step S254.

Furthermore, in a case where it is decided in step S252 that the sign inversion flag is true (True), the processing proceeds to step S253.

In step S253, the sign inversion unit 251 performs sign inversion on the input signals X[n]. That is, the sign inversion unit 251 inverts signs (positive/negative) of odd-numbered signals in the input signals X[n], for example, as in the above-described Mathematical Formula (41) or the example in FIG. 19, and supplies the input signals X[n] to the matrix operation unit 252. When the processing in step S253 ends, the processing proceeds to step S254.

In step S254, the matrix operation unit 252 executes matrix operation of the input signals X[n] and the inverse orthogonal transform selected in step S251, and outputs output signals x[n]. That is, the matrix operation unit 252 performs matrix operation of inverse one-dimensional orthogonal transform of $DST-7^{-1}$ or $DCT-2^{-1}$.

In step S255, the selector 253 decides whether or not a supplied flip flag bFlip is false. In a case where it is decided that the flip flag is false (False), the processing proceeds to step S256.

In this case, the selector 253 selects a data path in the forward direction. That is, in step S256, the selector 253 enables the data path in the forward direction and disables the data path in the reverse direction. With this selection, without being flipped, the output signals x[n] are output to outside of the inverse one-dimensional orthogonal transform device 250 in that order as in the example in FIG. 18. When the data path selection ends, the inverse one-dimensional orthogonal transform processing ends.

Furthermore, in a case where it is decided in step S255 that the flip flag is true (True) (not false), the processing proceeds to step S257.

In this case, the selector 253 selects the data path in the reverse direction. That is, in step S257, the selector 253 enables the data path in the reverse direction and disables the data path in the forward direction. With this selection, being flipped, the output signals x[n] are output to outside of the inverse one-dimensional orthogonal transform device 250 in that order as in the example in FIG. 19. When the data path selection ends, the inverse one-dimensional orthogonal transform processing ends.

For example, by the matrix operation unit 252 performing matrix operation of one-dimensional orthogonal transform of $DST-7^{-1}$ (which may be $DCT-2^{-1}$), it is possible to reduce an increase in processing delay (the number of cycles) or in circuit size in hardware implementation of a processing unit that performs one-dimensional orthogonal transform of $DCT-8^{-1}$ (Mathematical Formula (29)) described above in <Concept 2>, for example. Furthermore, it is possible to achieve coding efficiency equivalent to coding efficiency of a case where matrix operation of inverse one-dimensional orthogonal transform of $DCT-8^{-1}$ is performed.

4. Third Embodiment

<Parameter Derivation Device>

Figure 20:
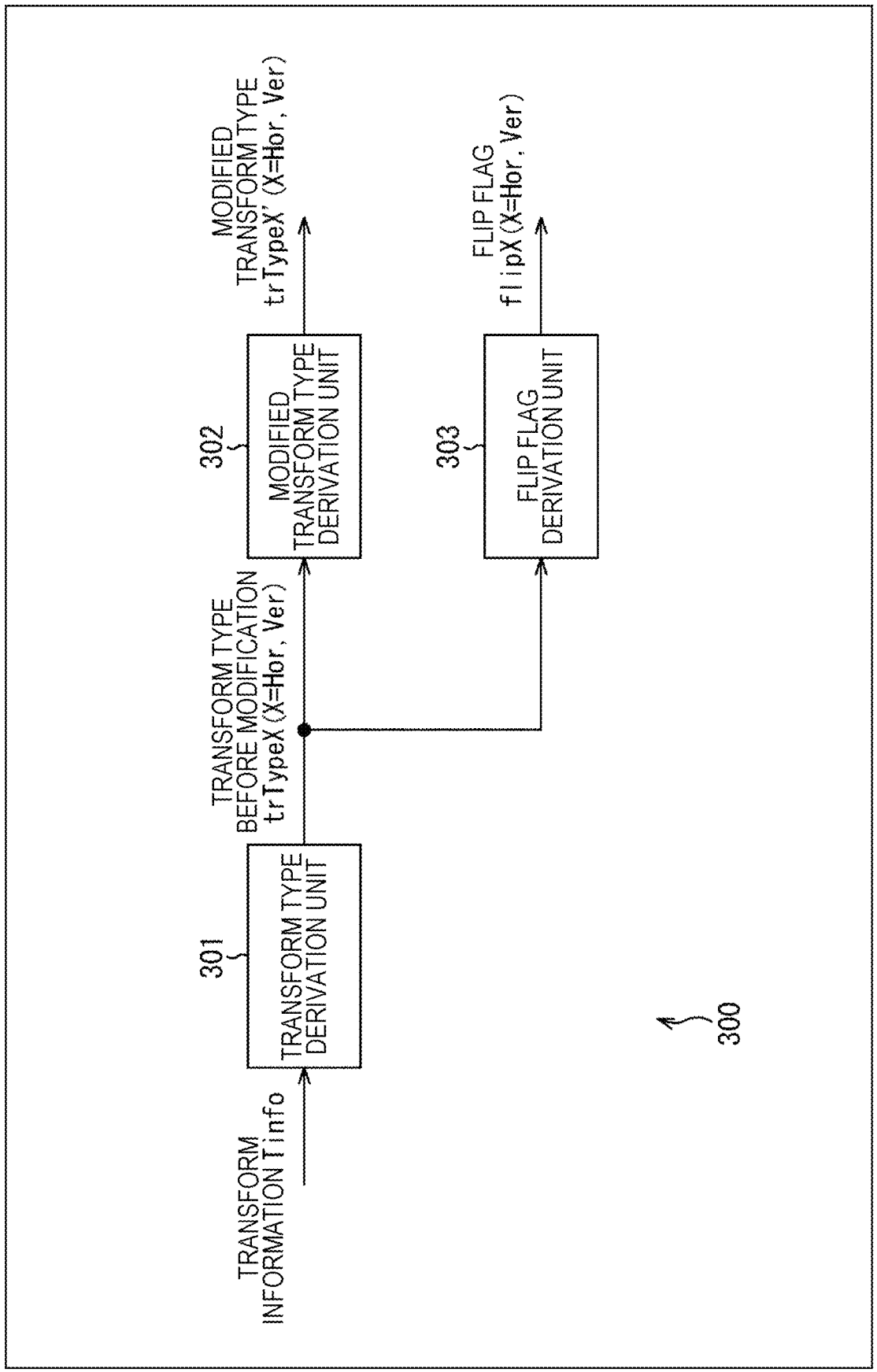
FIG. 20 is a block diagram illustrating a main configuration example of a parameter derivation device.

FIG. 20 is a block diagram illustrating an example of a configuration of a parameter derivation device that is an aspect of an image processing device to which the present technology is applied. A parameter derivation device 300 illustrated in FIG. 20 is a device that performs processing related to derivation of a parameter used in the one-dimensional orthogonal transform device 100, the inverse one-dimensional orthogonal transform device 150, the one-dimensional orthogonal transform device 200, the inverse one-dimensional orthogonal transform device 250, or the like described above. The parameter derivation device 300 derives, for example, a parameter for incorporating one-dimensional transform skip (IDT) into a framework of adaptive orthogonal transform (MTS). For example, the parameter derivation device 300 may derive, as the parameter, a modified transform type trTypeX' (X=Hor, Ver) or a flip flag bFlipX (X=Hor, Ver) by using a transform type trTypeX (X=Hor, Ver) derived from transform information Tinfo that is information regarding orthogonal transform.

As illustrated in FIG. 20, the parameter derivation device 300 includes a transform type derivation unit 301, a modified transform type derivation unit 302, and a flip flag derivation unit 303.

The transform type derivation unit 301 derives a transform type trTypeX (X=Hor, Ver) by using transform information Tinfo. The modified transform type derivation unit 302 derives a modified transform type trTypeX' (X=Hor, Ver) by using the transform type trTypeX. The flip flag derivation unit 303 derives a flip flag bFlipX (X=Hor, Ver) by using the transform type trTypeX.

<Flow of Parameter Derivation Processing>

An example of a flow of parameter derivation processing performed by the parameter derivation device 300 will be described with reference to a flowchart in FIG. 20.

In step S301, when parameter derivation processing is started, the transform type derivation unit 301 derives a transform type trTypeX on the basis of transform information Tinfo. The transform type derivation unit 301 refers to, for example, information such as a transform skip flag transformSkipFlag, a parameter necessary for deriving a transform types trTypeHor and trTypeVer of one-dimensional transform in the horizontal direction/vertical direction, an MTS enabled flag mts_enabled_flag, an intra explicit MTS enabled flag explicit_mts_intra_enabled_flag, an inter explicit MTS enabled flag explicit_mts_inter_enabled_flag, SBT mode information (including an on/off flag related to Sub-block Transform "SBT flag sbt_flag" and SBT partition information (sbt_auad_flag, sbt_pos_flag, sbt_horizontal_flag)), ISP mode information (an on/off flag related to Intra Sub-Partition "an ISP flag intra_subpartions_mode_flag (also referred to as isp_flag)", ISP partition information (intra_subpartitions_split_flag)), a transform block size (width nTbW, height nTbH (log 2TbW, log 2TbH in a case of logarithmic values with base 2)), coordinates of the transform block (xTbY, yTbY), a color component identifier cIdx (or compID), or an intra-prediction mode predModeIntra, and derives a transform type trTypeX on the basis of these values.

For example, in a case of the method described in Non-Patent Document 6, the transform type derivation unit 301 derives the transform type trTypeX as a pseudo code 321 in FIG. 22. Note that a parameter implicitMtsEnabled is derived as, for example, a pseudo code 322 in FIG. 22.

In step S302, the modified transform type derivation unit 302 derives a modified transform type trTypeX' by using the transform type trTypeX derived in step S301.

For example, as in a pseudo code 323 illustrated in FIG. 23, the modified transform type derivation unit 302 can replace a transform type corresponding to DCT-8 with IDT with reference to the transform type trTypeX derived in step S301, a CU prediction type cuPredMode, and the block size. Furthermore, for example, as in a pseudo code 324 illustrated in FIG. 24, the modified transform type derivation unit 302 can replace a transform type corresponding to FlipDST-7 with IDT with reference to the transform type trTypeX derived in step S301, a CU prediction type cuPredMode, and the block size.

In step S303, the flip flag derivation unit 303 derives a flip flag bFlipX (X=Hor, Ver) by using the transform type trTypeX derived in step S301.

When the processing in step S303 ends, the parameter derivation processing ends.

By performing the parameter derivation processing as described above, the parameter derivation device 300 can incorporate one-dimensional transform skip (IDT) by the one-dimensional orthogonal transform device 100 or the inverse one-dimensional orthogonal transform device 150 into the framework of adaptive orthogonal transform (MTS).

<Restriction on Flipping>

The parameter derivation device 300 can disable rearrangement processing (data-path switching) of one-dimensional input signals (or one-dimensional output signals) in a case where the two-dimensional transform skip is not performed for example, and can enable rearrangement processing (data-path switching) of the one-dimensional input signals (or the one-dimensional output signals) only in a case where two-dimensional transform skip is performed.

For example, as in a pseudo code 331 in FIG. 25, in a case where a transform skip flag transform skip flag is false, the flip flag bFlipX (X=Hor, Ver) may be set to false (=0). Furthermore, in a case where the transform skip flag transform_skip_flag is true, the flip flag bFlipX may be set on the basis of cuPredMode, residual rearrangement, or the like, as in the pseudo code 331 in FIG. 25.

Note that implicitMtsEnabled or the transform type may be set as in, for example, a pseudo code 332 in FIG. 26.

The parameter derivation device 300 described above may be one device in combination with the above-described one-dimensional orthogonal transform device 100, inverse one-dimensional orthogonal transform device 150, one-dimensional orthogonal transform device 200, and inverse one-dimensional orthogonal transform device 250. That is, a parameter derived by the parameter derivation device 300 may be utilized by these devices.

5. Fourth Embodiment

<Image Coding Device>

The present technology described above can be applied to an arbitrary apparatus, device, system, or the like. For example, the present technology can be applied to an image coding device that codes image data.

Figure 27:
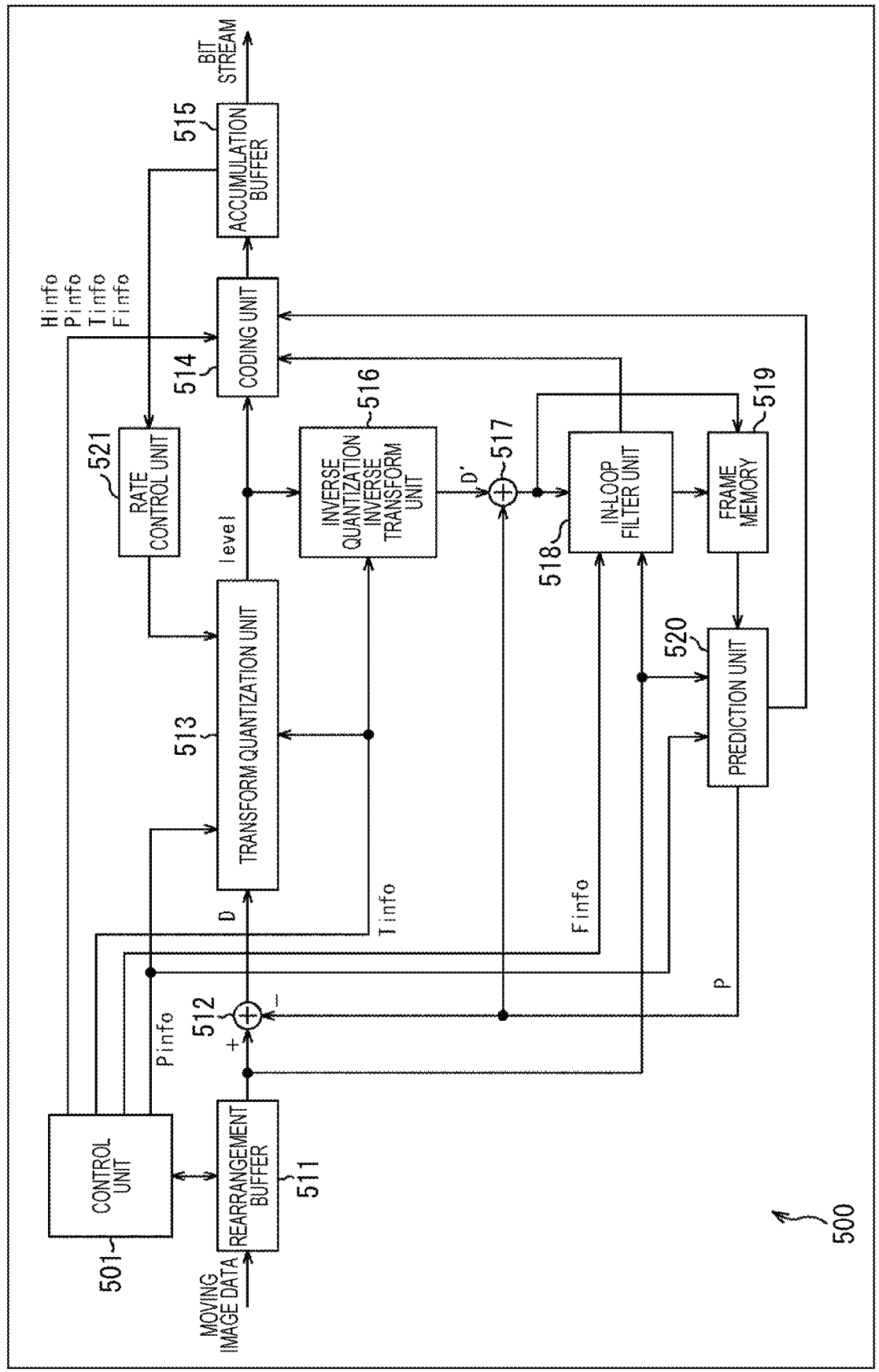
FIG. 27 is a block diagram illustrating a main configuration example of an image coding device.

FIG. 27 is a block diagram illustrating an example of a configuration of an image coding device that is an aspect of an image processing device to which the present technology is applied. An image coding device 500 illustrated in FIG. 27 is a device that codes image data of moving images. For example, the image coding device 500 codes image data of moving images with a coding method that may configure a rectangular block, such as VVC described in Non-Patent Document 6.

Note that FIG. 27 illustrates a main configuration including processing units, data flows, and the like, and the processing units and data flows illustrated in FIG. 27 are not necessarily all. That is, in the image coding device 500, there may be a processing unit not illustrated as a block in FIG. 27, or there may be processing or data flow not illustrated as an arrow, or the like, in FIG. 27. A similar applies to another drawing describing a processing unit and the like in the image coding device 500.

As illustrated in FIG. 27, the image coding device 500 includes a control unit 501, a rearrangement buffer 511, a calculation unit 512, a transform quantization unit 513, a coding unit 514, and an accumulation buffer 515. Furthermore, the image coding device 500 includes an inverse quantization inverse transform unit 516, a calculation unit 517, an in-loop filter unit 518, a frame memory 519, a prediction unit 520, and a rate control unit 521.

<Control Unit>

The control unit 501 partitions moving image data held by the rearrangement buffer 511 into blocks (CU, PU, transform block, or the like) in units of processing on the basis of outside or a previously specified block size in units of processing. Furthermore, the control unit 501 determines a coding parameter (header information Hinfo, prediction mode information Pinfo, transform information Tinfo, filter information Finfo, or the like) to be supplied to each of blocks on the basis of, for example, rate-distortion optimization (RDO). For example, the control unit 501 can set a transform skip flag or the like.

Details of these coding parameters will be described later. When determining the coding parameters as described above, the control unit 501 supplies the coding parameters to each of the blocks. Specifically, details are as follows.

Header information Hinfo is supplied to each of the blocks. Prediction mode information Pinfo is supplied to the coding unit 514 and the prediction unit 520. Transform information Tinfo is supplied to the coding unit 514, the transform quantization unit 513, and the inverse quantization inverse transform unit 516. Filter information Finfo is supplied to the in-loop filter unit 518.

<Rearrangement Buffer>

Each of fields (input images) of moving image data is input to the image coding device 500 in order of regeneration (order of display) thereof. The rearrangement buffer 511 acquires and holds (stores) each of the input images in order of regeneration (order of display) thereof. The rearrangement buffer 511 rearranges the input images in order of coding (order of decoding) or partitions the input images into blocks in units of processing on the basis of control by the control unit 501. The rearrangement buffer 511 supplies each of the processed input images to the calculation unit 512.

<Calculation Unit>

The calculation unit 512 derives residual data by subtracting predicted images P supplied by the prediction unit 520 from images that are corresponding to blocks in units of processing and are supplied from the rearrangement buffer 511, and supplies the residual data D to the transform quantization unit 513.

<Transform Quantization Unit>

The transform quantization unit 513 performs processing related to orthogonal transform and quantization. For example, the transform quantization unit 513 can derive transform coefficients Coeff by acquiring residual data supplied from the calculation unit 512 and performing orthogonal transform on the residual data. Furthermore, the transform quantization unit 513 can derive quantization coefficients level by scaling (quantizing) the transform coefficients Coeff. Moreover, the transform quantization unit 513 can supply the quantization coefficients level to the coding unit 514 and the inverse quantization inverse transform unit 516.

Note that the transform quantization unit 513 can acquire the prediction mode information Pinfo or transform information Tinfo supplied from the control unit 501 and perform processing such as orthogonal transform or quantization on the basis of the information. Furthermore, a rate of quantization performed by the transform quantization unit 513 is controlled by the rate control unit 521.

<Coding Unit>

The coding unit 514 receives input of quantization coefficients level supplied from the transform quantization unit 513, various kinds of coding parameters (header information Hinfo, prediction mode information Pinfo, transform information Tinfo, filter information Finfo, or the like) supplied from the control unit 501, information regarding filtering, such as a filter coefficients, supplied from the in-loop filter unit 518, and information regarding an optimum prediction mode supplied from the prediction unit 520.

The coding unit 514 performs entropy coding (lossless coding), such as context-based adaptive binary arithmetic code (CABAC) or context-based adaptive variable length code (CAVLC) for example, on quantization coefficients level to generate a bit string (coded data).

Furthermore, the coding unit 514 derives residual information Rinfo from the quantization coefficients level, and codes the residual information Rinfo to generates a bit string.

Moreover, the coding unit 514 includes, in filter information Finfo, information regarding filtering supplied from the in-loop filter unit 518 and includes, in prediction mode information Pinfo, information regarding an optimum prediction mode supplied from the prediction unit 520. Then, the coding unit 514 codes the above-described various kinds of coding parameters (header information Hinfo, prediction mode information Pinfo, transform information Tinfo, filter information Finfo, or the like) to generate a bit string.

Furthermore, the coding unit 514 multiplexes bit strings of various kinds of information, which are generated as described above, to generate coded data. The coding unit 514 supplies the coded data to the accumulation buffer 515.

<Accumulation Buffer>

The accumulation buffer 515 temporarily holds coded data obtained by the coding unit 514. At a predetermined timing, the accumulation buffer 515 outputs held coded data as, for example, a bit stream or the like, to outside of the image coding device 500. For example, the coded data is transmitted to a decoding side via an arbitrary recording medium, an arbitrary transmission medium, an arbitrary information processing device, or the like. That is, the accumulation buffer 515 is also a transmission unit that transmits coded data (bit stream).

<Inverse Quantization Inverse Transform Unit>

The inverse quantization inverse transform unit 516 performs processing related to inverse quantization and inverse orthogonal transform. For example, the inverse quantization inverse transform unit 516 receives input of quantization coefficients level supplied from the transform quantization unit 513 and transform information Tinfo supplied from the control unit 501, and scales (inversely quantizes) a value of the quantization coefficients level on the basis of the transform information Tinfo. Note that the inverse quantization is inverse processing of quantization performed in the transform quantization unit 513. Furthermore, the inverse quantization inverse transform unit 516 performs inverse orthogonal transform on transform coefficients on the basis of transform coefficients Coeff_IQ and transform information Tinfo, which are obtained by such inverse quantization, and derives residual data D'. Note that the inverse orthogonal transform is inverse processing of orthogonal transform performed in the transform quantization unit 513. The inverse quantization inverse transform unit 516 supplies the obtained residual data D' to the calculation unit 517.

<Calculation Unit>

The calculation unit 517 receives input of residual data D' supplied from the inverse quantization inverse transform unit 516 and predicted images P supplied from the prediction unit 520. The calculation unit 517 adds the residual data D' to predicted images corresponding to the residual data D' and derives locally decoded images. The calculation unit 517 supplies the derived locally decoded images to the in-loop filter unit 518 and the frame memory 519.

<In-Loop Filter Unit>

The in-loop filter unit 518 performs processing related to in-loop filter processing. For example, the in-loop filter unit 518 receives input of the locally decoded images supplied from the calculation unit 517, filter information Finfo supplied from the control unit 501, and input images (original images) supplied from the rearrangement buffer 511. Note that arbitrary information may be input to the in-loop filter unit 518, and information other than these pieces of information may be input. For example, a prediction mode, movement information, a coding amount target value, a quantization parameter QP, a picture type, information about a block (CU, CTU, or the like), or the like may be input to the in-loop filter unit 518, as necessary.

The in-loop filter unit 518 performs filter processing on the locally decoded images as appropriate on the basis of the filter information Finfo. The in-loop filter unit 518 also uses an input image (original image) or other input information for the filter processing as necessary.

For example, the in-loop filter unit 518 can apply four in-loop filters, which are a bilateral filter, a deblocking filter (DeBlocking Filter (DBF)), an adaptive offset filter (Sample Adaptive Offset (SAO)), and an adaptive loop filter (Adaptive Loop Filter (ALF)) in this order. Note that which filters are applied in which order is arbitrary, and can be selected as appropriate.

Needless to say, filter processing performed by the in-loop filter unit 518 is arbitrary and is not limited to the above-described example. For example, the in-loop filter unit 518 may apply a wiener filter, or the like.

The in-loop filter unit 518 supplies the filtered locally decoded images to the frame memory 519. Note that, for example, in a case where information regarding filtering such as filter coefficients are transmitted to the decoding side, the in-loop filter unit 518 supplies the information regarding filtering to the coding unit 514.

<Frame Memory>

The frame memory 519 performs processing related to storage of data related to an image. For example, the frame memory 519 receives input of the locally decoded images supplied from the calculation unit 517 or the filtered locally decoded images supplied from the in-loop filter unit 518, and holds (stores) the locally decoded images. Furthermore, the frame memory 519 reconstructs decoded images in units of pictures by using the locally decoded images, and holds (stores in a buffer in the frame memory 519) the reconstructed decoded images. The frame memory 519 supplies the decoded images (or a part thereof) to the prediction unit 520 in response to a request from the prediction unit 520.

<Prediction Unit>

The prediction unit 520 performs processing related to generation of predicted images. For example, the prediction unit 520 receives input of prediction mode information Pinfo supplied from the control unit 501, input images (original images) supplied from the rearrangement buffer 511, and decoded images (or a part thereof) read from the frame memory 519. The prediction unit 520 performs prediction processing such as inter-prediction or intra-prediction by using prediction mode information Pinfo or an input images (original images), performs prediction with reference to decoded images as reference images, and performs movement compensation processing on the basis of a result of the prediction to generate predicted images. The prediction unit 520 supplies the generated predicted images to the calculation unit 512 and the calculation unit 517. Furthermore, the prediction unit 520 supplies prediction information regarding a prediction mode selected by the above processing, that is, information regarding an optimum prediction mode, to the coding unit 514 as necessary.

<Rate Control Unit>

The rate control unit 521 performs processing related to rate control. For example, on the basis of a coding amount of coded data accumulated in the accumulation buffer 515, the rate control unit 521 controls a rate of quantization operation of the transform quantization unit 513 so that overflow or underflow does not occur.

<Transform Quantization Unit>

Figure 28:
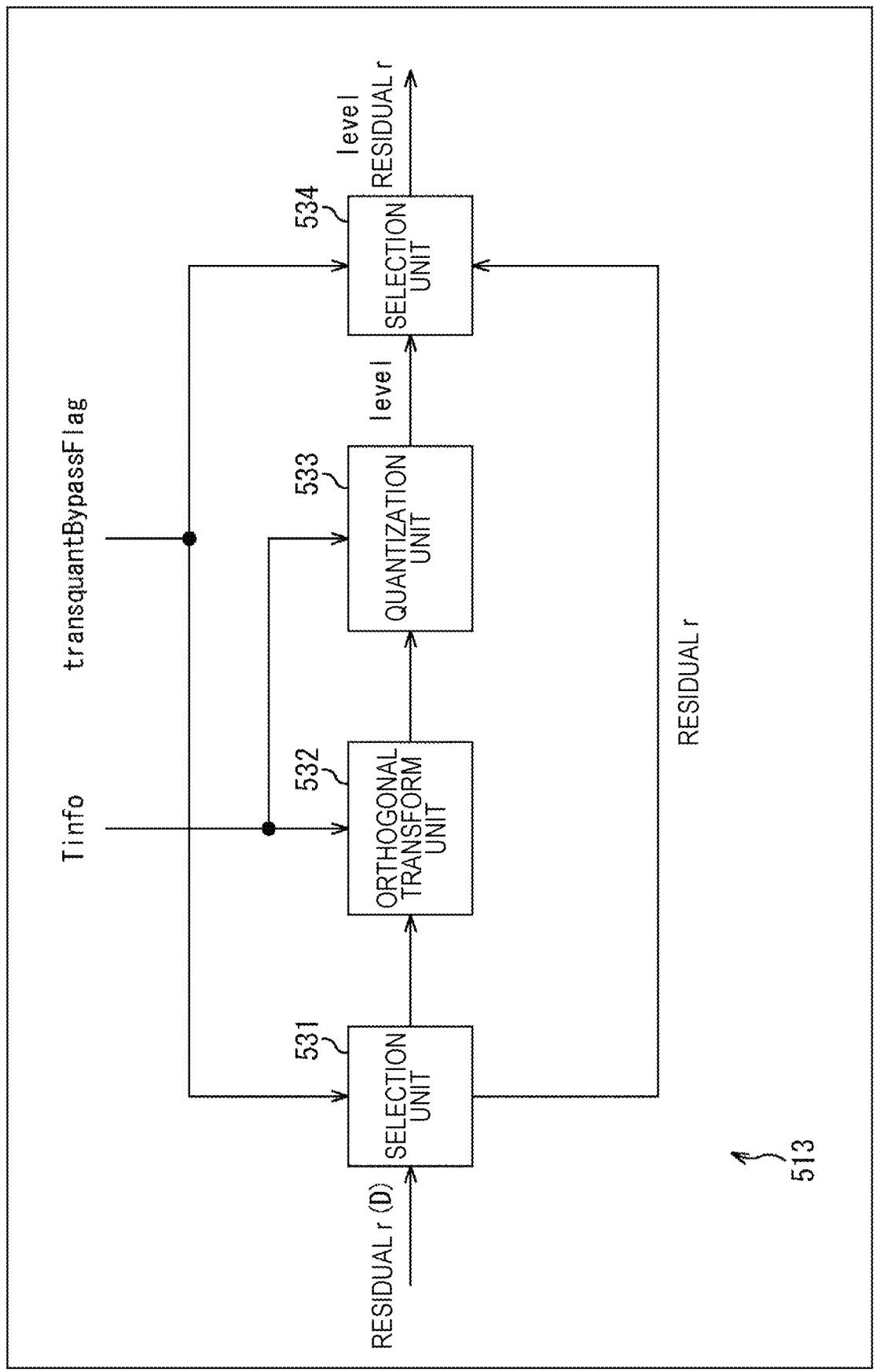
FIG. 28 is a block diagram illustrating a main configuration example of a transform quantization unit.

FIG. 28 is a block diagram illustrating a main configuration example of the transform quantization unit 513 in FIG. 27. As illustrated in FIG. 28, the transform quantization unit 513 includes a selection unit 531, an orthogonal transform unit 532, a quantization unit 533, and a selection unit 534.

The orthogonal transform unit 532 performs orthogonal transform on residual data r input via the selection unit 531 to generate transform coefficients. The orthogonal transform unit 532 supplies the transform coefficients to the quantization unit 533.

The quantization unit 533 quantizes the transform coefficients supplied from the orthogonal transform unit 532 to generate quantization coefficients level. The transform quantization unit 533 supplies the generated quantization coefficients level to the coding unit 514 or the inverse quantization inverse transform unit 516 (both in FIG. 27).

The selection unit 531 and the selection unit 534 select a supply source or supply destination of coefficient data on the basis of a transform quantization bypassing flag transquantBypassFlag, or the like. For example, in a case where transquantBypassFlag=0, the selection unit 531 supplies residual data r, which is input to the transform quantization unit 513, to the orthogonal transform unit 532. Furthermore, the selection unit 534 acquires quantization coefficients level supplied from the quantization unit 533, and supplies the quantization coefficients level to the coding unit 514 or the inverse quantization inverse transform unit 516.

Meanwhile, in a case where transquantBypassFlag=1, that is, in a case where orthogonal transform and quantization are skipped, the selection unit 531 supplies the residual data r, which is input to the transform quantization unit 513, to the selection unit 534. Furthermore, the selection unit 534 supplies residual data r' to the coding unit 514 or the inverse quantization inverse transform unit 516.

Note that it is assumed that the transform quantization bypassing flag (transQuantBypassFlag) is decoded/coded in units of CUs/TUs. Note that transformSkipFlag may be decoded/coded as a part of an MTS index (mts_idx).

<Orthogonal Transform Unit>

Figure 29:
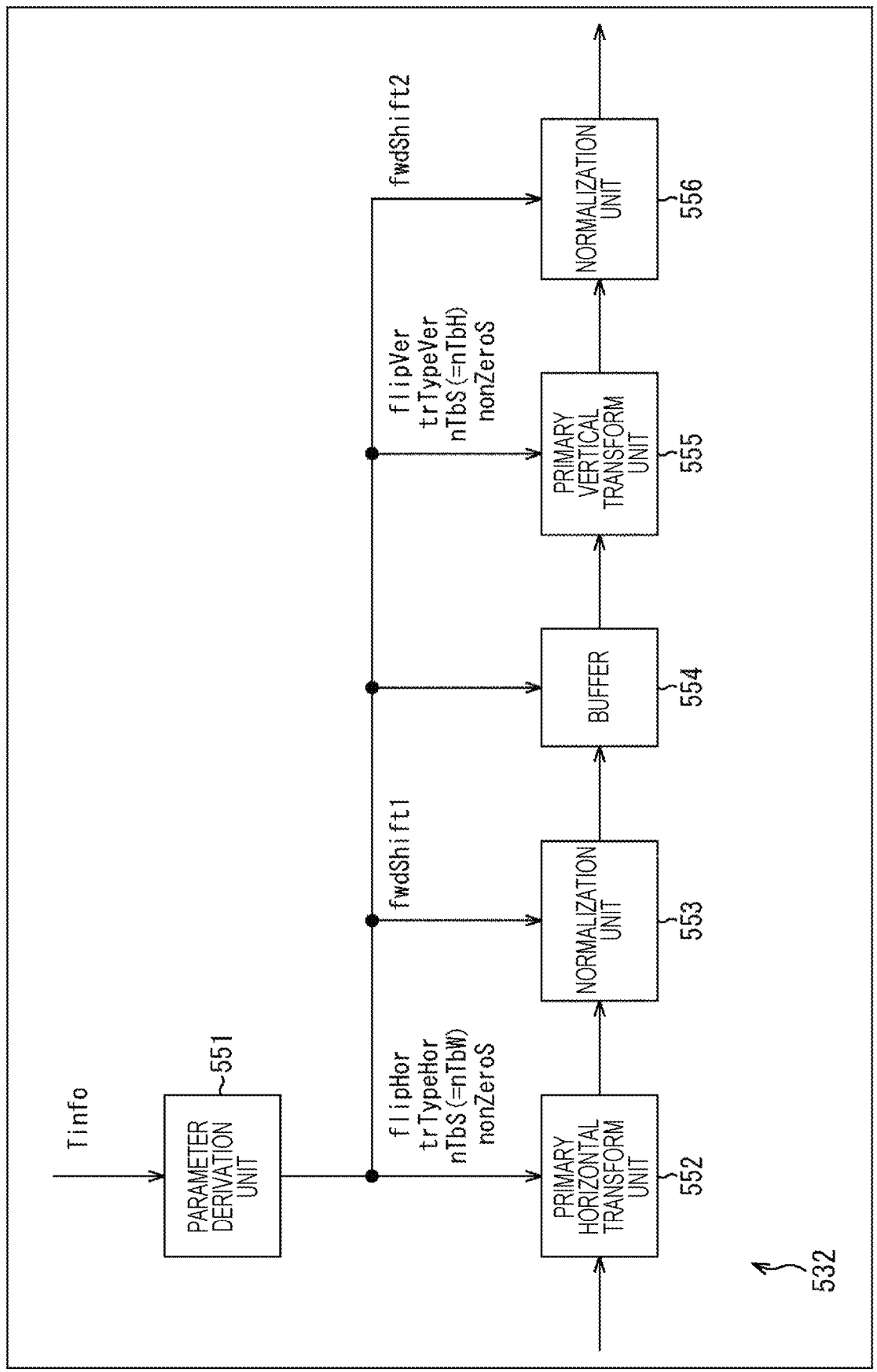
FIG. 29 is a block diagram illustrating a main configuration example of an orthogonal transform unit.

FIG. 29 is a block diagram illustrating a main configuration example of the orthogonal transform unit 532 in FIG. 28. As illustrated in FIG. 29, the orthogonal transform unit 532 includes a parameter derivation unit 551, a primary horizontal transform unit 552, a normalization unit 553, a buffer 554, a primary vertical transform unit 555, and a normalization unit 556.

The parameter derivation unit 551 performs processing related to derivation of a parameter related to orthogonal transform. For example, the parameter derivation unit 551 receives input of transform information Tinfo, and can derive various kinds of parameters related to orthogonal transform, such as a horizontal direction transform type trTypeHor, a vertical direction transform type trTypeVer, a horizontal direction flip flag flipHor, or a vertical direction flip flag flipVer. The parameter derivation unit 551 may supply a derived parameter to the primary horizontal transform unit 552, the normalization unit 553, the primary vertical transform unit 555, and the normalization unit 556.

The primary horizontal transform unit 552 performs processing related to primary horizontal transform that is one-dimensional transform in a horizontal direction. For example, the primary horizontal transform unit 552 receives input of transform information Tinfo such as a residual r, a modified transform type trTypeHor' and flip flag flipHor in the horizontal direction, a transform block size (nTbW, nTbH), a nonzero region size nonZeroS (=nonZeroW), or the like, performs primary horizontal transform on the residual r, and supplies obtained intermediate output signals tmp1 to the normalization unit 553.

The normalization unit 553 performs normalization processing on the intermediate output signals tmp1. For example, the normalization unit 553 receives input of the intermediate output signals tmp1 and a shift amount fwdShift1, normalizes (scales) the intermediate output signals tmp1 with the shift amount fwdShift1 as in the following Mathematical Formula (42), and supplies obtained normalized intermediate output signals tmp2 to the buffer 554.

$$tmp2[y][x]=(tmp1[y][x]+\text{offsetFwdShift1})\text{>>}\text{fwdShift1}$$

$$\text{offetFwdShift1}=1\text{<<}(\text{fwdShift1}-1)$$

$$(x=0,\ldots,nTbW-1, y=0,\ldots,nTbH-1) \quad (42)$$

The buffer 554 temporarily holds the intermediate output signals tmp2 supplied from the normalization unit 553, and supplies the intermediate output signals tmp2 to the primary vertical transform unit 555 at a predetermined timing or the like.

The primary vertical transform unit 555 performs processing related to primary vertical transform that is one-dimensional transform in a vertical direction. For example, the primary vertical transform unit 555 receives input of transform information Tinfo such as intermediate output signals tmp2, a modified transform type trTypeVer' in the vertical direction, a flip flag flipVer a transform block size (nTbW, nTbH), a nonzero region size nonZeroS(=nonZeroH), or the like, performs primary vertical transform on the intermediate output signals tmp2, and supplies obtained intermediate output signals tmp3 to the normalization unit 556.

The normalization unit 556 performs normalization processing on the intermediate output signals tmp3. For example, the normalization unit 556 receives input of the intermediate output signals tmp3 and a shift amount fwdShift2, normalizes (scales) the intermediate output signals tmp3 with the shift amount fwdShift2 as in the following Mathematical Formula (43), and supplies obtained transform coefficients coef to the quantization unit 533 (FIG. 28).

$$\text{coef}[y][x]=(tmp3[y][x]+\text{offsetFwdShift2})\text{>>}\text{fwdShift2}$$

$$\text{offsetFwdShift2}=1\text{<<}(\text{fwdShift2}-1)$$

$$(x=0,\ldots,nTbW-1, y=0,\ldots,nTbH-1) \quad (43)$$

In such an orthogonal transform unit 532, the above-described one-dimensional orthogonal transform device 100 or one-dimensional orthogonal transform device 200 may be applied as the primary horizontal transform unit 552. With this arrangement, the orthogonal transform unit 532 (that is, the image coding device 500) can perform one-dimensional orthogonal transform processing in primary horizontal transform as described in the first embodiment or second embodiment, and can obtain an effect described in the first embodiment or second embodiment. Therefore, the image coding device 500 can reduce an increase in processing delay in orthogonal transform processing or inverse orthogonal transform processing.

Similarly, in such an orthogonal transform unit 532, the above-described one-dimensional orthogonal transform device 100 or one-dimensional orthogonal transform device 200 may be applied as the primary vertical transform unit 555. With this arrangement, the orthogonal transform unit 532 (that is, the image coding device 500) can perform one-dimensional orthogonal transform processing in primary vertical transform as described in the first embodiment or second embodiment, and can obtain an effect described in the first embodiment or second embodiment. Therefore, the image coding device 500 can reduce an increase in processing delay in orthogonal transform processing or inverse orthogonal transform processing.

Needless to say, the above-described one-dimensional orthogonal transform device 100 or one-dimensional orthogonal transform device 200 may be applied to both the primary horizontal transform unit 552 and the primary vertical transform unit 555.

Furthermore, in such an orthogonal transform unit 532, the above-described parameter derivation device 300 may be applied as the parameter derivation unit 551. With this arrangement, the orthogonal transform unit 532 (that is, the image coding device 500) can derive various kinds of parameters as described in the third embodiment, and can obtain an effect described in the third embodiment. Therefore, the image coding device 500 can reduce an increase in processing delay in orthogonal transform processing or inverse orthogonal transform processing. Furthermore, the image coding device 500 can incorporate a one-dimensional transform skip (IDT) into a framework of adaptive orthogonal transform (MTS).

Furthermore, by applying the parameter derivation device 300, the parameter derivation unit 551 can derive an implicit MTS enabled flag implicitMtsEnabled as follows with reference to transform information Tinfo.

For example, in a case where an MTS enabled flag mtsEnabled is true (true) and at least one of the following conditions is satisfied, implictMtsEnabled=1 is set.
When not in an intra sub-block partition mode (ISP) (IntraSubPartitionSplitType==ISP_NO_SPLIT)
When in a sub-block transform mode (SBT) and a long side of a transform block is less than or equal to a predetermined threshold TH1 (=32)
(sbt_flag==true && Max(nTbW, nTbH)<=TH1)
When both an intra explicit MTS enabled flag explicitMtsIntraEnabled and an inter explicit MTS enabled flag explicitMtsInterEnabled are 0, and a CU type is intra-prediction
(explicitMtsIntraEnabled==true && explicitMtsInterEnabled==true && cuPredMode==MODE_INTRA)

In other cases, implicitMtsEnabled=0 is set.

Moreover, the parameter derivation unit 551 can derive a transform type trTypeX (X=Hor, Ver) as follows with reference to transform information Tinfo.
(1) When a color component identifier cIdx is greater than 0 (indicating a color difference)
trTypeHor=trTypeVer=0

(2) In a case other than (1), and when an implicit MTS enabled flag implicitMtsEnabled is true (true)

(2-1) When in an intra sub-block partition mode (isp_flag==true (intraSubPartition!=ISP_NO_SPLIT))

According to the definition in Table 8-15, a transform type trTypeX (X=Hor, Ver) is set depending on an intra-prediction mode intraPredMode.

(2-2) When in a sub-block transform mode (sbt_flag==true)

According to the definition in Table 8-14, a transform type trTypeX (X=Hor, Ver) is set corresponding to SBT mode information (sbt_horizontal_flag, sbt_pos_flag).

(2-3) In a case other than (2-1) or (2-2) (explicitMtsIntraEnabled==false && explicitMtsInterEnabled)

trTypeHor=(nTbW>=4 && nTbW<=16 && nTbW<=nTbH) ? 1:0
trTypeVer=(nTbH>=4 && nTbH<=16 && nTbH<=nTbW) ? 1:0

That is, when the transform block size is 4×4 or more and 16×16 or less, orthogonal transform applied to a long side of the transform block is DST-7, and orthogonal transform applied to a short side of the transform block is DCT-2.

(3) In a case other than (1) or (2)

According to the definition in Table 8-13, a transform type trTypeX (X=Hor, Ver) is set on the basis of an MTS identifier mtsIdx.

Furthermore, by applying the parameter derivation device 300, the parameter derivation unit 551 can derive a modified transform type trTypeX' or a flip flag flipX (X=Hor, Ver) as follows, from a transform type trTypeX (X=Hor, Ver) derived as described above.

When trTypeX==0 (DCT-2),
trTypeX'=trTypeX (=0)
flipX=0
When trTypeX==1 (DST-7),
trTypeX'=trTypeX (=1) 1
flipX=0
When trTypeX==2 (FlipDST-7),
trTypeX'=1
flipX=1

Note that the modified transform type trTypeX' and the flip flag flipX can also be set by the following calculation.

$$trTypeX'=(trTypeX \,\&\&\, 0x01)(X=Hor,Ver) \quad (M1)$$

$$flipX=(trTypeX \,\&\&\, 0x10)\!>\!>\!1(X=Hor,Ver) \quad (M2)$$

That is, a most significant 1 bit of the transform type trTypeX before modification corresponds to a flag value related to flip control, and a least significant 1 bit of the transform type trTypeX before the modification corresponds to a flag value indicating DCT-2 or DST-7.

Furthermore, the parameter derivation unit 551 can derive variables nonZeroW and nonZeroH related to a nonzero region size as in the following Mathematical Formulas (44) and (45).

$$nonZeroW=Min(nTbW,(trTypeHor>0)?16:32) \quad (44)$$

$$nonZeroH=Min(nTbH,(trTypeVer>0)?16:32) \quad (45)$$

The parameter derivation unit 551 derives the shift amount fwdShift1 used for normalization after primary horizontal transform, the shift amount fwdShift2 used after primary vertical transform or after expansion of residual while transform skip, and a shift amount fwdTsShift used for expansion of a residual of transform skip.

The shift amount fwdShift1 is set to a value on the basis of a width size (log 2TbW) of a transform block, a bit depth bitDepth, a parameter trShift (=6) representing integer approximation accuracy of a transform matrix, and a parameter dynamicRange (=15) related to a range of the transform coefficients, as in the following Mathematical Formula (46).

$$fwdShift1=\log 2TbW+bitDepth+trShift+1-dynamicRange \quad 46)$$

The shift amount fwdShift2 is set to a value on the basis of a height size (log 2TbH) of a transform block and a parameter trMatShift (=6) representing integer approximation accuracy of a transform matrix, as in the following Mathematical Formula (47).

$$fwdShift2=\log 2TbH+trShift+1 \quad (47)$$

The shift amount fwdTsShift is set to a value on the basis of a parameter dynamicRange (=15) related to the range of the transform coefficients, a bit depth bitDepth, and a transform block size (log 2TbW, log 2TbH), as in the following Mathematical Formula (48).

$$fwdTsShift=dynamicRange-bitDepth-((\log 2TbH+\log 2TbH)\!>\!>\!1) \quad (48)$$

<Flow of Image Coding Processing>

Next, a flow of each processing executed by the image coding device 500 as described above will be described. First, an example of a flow of image coding processing will be described with reference to a flowchart in FIG. 30.

In step S501, when image coding processing is started, the rearrangement buffer 511 is controlled by the control unit 501 to rearrange an order of frames of input moving image data from the order of display to the order of coding.

In step S502, the control unit 501 sets units of processing (performs block partition) for the input images held by the rearrangement buffer 511.

In step S503, the control unit 501 determines (sets) a coding parameter for the input images held by the rearrangement buffer 511.

In step S504, the prediction unit 520 performs prediction processing to generate predicted images, or the like, in an optimum prediction mode. For example, in the prediction processing, the prediction unit 520 performs intra-prediction to generate predicted images or the like in an optimum intra-prediction mode, performs inter-prediction to generate a predicted image or the like in an optimum inter-prediction mode, and selects an optimum prediction mode from among the prediction modes on the basis of a cost function value or the like.

In step S505, the calculation unit 512 calculates a difference between the input images and the predicted images in the optimum mode selected by the prediction processing in step S504. That is, the calculation unit 512 generates residual data D between the input images and the predicted images. A data amount of the residual data D obtained in this manner is reduced as compared to original image data. Therefore, the data amount can be compressed as compared to a case where an image is coded as is.

In step S506, the transform quantization unit 513 performs transform quantization processing on the residual data D generated by the processing in step S505 according to transform information Tinfo or the like generated in step S503.

In step S507, the inverse quantization inverse transform unit 516 performs inverse quantization inverse transform processing. The inverse quantization inverse transform processing is inverse processing of the transform quantization processing in step S506, and similar processing is executed also on a decoding side (image decoding device 600) to be described later.

Therefore, the inverse quantization inverse transform processing will be described when the decoding side (image decoding device 600) is described. Then, the description can be applied to the inverse quantization inverse transform processing (step S507). With the processing, the inverse quantization inverse transform unit 516 performs inverse quantization or inverse orthogonal transform on input coefficient data (quantization coefficients level) as appropriate to generate residual data D'. The inverse quantization inverse transform unit 516 supplies the residual data D' to the calculation unit 517.

In step S508, the calculation unit 517 adds the predicted images obtained by the prediction processing in step S504 to the residual data D' derived by the inverse quantization inverse transform processing in step S507, thereby generating locally decoded images.

In step S509, the in-loop filter unit 518 performs in-loop filter processing on the locally decoded images derived by the processing in step S508.

In step S510, the frame memory 519 stores the locally decoded images derived by the processing in step S508 or the filtered locally decoded images in step S509.

In step S511, the coding unit 514 codes the quantization coefficients level obtained by the processing in step S506 or transform mode information generated in step S503. For example, the coding unit 514 codes the quantization coefficients level, which is information regarding an image, with arithmetic coding or the like to generate coded data. Furthermore, at this time, the coding unit 514 codes various kinds of coding parameters (header information Hinfo, prediction mode information Pinfo, and transform information Tinfo). Moreover, the coding unit 514 derives residual information RInfo from the quantization coefficients level, and codes the residual information RInfo.

In step S512, the accumulation buffer 515 accumulates the coded data obtained in this manner, and outputs the coded data to outside of the image coding device 500 as, for example, a bit stream. The bit stream is transmitted to the decoding side via a transmission line or a recording medium, for example.

In step S512, the rate control unit 521 performs rate control as necessary. When the processing in step S512 ends, the image coding processing ends.

<Flow of Transform Quantization Processing>

Next, an example of a flow of transform quantization processing executed in step S506 in FIG. 30 will be described with reference to a flowchart in FIG. 31.

In step S531, when transform quantization processing is started, the selection unit 531 and the selection unit 534 decide whether or not to perform transform quantization bypassing. In a case where it is decided that transform quantization bypassing is not to be performed (that is, in a case where transquantBypassFlag==0), the processing proceeds to step S532.

In step S532, the orthogonal transform unit 532 performs orthogonal transform on residual data r by performing orthogonal transform processing to generates transform coefficients.

In step S533, the quantization unit 533 performs quantization on the transform coefficients generated in step S532 to generate quantization coefficients level.

Figure 30:
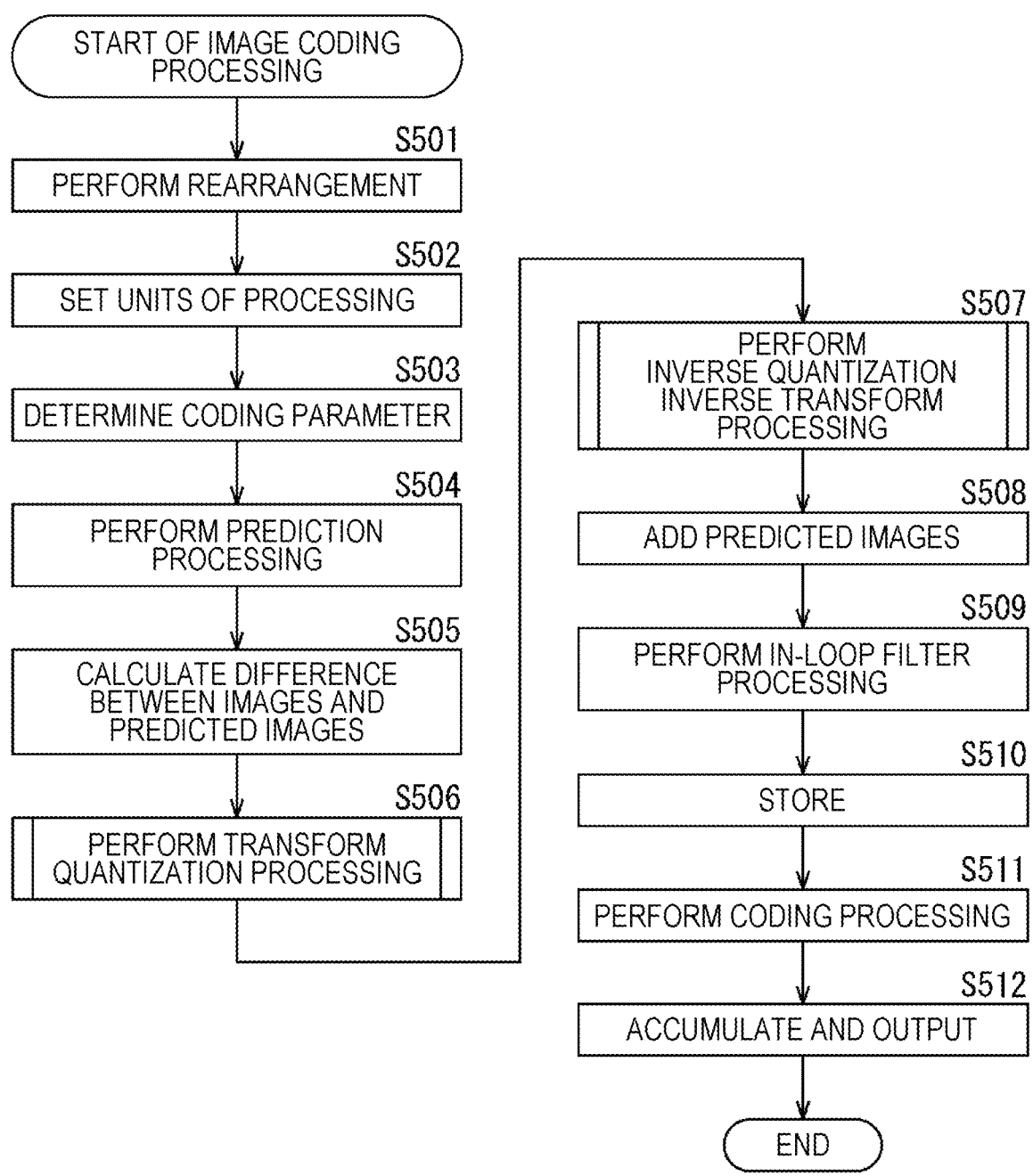
FIG. 30 is a flowchart illustrating an example of a flow of image coding processing.

When the processing in step S533 ends, the transform quantization processing ends, and the processing returns to FIG. 30.

Furthermore, in a case where it is decided that transform quantization bypassing is to be performed (that is, in a case where transquantBypassFlag==1) in step S531, the transform quantization processing ends, and the processing returns to FIG. 30.

<Flow of Orthogonal Transform Processing>

Next, an example of a flow of the orthogonal transform processing executed in step S532 in FIG. 31 will be described with reference to a flowchart in FIG. 32.

In step S551, when orthogonal transform processing is started, the parameter derivation unit 551 decides whether or not a transform skip flag (transform_skip_flag) is false. In a case where it is decided that the transform skip flag is false (=0), the processing proceeds to step S552.

In step S552, from the transform information Tinfo, the parameter derivation unit 551 derives a modified transform type in each direction (trTypeHor', trTypeVer') and a flip flag (flipHor, flipVer) in each direction.

In step S553, the parameter derivation unit 551 derives a shift amount in each direction (fwdShift1, fwdShift2).

In step S554, the primary horizontal transform unit 552 sets a one-dimensional signal array of a residual signals resi in the horizontal direction resi[y][n] (n=0, ..., nTbW−1) as input signals x[n] (n=0, ..., nTbW−1), performs one-dimensional orthogonal transform in the horizontal direction on x[n], and derives the intermediate output signals tmp1[y][n] (n=0, ..., nSb) (y=0, ..., nTbH−1).

In step S555, the normalization unit 553 normalizes each of coefficients (x=0, ..., nTbW−1, y=0, ..., nTbH−1) of the intermediate output signals tmp1[y][n] with a primary horizontal transform shift amount fwdShift1 as in the above-described Mathematical Formula (42), and derives the intermediate output signals tmp2. In step S556, the buffer 554 holds the intermediate output signals tmp2.

In step S557, the primary vertical transform unit 555 reads the intermediate output signals tmp2 from the buffer 554, sets a one-dimensional output sequence of the intermediate output signals tmp2 in the vertical direction tmp2[n][x] (n=0, ..., nTbH−1) as input signals x[n] (n=0, ..., nTbH−1), performs one-dimensional orthogonal transform in the vertical direction on x[n], and derives intermediate output signals tmp3 [n][x] (n=0, ..., nTbH−1) (x=0, ..., nTbW−1).

When the processing in step S557 ends, the processing proceeds to step S560.

Furthermore, in a case where it is decided in step S551 that the transform skip flag is true, the processing proceeds to step S558.

In step S558, the parameter derivation unit 551 derives a shift amount at two-dimensional transform skip (fwdTsShift, fwdShift2). In this case, the processing by the primary horizontal transform unit 552 and the primary vertical transform unit 555 is skipped. That is, the normalization unit 553 and the normalization unit 556 perform processing.

In step S559, the normalization unit 553 expands the residual signals resi[y][x] with the shift amount fwdTsShift as in the following Mathematical Formula (49), and outputs the residual signals as the intermediate output signals tmp2[y][x] (x=0, ..., nTbW−1, y=0, ..., nTbH−1). When the processing in step S559 ends, the processing proceeds to step S560.

$$tmp2[y][x]=resi[y][x]<<tsShift \qquad (49)$$

In step S560, the normalization unit 556 normalizes each of coefficients of the intermediate output signals tmp2[y][x]

with the shift amount fwdShift2 as in the following Mathematical Formula (50), and outputs the result as transform coefficients coef[y][x].

$$\text{coef}[y][x]=(tmp2[y][x]+\text{offsetFwdShift2})\!>\!>\!\text{fwdShift2} \quad (50)$$

Figure 31:
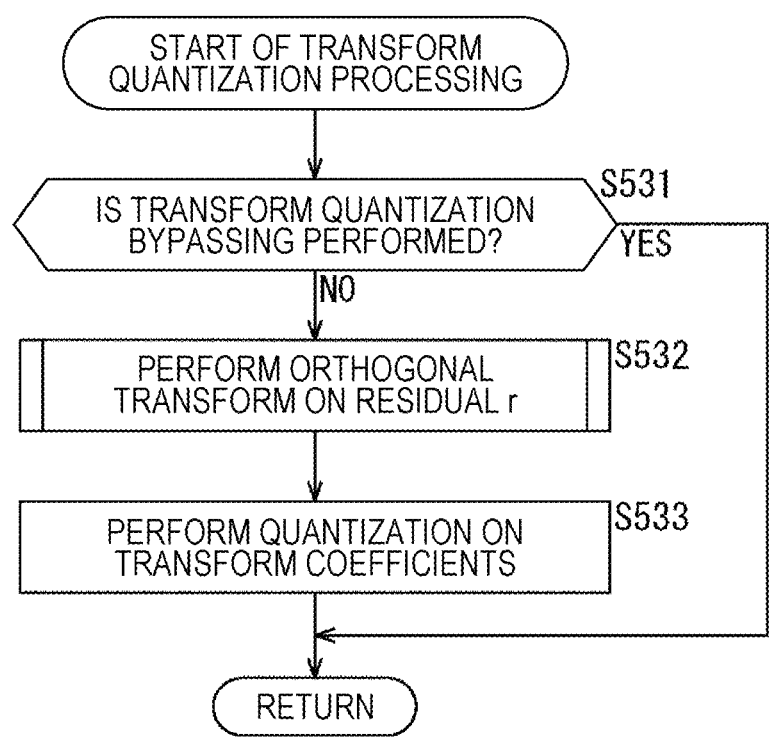
FIG. 31 is a flowchart describing an example of a flow of transform quantization processing.
Figure 32:
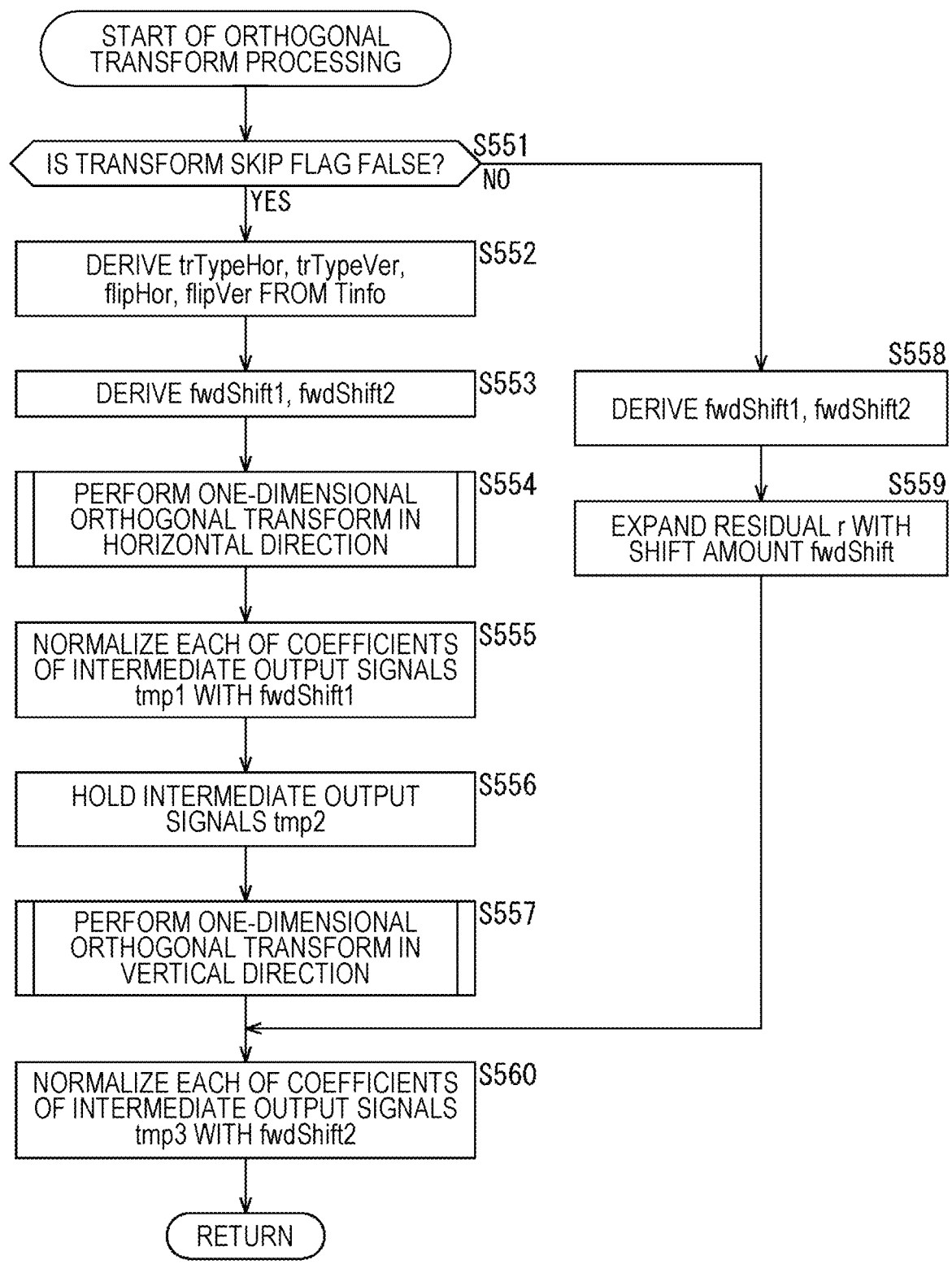
FIG. 32 is a flowchart describing an example of a flow of orthogonal transform processing.

When the processing in step S560 ends, the orthogonal transform processing ends, and the processing returns to FIG. 31.

Figure 5:
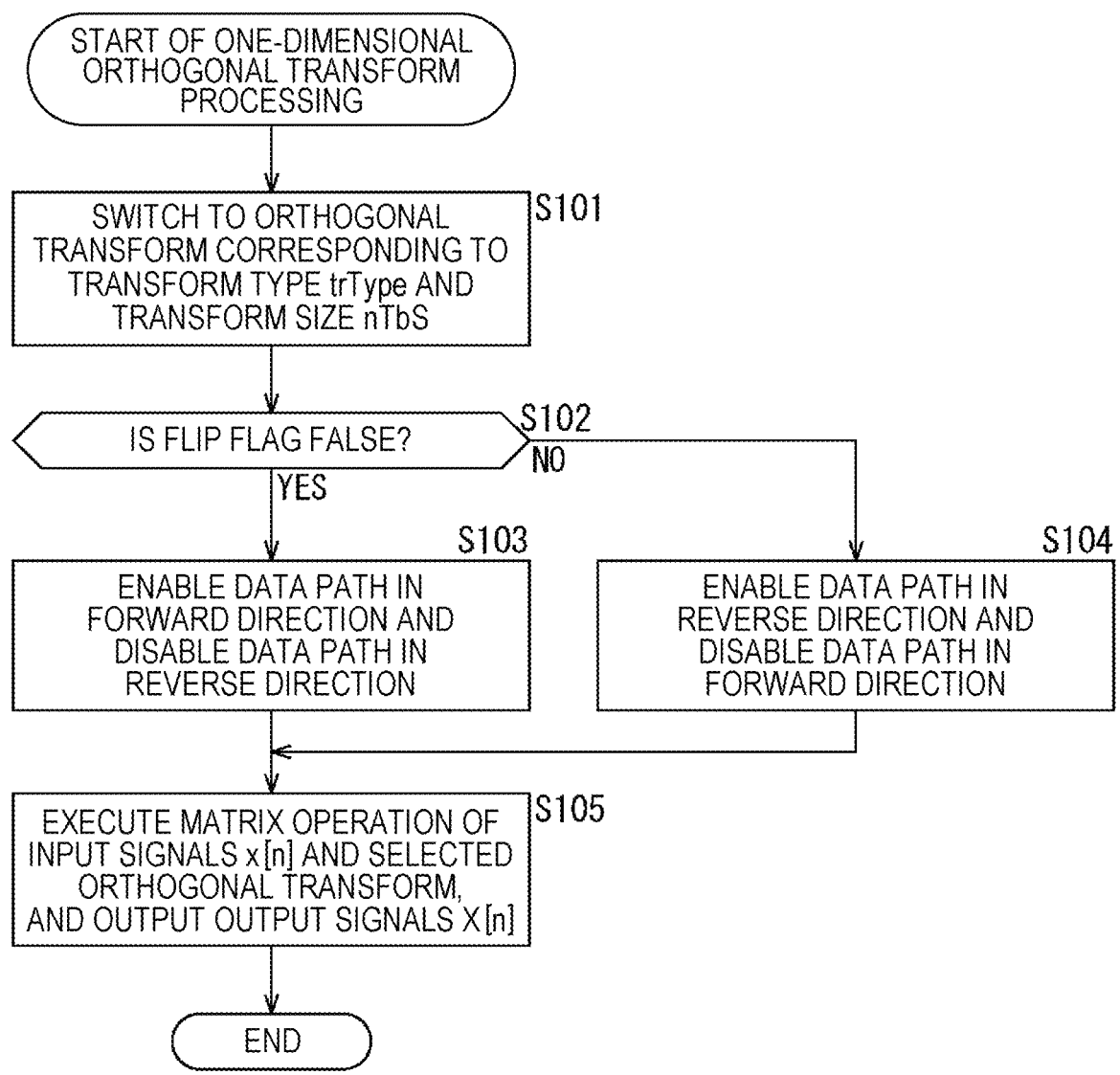
FIG. 5 is a flowchart describing an example of a flow of one-dimensional orthogonal transform processing.
Figure 13:
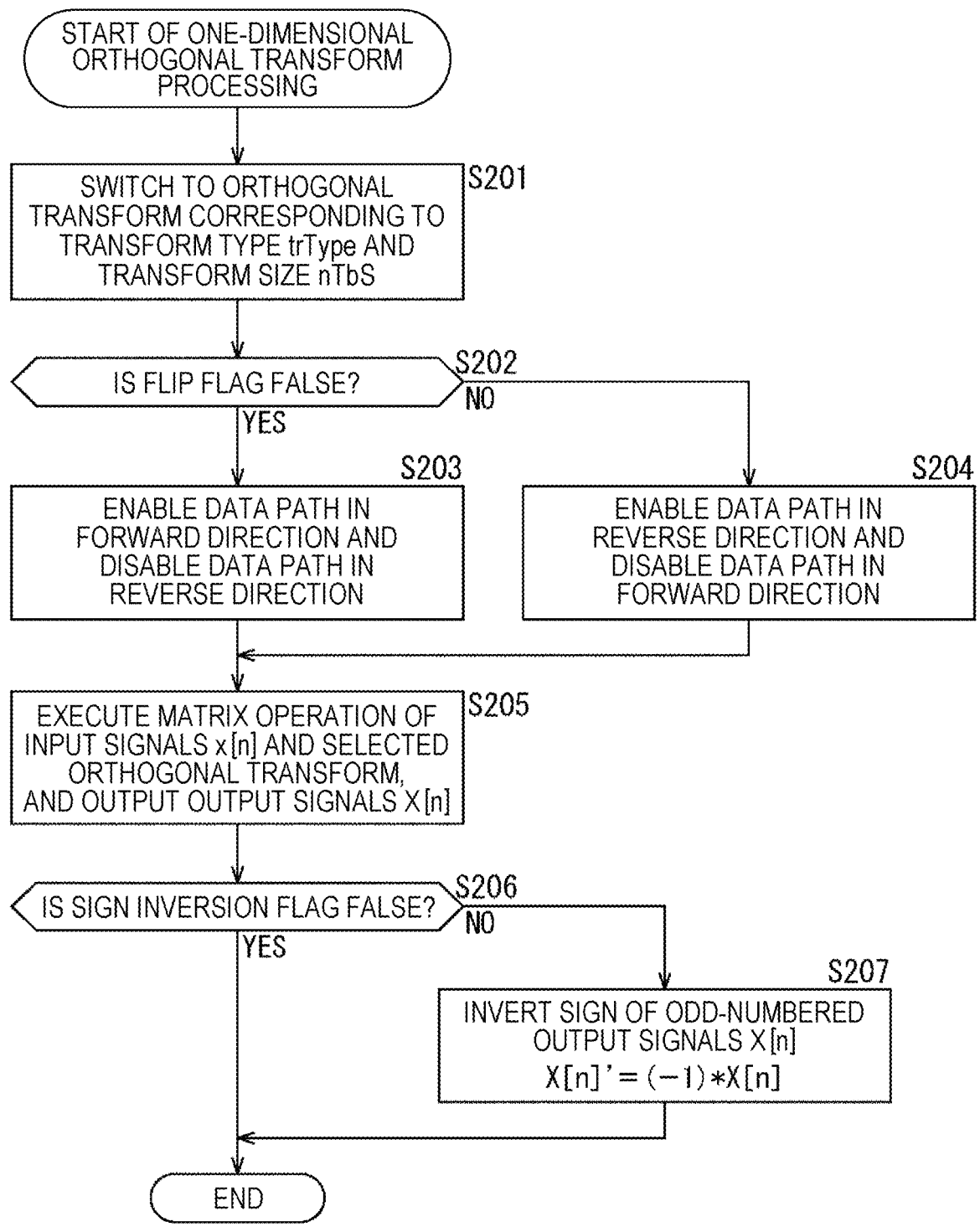
FIG. 13 is a flowchart describing an example of a flow of one-dimensional orthogonal transform processing.

In the orthogonal transform processing as described above, for example, the one-dimensional orthogonal transform processing illustrated in FIG. 5 or the one-dimensional orthogonal transform processing illustrated in FIG. 13 may be applied as one-dimensional orthogonal transform processing in the horizontal direction performed in step S554. With this arrangement, the orthogonal transform unit 532 (that is, the image coding device 500) can obtain, on primary horizontal transform, an effect described in the first embodiment or in the second embodiment. Therefore, the image coding device 500 can reduce an increase in processing delay in orthogonal transform processing or inverse orthogonal transform processing.

Furthermore, the one-dimensional orthogonal transform processing illustrated in FIG. 5 or the one-dimensional orthogonal transform processing illustrated in FIG. 13 may be applied as one-dimensional orthogonal transform processing in the vertical direction performed in step S557. With this arrangement, the orthogonal transform unit 532 (that is, the image coding device 500) can obtain, on primary vertical transform, an effect described in the first embodiment or in the second embodiment. Therefore, the image coding device 500 can reduce an increase in processing delay in orthogonal transform processing or inverse orthogonal transform processing.

Figure 21:
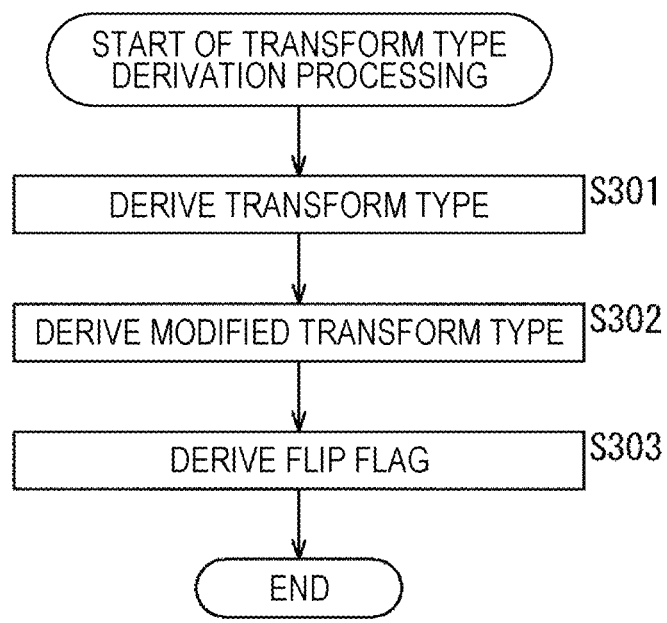
FIG. 21 is a flowchart describing an example of a flow of parameter derivation processing.

Furthermore, the parameter derivation processing illustrated in FIG. 21 may be applied as the parameter derivation processing performed in step S552. With this arrangement, the orthogonal transform unit 532 (that is, the image coding device 500) can obtain, on primary vertical transform, an effect described in the third embodiment. Therefore, the image coding device 500 can reduce an increase in processing delay in orthogonal transform processing or inverse orthogonal transform processing.

6. Fifth Embodiment

<Image Decoding Device>

Furthermore, the present technology described above can also be applied to an image decoding device that decodes coded data of image data.

Figure 33:
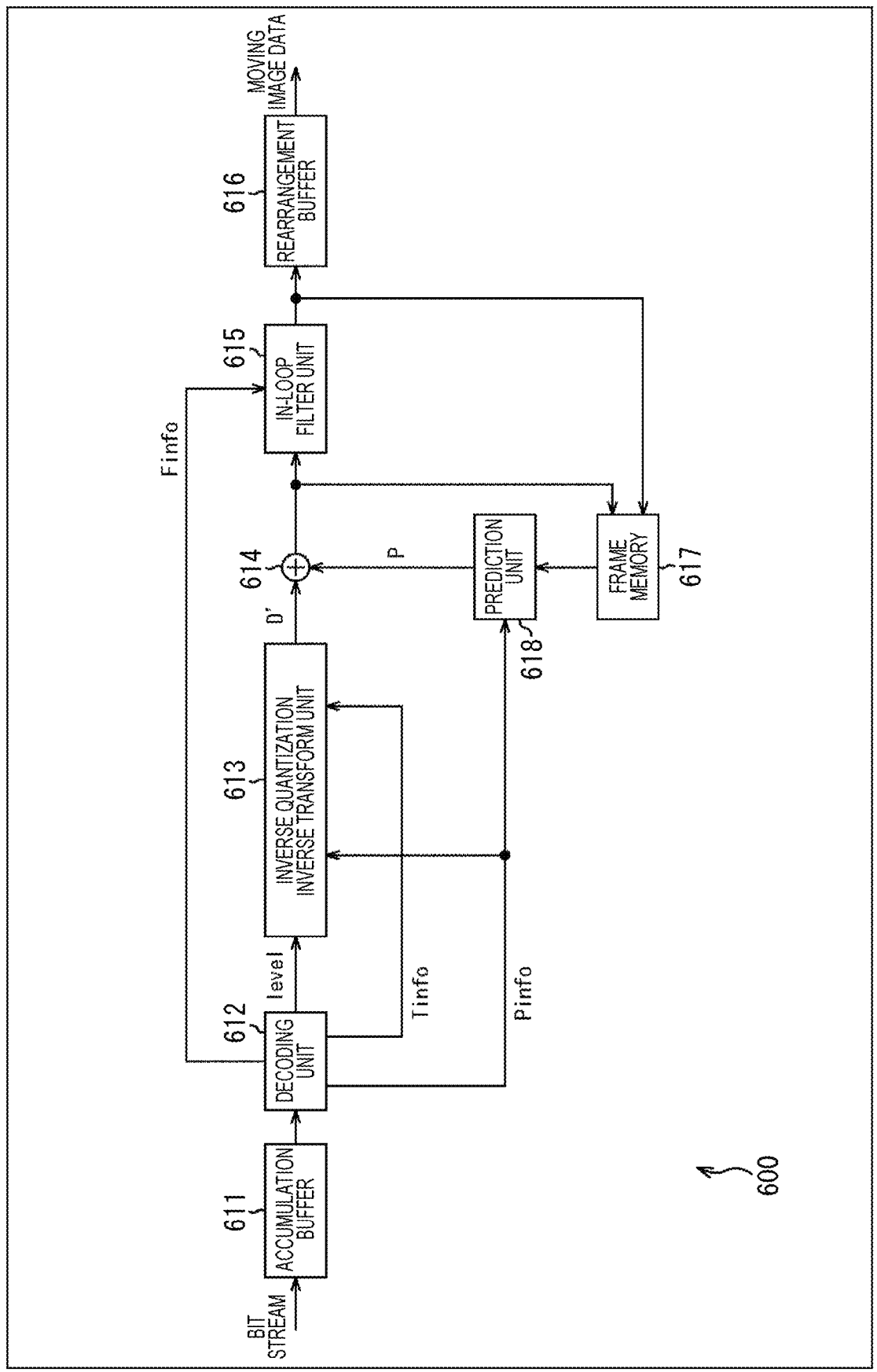
FIG. 33 is a block diagram illustrating a main configuration example of an image decoding device.

FIG. 33 is a block diagram illustrating an example of a configuration of an image decoding device that is an aspect of an image processing device to which the present technology is applied. The image decoding device 600 illustrated in FIG. 33 is a device that decodes coded data of moving images. For example, the image decoding device 600 decodes coded data of coded moving images with a coding method that may configure a rectangular block, such as VVC described in Non-Patent Document 6. For example, the image decoding device 600 can decode coded data (bit stream) generated by the above-described image coding device 500.

Note that FIG. 33 illustrates a main configuration including processing units, data flows, and the like, and the processing units and data flows illustrated in FIG. 33 are not necessarily all. That is, in the image decoding device 600, there may be a processing unit not illustrated as a block in FIG. 33, or there may be processing or data flow not illustrated as an arrow, or the like, in FIG. 33. A similar applies to another drawing describing a processing unit and the like in the image decoding device 600.

In FIG. 33, the image decoding device 600 includes an accumulation buffer 611, a decoding unit 612, an inverse quantization inverse transform unit 613, a calculation unit 614, an in-loop filter unit 615, a rearrangement buffer 616, a frame memory 617, and a prediction unit 618. Note that the prediction unit 618 includes an unillustrated intra-prediction unit and inter-prediction unit.

<Accumulation Buffer>

The accumulation buffer 611 acquires and holds (stores) a bit stream input to the image decoding device 600. At a predetermined timing or in a case such as in a case where a predetermined condition is satisfied, the accumulation buffer 611 extracts coded data included in accumulated bit streams and supplies the coded data to the decoding unit 612.

<Decoding Unit>

The decoding unit 612 performs processing related to image decoding. For example, the decoding unit 612 receives input of the coded data supplied from the accumulation buffer 611, performs entropy decoding (lossless decoding) on a syntax value of each of syntax elements from a bit string according to a definition of a syntax table, and derives a parameter.

Examples of parameters derived from a syntax element and syntax value of the syntax element include, for example, information such as header information Hinfo, prediction mode information Pinfo, transform information Tinfo, residual information Rinfo, and filter information Finfo. That is, the decoding unit 612 parses (analyzes and acquires) these pieces of information from a bit stream. These pieces of information will be described below.

<Header Information Hinfo>

The header information Hinfo includes, for example, header information such as Video Parameter Set (VPS)/Sequence ParameterSet (SPS)/Picture Parameter Set (PPS)/picture header (PH)/slice header (SH). The header information Hinfo includes, for example, information defining an image size (width PicWidth, height PicHeight), a bit depth (luminance bitDepthY, color difference bitDepthC), a chroma array type ChromaArrayType, a maximum value MaxCUSize/minimum value MinCUSize of CU size, a maximum depth MaxQTDepth/a minimum depth MinQTDepth of quadtree partitioning (also referred to as Quad-tree partitioning), a maximum depth MaxBTDepth/minimum depth MinBTDepth of binary tree partitioning (Binary-tree partitioning), a maximum value MaxTSSize of a transform skip block (also referred to as a maximum transform skip block size), an on/off flag (also referred to as an enabled flag) of each coding tool, and the like.

For example, as an on/off flag of a coding tool included in the header information Hinfo, there is an on/off flag related to the transform or quantization processing described below. Note that the on/off flag of the coding tool can also be interpreted as a flag indicating whether or not there is a syntax related to the coding tool in the coded data. Furthermore, in a case where a value of the on/off flag is 1 (true), it is indicated that the coding tool is usable, and in a case where the value of the on/off flag is 0 (false), it is indicated that the coding tool is not usable. Note that interpretation of the flag value may be reversed.

Cross-component prediction enabled flag (ccp_enabled_flag) is flag information indicating whether or not cross-component prediction (Cross-Component Prediction (CCP), also referred to as CC prediction) is usable. For example, in a case where the flag information is "1" (true), it is indicated that CCP is usable, and in a case where the flag information is "0" (false), it is indicated that CCP is not usable.

Note that the CCP is also referred to as cross-component linear prediction (CCLM or CCLMP).

<Prediction Mode Information Pinfo>

The prediction mode information Pinfo includes, for example, information such as size information PBSize (predicted block size) of processing target PB (predicted block), intra-prediction mode information IPinfo, and movement prediction information MVinfo.

The intra-prediction mode information IPinfo includes, for example, prev_intra_luma_pred_flag, mpm_idx, rem_intra_pred_mode in JCTVC-W1005, 7.3.8.5 Coding Unit syntax, a luminance intra-prediction mode IntraPredModeY derived from the syntax, or the like.

Furthermore, the intra-prediction mode information IPinfo includes, for example, a cross-component prediction flag (ccp_flag(cclmp_flag)), a multi-class linear prediction mode flag (mclm_flag), a chroma sample position type identifier (chroma_sample_loc_type_idx), a chroma MPM identifier (chroma_mpm_idx), a luminance intra-prediction mode (IntraPredModeC) derived from these syntaxes, or the like.

The cross-component prediction flag (ccp_flag(cclmp_flag)) is flag information indicating whether or not to apply cross-component linear prediction. For example, when ccp_flag==1, it is indicated that cross-component prediction is applied, and when ccp_flag==0, it is indicated that cross-component prediction is not applied.

The multi-class linear prediction mode flag (mclm_flag) is information regarding a mode of linear prediction (linear prediction mode information). More specifically, a multi-class linear prediction mode flag (mclm_flag) is flag information indicating whether or not a multi-class linear prediction mode is selected. For example, in a case of "0", it is indicated that a one-class mode (single-class mode) (for example, CCLMP) is selected, and in a case of "1", it is indicated that a two-class mode (multi-class mode) (for example, MCLMP) is selected.

The chroma sample position type identifier (chroma_sample_loc_type_idx) is an identifier that identifies a type of a pixel position of a chroma component (also referred to as a chroma sample position type).

Note that the chroma sample position type identifier (chroma_sample_loc_type_idx) is transmitted as (stored in) information regarding a pixel position of a chroma component (chroma_sample_loc_info( )).

The chroma MPM identifier (chroma_mpm_idx) is an identifier indicating which prediction mode candidate in a chroma intra-prediction mode candidate list (intraPredModeCandListC) is specified as a chroma intra-prediction mode.

The movement prediction information MVinfo includes, for example, merge_idx, merge_flag, inter_pred_idc, ref_idx_LX, mvp_lX_flag, X={0,1}, mvd and the like (refer to JCTVC-W1005, 7.3.8.6 Prediction Unit Syntax, for example).

Needless to say, information to be included in the prediction mode information Pinfo is arbitrary, and information other than these pieces of information may be included.

<Transform Information Tinfo>

The transform information Tinfo includes, for example, the following information. Needless to say, information to be included in the transform information Tinfo is arbitrary, and information other than these pieces of information may be included.

A width size TBWSize and height TBHSize of a processing target transform block (or may be log 2TBWSize or log 2TBHSize, which are logarithmic values with base 2 of TBWSize or TBHSize, respectively). Transform skip flag (ts_flag) is flag information indicating whether or not to skip (inverse) primary transform and (inverse) secondary transform.

Scan identifier (scanIdx)
    Quantization parameter (qp)
    Quantization matrix (scaling_matrix (for example, JCTVC-W1005, 7.3.4 Scaling list data syntax))

<Residual Information Rinfo>

Residual information Rinfo (refer to JCTVC-W1005, 7.3.8.11 Residual Coding syntax, for example) includes, for example, the following syntaxes.
    cbf(coded_block_flag): residual data presence/absence flag
    last_sig_coeff_x_pos: last nonzero coefficient X coordinate
    last_sig_coeff_y_pos: last nonzero coefficient Y coordinate
    coded_sub_block_flag: sub-block nonzero coefficient presence/absence flag
    sig_coeff_flag: nonzero coefficient presence/absence flag
    gr1_flag: flag indicating whether or not level of nonzero coefficient is greater than 1 (also referred to as GR1 flag)
    gr2_flag: flag indicating whether or not level of nonzero coefficient is greater than 2 (also referred to as GR2 flag)
    sign_flag: sign indicating positive/negative of nonzero coefficient (also referred to as sign)
    coeff_abs_level_remaining: residual level of nonzero coefficient (also referred to as nonzero coefficient residual level) or the like.

Needless to say, information to be included in the residual information Rinfo is arbitrary, and information other than these pieces of information may be included.

<Filter information Finfo>

The filter information Finfo includes, for example, each control information regarding filter processing described below.
    Control information regarding deblocking filter (DBF)
    Control information regarding pixel adaptive offset (SAO)
    Control information regarding adaptive loop filter (ALF)
    Control information regarding other linear/non-linear filters More specifically, for example, information for specifying a picture to which each filter is applied and a region in the picture, filter on/off control information in units of CUs, filter on/off control information regarding a boundary of slices or tiles, or the like is included. Needless to say, information to be included in the filter information Finfo is arbitrary, and information other than these pieces of information may be included.

Returning to description of the decoding unit 612, the decoding unit 612 derives quantization coefficients level at each of coefficient positions in each of transform blocks with reference to residual information Rinfo. The decoding unit 612 supplies the quantization coefficients level to the inverse quantization inverse transform unit 613.

Furthermore, the decoding unit 612 supplies the header information Hinfo, prediction mode information Pinfo, transform information Tinfo, and filter information Finfo, which are parsed, to each of the blocks. Specifically, details are as follows.

The header information Hinfo is supplied to the inverse quantization inverse transform unit 613, the prediction unit 618, and the in-loop filter unit 615. The prediction mode information Pinfo is supplied to the inverse quantization inverse transform unit 613 and the prediction unit 618. The transform information Tinfo is supplied to the inverse quantization inverse transform unit 613. Filter information Finfo is supplied to the in-loop filter unit 615.

Needless to say, the above-described example is an example, and not limited to this example. For example, each coding parameter may be supplied to an arbitrary processing unit. Furthermore, other information may be supplied to an arbitrary processing unit.

<Inverse Quantization Inverse Transform Unit>

The inverse quantization inverse transform unit 613 performs processing related to inverse quantization and inverse orthogonal transform. For example, the inverse quantization inverse transform unit 613 acquires processing target coefficient data supplied from the decoding unit 612.

Furthermore, the inverse quantization inverse transform unit 613 can scale (inversely quantize) a value of acquired coefficient data and derive transform coefficients Coeff_IQ. Furthermore, the inverse quantization inverse transform unit 613 can perform inverse coefficient transform such as inverse orthogonal transform, for example, on the transform coefficients Coeff IQ and derive residual data D'. Moreover, the inverse quantization inverse transform unit 613 supplies the residual data D' to the calculation unit 614.

Note that the inverse quantization inverse transform unit 613 can acquire prediction mode information Pinfo or transform information Tinfo supplied from the decoding unit 612 and perform processing such as inverse quantization or inverse coefficient transform on the basis of the information.

<Calculation Unit>

The calculation unit 614 performs processing related to addition of information regarding an image. for example, the calculation unit 614 receives input of residual data D' supplied from the inverse quantization inverse transform unit 613 and predicted images P supplied from the prediction unit 618. The calculation unit 614 adds the residual data to predicted images (predicted signals) corresponding to the residual data, and derives locally decoded images.

The calculation unit 614 supplies the derived locally decoded images to the in-loop filter unit 615 and the frame memory 617.

<In-Loop Filter Unit>

The in-loop filter unit 615 performs processing related to in-loop filter processing. For example, the in-loop filter unit 615 receives input of the locally decoded images supplied from the calculation unit 614 and filter information Finfo supplied from the decoding unit 612. Note that information to be input to the in-loop filter unit 615 is arbitrary, and information other than these pieces of information may be input.

The in-loop filter unit 615 performs filter processing on the locally decoded images as appropriate on the basis of the filter information Finfo. For example, the in-loop filter unit 615 applies four in-loop filters, which are a bilateral filter, a deblocking filter (DeBlocking Filter (DBF)), an adaptive offset filter (Sample Adaptive Offset (SAO)), and an adaptive loop filter (Adaptive Loop Filter (ALF)) in this order. Note that which filters are applied in which order is arbitrary, and can be selected as appropriate.

The in-loop filter unit 615 performs filter processing corresponding to filter processing performed by a coding side (for example, the in-loop filter unit 518 in the image coding device 500). Needless to say, filter processing performed by the in-loop filter unit 615 is arbitrary and is not limited to the above-described example. For example, the in-loop filter unit 615 may apply a wiener filter, or the like.

The in-loop filter unit 615 supplies the filtered locally decoded images to the rearrangement buffer 616 and the frame memory 617.

<Rearrangement Buffer>

The rearrangement buffer 616 receives input of the locally decoded images supplied from the in-loop filter unit 615, and holds (stores) the locally decoded image. The rearrangement buffer 616 reconstructs a decoded images in units of pictures by using the locally decoded images, and holds (stores in a buffer) the reconstructed decoded image. The rearrangement buffer 616 rearranges an order of the obtained decoded images from order of decoding to order of regeneration. The rearrangement buffer 616 outputs a group of the rearranged decoded images to outside of the image decoding device 600 as moving image data.

<Frame Memory>

The frame memory 617 performs processing related to storage of data related to an image. For example, the frame memory 617 receives input of the locally decoded images supplied from the calculation unit 614, reconstructs decoded images in units of pictures, and stores the reconstructed decoded images in a buffer in the frame memory 617.

Furthermore, the frame memory 617 receives input of in-loop filtered, locally decoded images supplied from the in-loop filter unit 615, reconstructs decoded images in units of pictures, and stores the reconstructed decoded images in the buffer in the frame memory 617. The frame memory 617 supplies the stored decoded images (or a part thereof) as reference images to the prediction unit 618 as appropriate.

Note that the frame memory 617 may store header information Hinfo, prediction mode information Pinfo, transform information Tinfo, filter information Finfo, or the like, which is related to generation of decoded images.

<Inverse quantization inverse transform unit>

Figure 34:
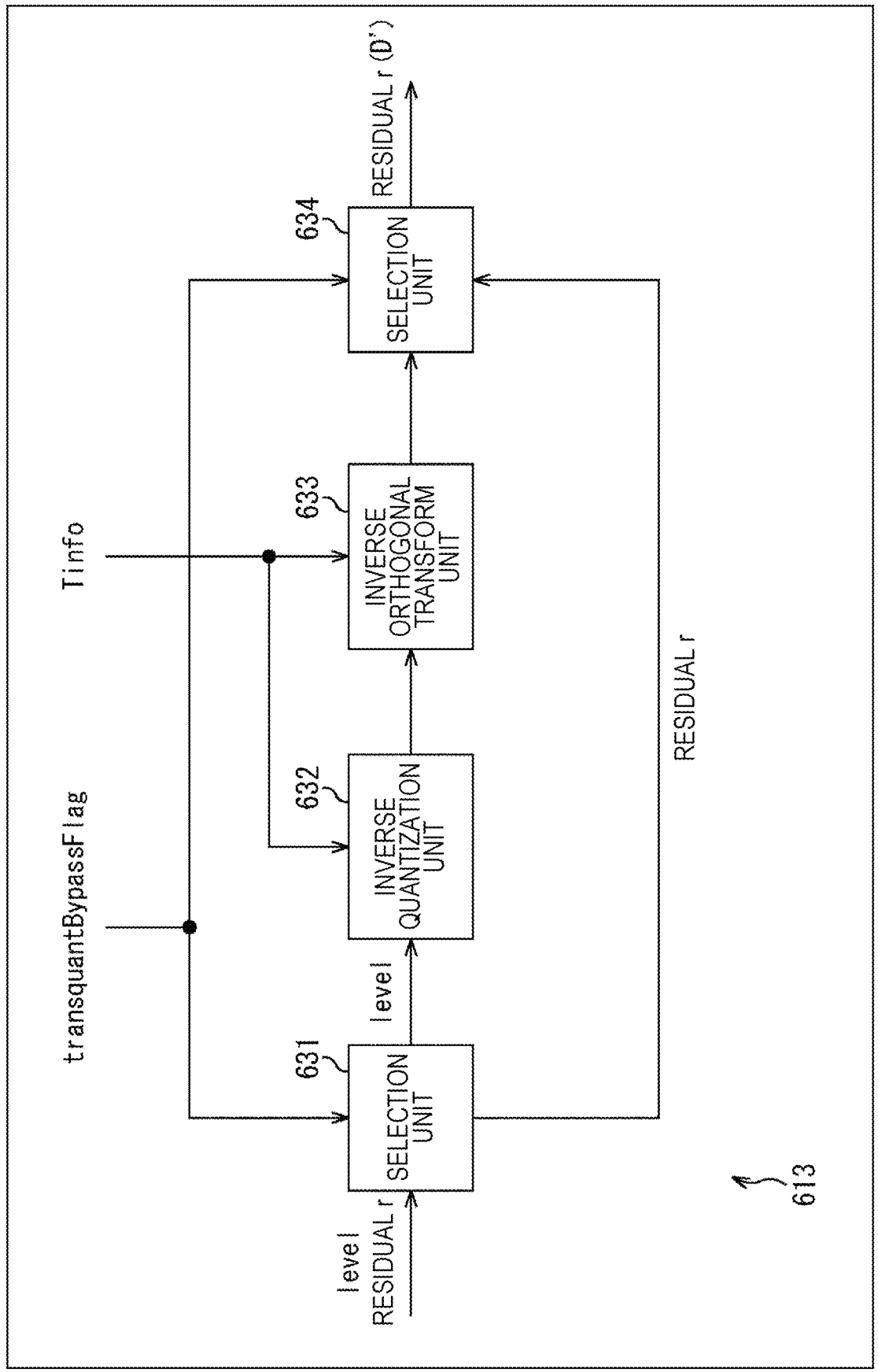
FIG. 34 is a block diagram illustrating a main configuration example of inverse quantization inverse transform unit.

FIG. 34 is a block diagram illustrating a main configuration example of the inverse quantization inverse transform unit 613 in FIG. 33. As illustrated in FIG. 34, the inverse quantization inverse transform unit 613 includes a selection unit 631, an inverse quantization unit 632, an inverse orthogonal transform unit 633, and a selection unit 634.

The inverse quantization unit 632 inversely quantizes quantization coefficients level input via the selection unit 631 to generate transform coefficients. The inverse quantization unit 632 supplies the generated transform coefficients to the inverse orthogonal transform unit 633. The inverse orthogonal transform unit 633 performs inverse orthogonal transform on the transform coefficients to generate residual data r'. The inverse orthogonal transform unit 633 supplies the residual data r' to the selection unit 634.

The selection unit 631 and the selection unit 634 select a supply source or supply destination of coefficient data on the basis of transquantBypassFlag, or the like. For example, in a case where transquantBypassFlag=0, the selection unit 631 supplies quantization coefficients level, which is input to the inverse quantization inverse transform unit 613, to the inverse quantization unit 632. Furthermore, the selection unit 634 acquires the residual data r' supplied from the inverse orthogonal transform unit 633, and supplies the residual data r' to the calculation unit 614.

Furthermore, in a case where transquantBypassFlag=1, the residual data r' is input to the inverse quantization inverse transform unit 613. The selection unit 631 supplies residual data r' to the selection unit 634. Furthermore, the selection unit 634 supplies the residual data r' to the calculation unit 614. That is, inverse quantization/inverse orthogonal transform are skipped.

<Inverse Orthogonal Transform Unit>

Figure 35:
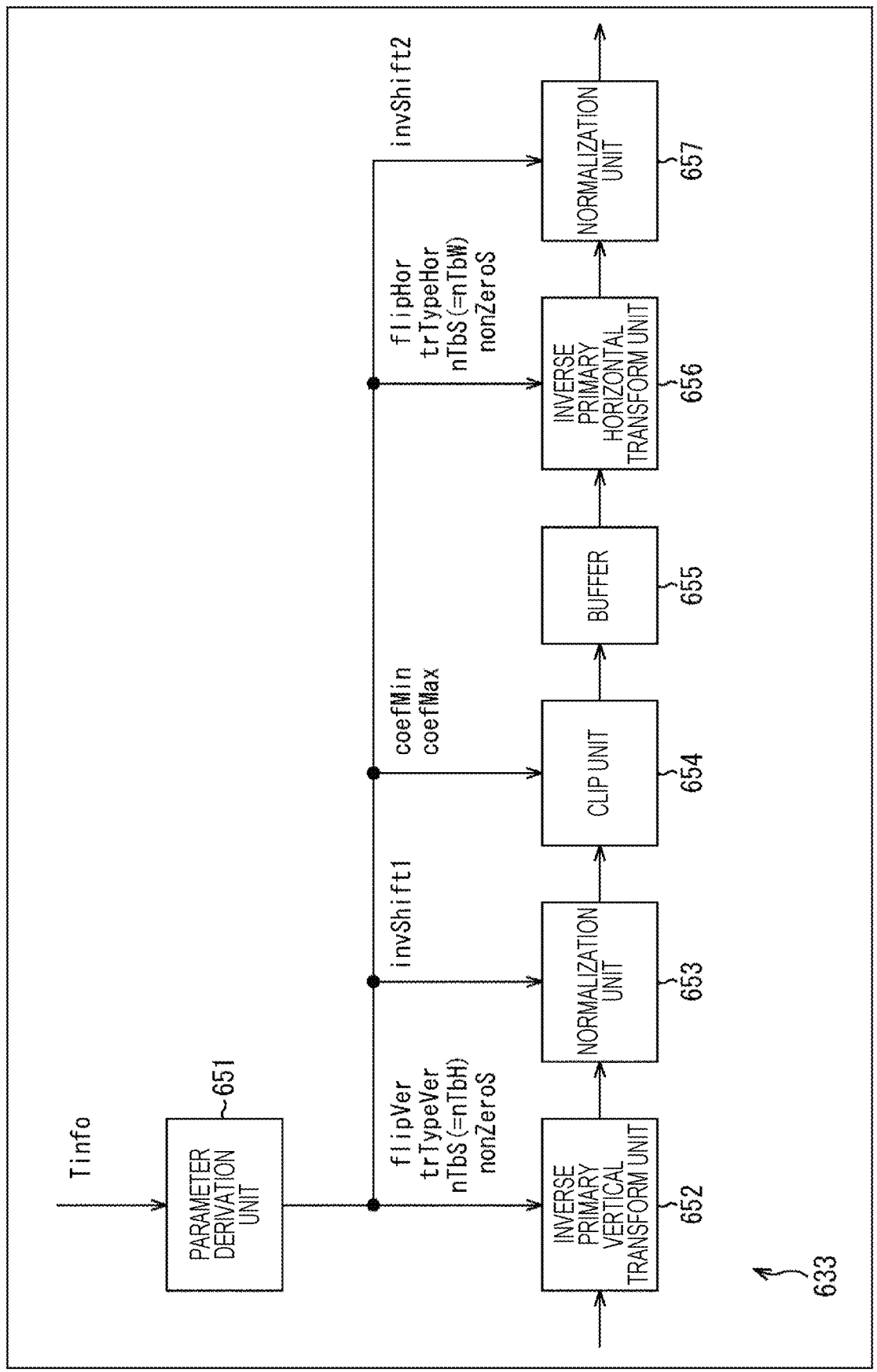
FIG. 35 is a block diagram illustrating a main configuration example of an inverse orthogonal transform unit.

FIG. 35 is a block diagram illustrating a main configuration example of the inverse orthogonal transform unit 633 in FIG. 34. As illustrated in FIG. 35, the inverse orthogonal transform unit 633 includes a parameter derivation unit 651, an inverse primary vertical transform unit 652, a normalization unit 653, a clip unit 654, a buffer 655, an inverse primary horizontal transform unit 656, and a normalization unit 657.

The parameter derivation unit 651 receives input of transform information Tinfo and derives a transform type in each direction (trTypeHor, trTypeVer) and a flip flag (fliPHor, flipVer) in each direction. The parameter derivation unit 651 has a function similar to a function of the parameter derivation unit 551 in the orthogonal transform unit 532. That is, the parameter derivation unit 651 derives various kinds of parameters as similar to the parameter derivation unit 551. The parameter derivation unit 651 may supply a derived parameter to the inverse primary vertical transform unit 652, the normalization unit 653, the clip unit 654, the inverse primary horizontal transform unit 656, and the normalization unit 657.

Note that the parameter derivation unit 651 derives a shift amount invShift1 used for normalization after inverse primary vertical transform, a shift amount invShift2 used after inverse primary horizontal transform or after expansion of transform coefficients while transform skip, and a shift amount invTsShift used for expansion of transform coefficients during transform skip.

The shift amount invShift1 is set to a value on the basis of the parameter trMatShift (=6) representing integer approximation accuracy of a transform matrix, as in the following Mathematical Formula (51), for example.

$$inv\text{Shift1}=tr\text{MatShift}+1 \quad (51)$$

The shift amount invShift2 is set to a value on the basis of a parameter trMatShift (=6) representing integer approximation accuracy of a transform matrix, a parameter dynamicRange (=15) related to a range of transform coefficients, and a bit depth bitDepth as in the following Mathematical Formula (52), for example.

$$inv\text{Shift2}=tr\text{MatShift}+\text{dynamicRange}-1-\text{bitDepth} \quad (52)$$

The shift amount invTsShift is set to a value on the basis of a parameter dynamicRange (=15) related to the range of the transform coefficients, a bit depth bitDepth, and a transform block size (log 2TbW, log 2TbH), as in the following Mathematical Formula (53), for example.

$$inv\text{Ts}\text{Shift}=\text{dynamicRange}-\text{bitDepth}-((\log 2TbW+\log 2TbH)>>1) \quad (53)$$

The inverse primary vertical transform unit 652 performs processing related to inverse primary vertical transform that is inverse one-dimensional transform in a vertical direction. For example, the inverse primary vertical transform unit 652 receives input of a transform coefficients coef', transform information Tinfo, prediction mode information PInfo (not illustrated), or the like, performs inverse primary vertical transform on the transform coefficients coef', and supplies obtained intermediate output signals tmp1 to the normalization unit 653.

The normalization unit 653 performs normalization processing on the intermediate output signals tmp1. For example, the normalization unit 653 receives input of the intermediate output signals tmp1 and the shift amount invShift1, normalizes (scales) the intermediate output signals tmp1 with the shift amount invShift1 as in the following Mathematical Formula (54), and supplies obtained normalized intermediate output signals tmp2 to the clip unit 654.

$$tmp2[y][x]=(tmp1[y][x]+\text{offsetInvShift1})>>\text{InvShift1}$$

$$\text{offsetInvShift1}=1<<(\text{InvShift1}-1)$$

$$(x=0,\ldots,nTbW-1,y=0,\ldots,nTbH-1) \quad (54)$$

The clip unit 654 receives input of the intermediate output signals tmp2 and a minimum value coefMin and maximum value coefMax of transform coefficients, clips a value of the intermediate output signals tmp2 so that the value falls within a range of coefMin to coefMax as in the following Mathematical Formula (55), and supplies obtained clipped intermediate output signals tmp3 to the buffer 655.

$$tmp3=chp3(\text{coefMin},\text{coefMax},tmp2) \quad (55)$$

The buffer 655 temporarily holds the intermediate output signals tmp3 supplied from the clip unit 654, and supplies the intermediate output signal tmp3 to the inverse primary horizontal transform unit 656 at a predetermined timing or the like.

The inverse primary horizontal transform unit 656 performs processing related to inverse primary horizontal transform that is inverse one-dimensional transform in a horizontal direction. For example, the inverse primary horizontal transform unit 656 receives input of intermediate output signals tmp3, transform information Tinfo, prediction mode information PInfo (not illustrated), or the like, performs inverse primary horizontal transform on the intermediate output signals tmp3, and supplies obtained intermediate output signals tmp4 to the normalization unit 657.

The normalization unit 657 performs normalization processing on the intermediate output signals tmp4. For example, the normalization unit 657 receives input of the intermediate output signals tmp4 and the shift amount invShift2, normalizes (scales) the intermediate output signals tmp4 with the shift amount invShift2 as in the following Mathematical Formula (56), and supplies an obtained normalized residual resi' to the selection unit 634.

$$resi'[y][x]=(tmp4[y][x]+\text{offsetInvShift2})>>\text{invShift2}$$

$$\text{offsetInvShift2}=1<<(\text{invShift2}-1)$$

$$(x=0,\ldots,nTbW-1,y=0,\ldots,nTbH-1) \quad (56)$$

In such an inverse orthogonal transform unit 633, the above-described inverse one-dimensional orthogonal transform device 150 or inverse one-dimensional orthogonal transform device 250 may be applied as the inverse primary vertical transform unit 652. With this arrangement, the inverse orthogonal transform unit 633 (that is, the image decoding device 600) can perform inverse one-dimensional orthogonal transform processing in inverse primary vertical transform as described in the first embodiment or second embodiment, and can obtain an effect described in the first embodiment or second embodiment. Therefore, the image decoding device 600 can reduce an increase in processing delay in inverse orthogonal transform processing.

Similarly, in such an inverse orthogonal transform unit 633, the above-described inverse one-dimensional orthogonal transform device 150 or inverse one-dimensional orthogonal transform device 250 may be applied as the inverse primary horizontal transform unit 656. With this arrangement, the inverse orthogonal transform unit 633 (that is, the image decoding device 600) can perform inverse one-dimensional orthogonal transform processing in inverse primary horizontal transform as described in the first embodiment or second embodiment, and can obtain an effect described in the first embodiment or second embodiment. Therefore, the image decoding device 600 can reduce an increase in processing delay in inverse orthogonal transform processing.

Needless to say, the above-described inverse one-dimensional orthogonal transform device 150 or inverse one-dimensional orthogonal transform device 250 may be applied to both the inverse primary vertical transform unit 652 and the inverse primary horizontal transform unit 656.

Furthermore, in such an inverse orthogonal transform unit 633, the above-described parameter derivation device 300 may be applied as the parameter derivation unit 651. With this arrangement, the inverse orthogonal transform unit 633 (that is, the image decoding device 600) can derive various kinds of parameters as described in the third embodiment, and can obtain an effect described in the third embodiment. Therefore, the image decoding device 600 can reduce an increase in processing delay in inverse orthogonal transform processing. Furthermore, the image decoding device 600 can incorporate a one-dimensional transform skip (IDT) into a framework of adaptive orthogonal transform (MTS).

<Flow of Image Decoding Processing>

Next, a flow of each processing executed by the image decoding device 600 of the configuration as described above will be described. First, an example of a flow of image decoding processing will be described with reference to a flowchart in FIG. 36.

In step S601, when image decoding processing is started, the accumulation buffer 611 acquires and holds (accumulates) a bit stream (coded data) supplied from outside of the image decoding device 600.

In step S602, the decoding unit 612 extracts and decodes the coded data from the bit stream to obtain coefficient data (quantization coefficients level or residual data r'). Furthermore, with the decoding, the decoding unit 612 parses (analyzes and acquires) various kinds of coding parameters from the bit stream.

In step S603, the inverse quantization inverse transform unit 613 performs inverse quantization inverse transform processing to generate residual data r(D'). The inverse quantization inverse transform processing will be described later.

In step S604, the prediction unit 618 executes prediction processing with a prediction method specified by the coding side on the basis of information parsed in step S602 to generate predicted images P with reference to reference images stored in the frame memory 617, or the like.

In step S605, the calculation unit 614 adds the residual data D' obtained in step S603 to the predicted images P obtained in step S604, and derives locally decoded images Rlocal.

In step S606, the in-loop filter unit 615 performs in-loop filter processing on the locally decoded images Rlocal obtained by the processing in step S605.

In step S607, the rearrangement buffer 616 derives decoded images R by using the filtered locally decoded images Rlocal obtained by the processing in step S606, and rearranges an order of a group of the obtained decoded images R from order of decoding to order of regeneration. The group of the decoded images R rearranged in order of regeneration is output as moving images to outside of the image decoding device 600.

Furthermore, in step S608, the frame memory 617 stores at least either of the locally decoded images Rlocal obtained by the processing in step S605 or the filtered locally decoded images Rlocal obtained by the processing in step S606.

When the processing in step S608 ends, the image decoding processing ends.

<Flow of Inverse Quantization Inverse Transform Processing>

Next, an example of a flow of the inverse quantization inverse transform processing executed in step S603 in FIG. 36 will be described with reference to a flowchart in FIG. 37.

In step S631, when inverse quantization inverse transform processing is started, the selection unit 631 and the selection unit 634 decide whether or not to perform transform quantization bypassing. In a case where it is decided that transform quantization bypassing is not to be performed (that is, in a case where transquantBypassFlag==0), the processing proceeds to step S632. In this case, the selection unit 631 supplies the quantization coefficients level to the inverse quantization unit 632.

In step S632, the inverse quantization unit 632 performs inverse quantization on the quantization coefficients level acquired via the selection unit 631 to generate transform coefficients or residual data r'. The inverse quantization unit 632 supplies the transform coefficients or the residual data r to the inverse orthogonal transform unit 633.

In step S633, the inverse orthogonal transform unit 633 performs inverse orthogonal transform on the transform coefficients to generate residual data r. The inverse orthogonal transform unit 633 supplies the residual data r to the selection unit 634. Furthermore, the selection unit 634 supplies the residual data r to the calculation unit 614.

Figure 36:
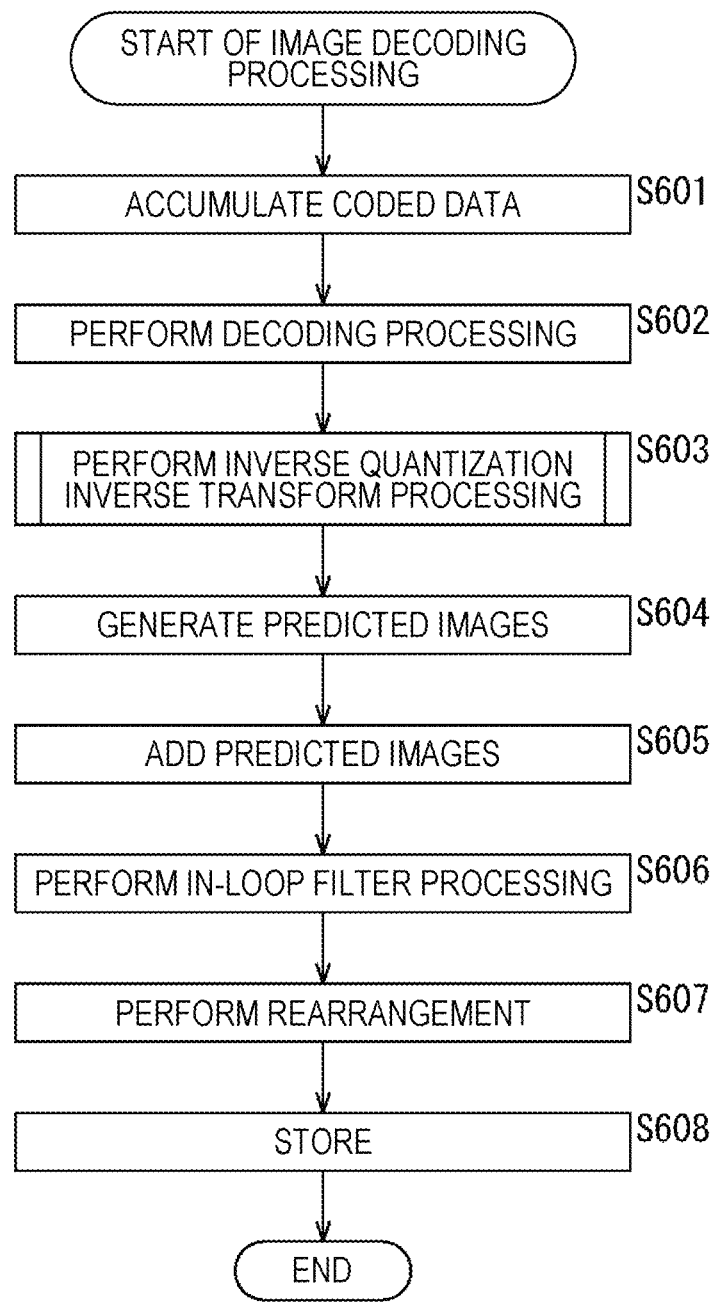
FIG. 36 is a flowchart illustrating an example of a flow of image decoding processing.
Figure 37:
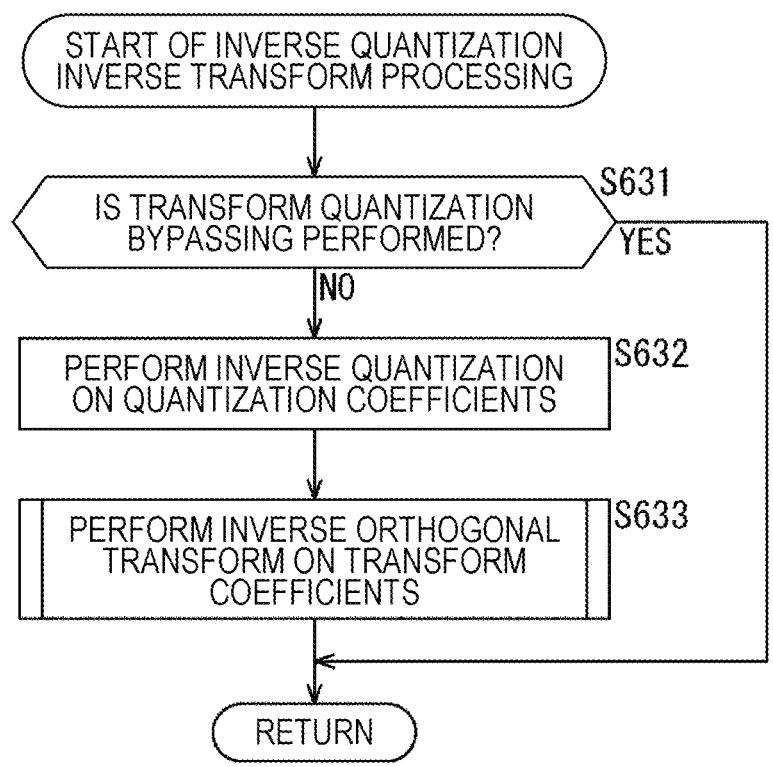
FIG. 37 is a flowchart illustrating an example of a flow of inverse quantization inverse transform processing.

When the processing in step S633 ends, the inverse quantization inverse transform processing ends, and the processing returns to FIG. 36.

Furthermore, in a case where it is decided in step S631 that transform quantization bypassing is to be performed (that is, in a case where transquantBypassFlag==1), the inverse quantization inverse transform processing ends, and the processing returns to FIG. 36.

<Flow of Inverse Orthogonal Transform Processing>

Figure 38:
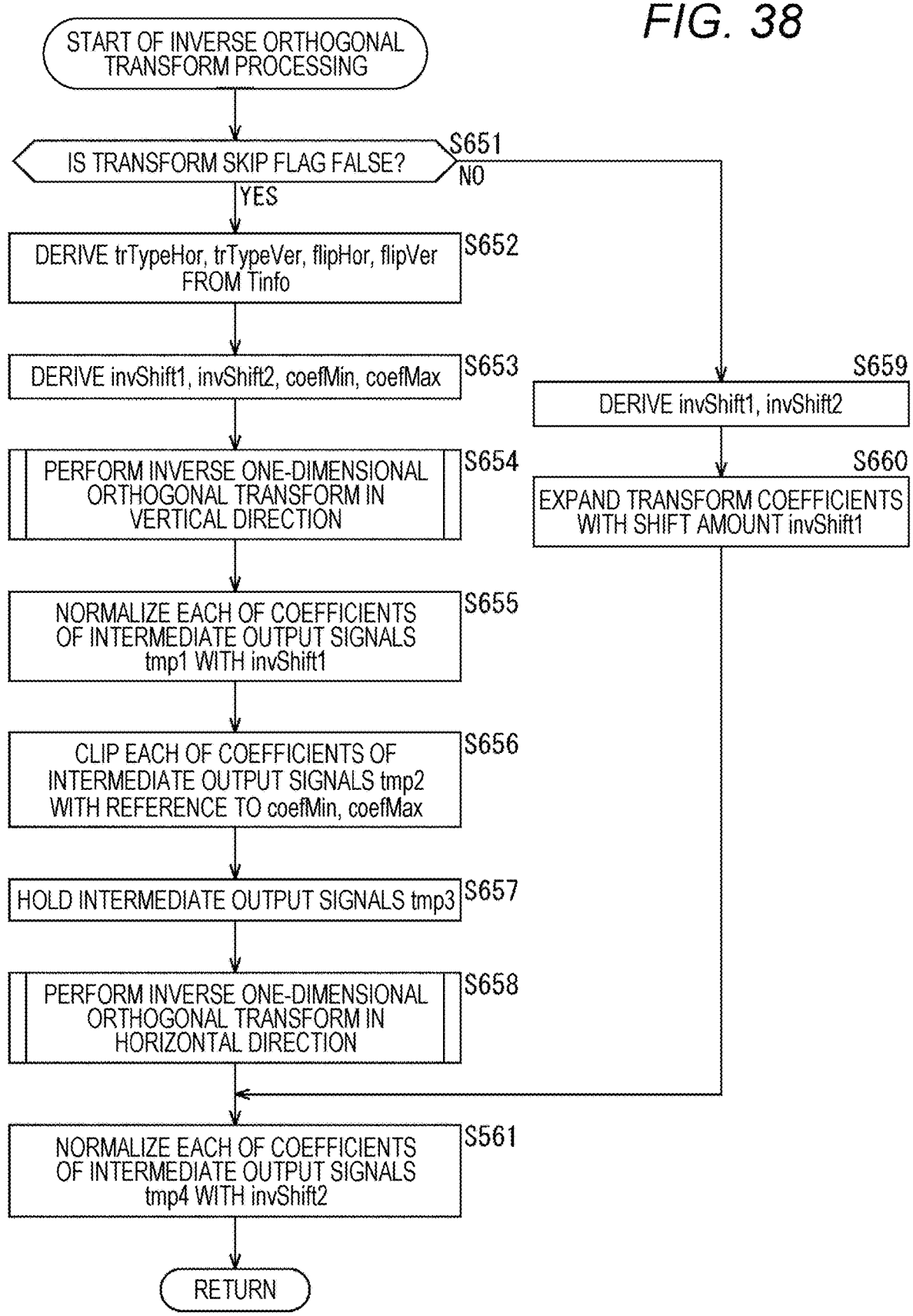
FIG. 38 is a flowchart illustrating an example of a flow of inverse orthogonal transform processing.

Next, an example of a flow of the inverse orthogonal transform processing executed in step S633 in FIG. 37 will be described with reference to a flowchart in FIG. 38.

In step S651, when inverse orthogonal transform processing is started, the parameter derivation unit 651 decides whether or not a transform skip flag (transform_skip_flag) is false. In a case where it is decided that the transform skip flag is false (=0), the processing proceeds to step S652.

In step S652, from the transform information Tinfo, the parameter derivation unit 651 derives a modified transform type in each direction (trTypeHor', trTypeVer') and a flip flag (flipHor, flipVer) in each direction.

In step S653, the parameter derivation unit 651 derives a shift amount in each direction (invShift1, invShift2) and thresholds of clip processing (coefMin, coefMax).

In step S654, the inverse primary vertical transform unit 652 sets a one-dimensional signal array of the transform coefficients coef' in the vertical direction coef[n][x] (n=0, . . . , nTbH−1) as input signals x[n] (n=0, . . . , nTbH−1), performs inverse one-dimensional orthogonal transform in the vertical direction on x[n], and derives the intermediate output signals tmp1 [n][x] (n=0, . . . , nTbH−1) (x=0, . . . , nTbW−1).

In step S655, the normalization unit 653 normalizes each of coefficients (x=0, . . . , nTbW−1, y=0, . . . , nTbH−1) of the intermediate output signals tmp1[y][x] with the shift amount InvShift1 as in the above-described Mathematical Formula (54), and derives the intermediate output signals tmp2.

In step S656, the clip unit 654 clips each of coefficients (x=0, . . . , nTbW−1, y=0, . . . , nTbH−1) of the intermediate output signals tmp2[y][x] with reference to coefMin, coefMax as in the above-described Mathematical Formula (55), and derives the intermediate output signals tmp3. In step S657, the buffer 655 holds the intermediate output signals tmp2.

In step S658, the inverse primary horizontal transform unit 656 reads the intermediate output signals tmp3 from the buffer 655, sets a one-dimensional output sequence of the intermediate output signals tmp3 in the horizontal direction tmp3[y][n] (n=0, . . . , nTbW−1) as input signals x[n] (n=0, . . . , nTbW−1), performs inverse one-dimensional orthogonal transform in the horizontal direction on x[n], and derives intermediate output signals tmp4[y][n] (n=0, . . . , nTbW−1) (y=0, . . . , nTbH−1).

When the processing in S658 ends, the processing proceeds to step S661.

Furthermore, in a case where it is decided in step S651 that the transform skip flag is true, the processing proceeds to step S659.

In step S659, the parameter derivation unit 651 derives a shift amount at two-dimensional transform skip (invTsShift, invShift2). In this case, the processing by the inverse primary vertical transform unit 652 and the inverse primary horizontal transform unit 656 is skipped.

That is, the normalization unit 653 and the normalization unit 657 perform processing.

In step S660, the normalization unit 653 expands the transform coefficients coef′[y][x] with the shift amount invTsShift as in the following Mathematical Formula (57), and outputs the result as intermediate output signals tmp4[y][x]. When the processing in step S661 ends, the processing proceeds to step S661.

$$tmp4[y][x]=\text{coef}'[y][x]<<\text{invTsShift} \qquad (57)$$

In step S661, the normalization unit 657 normalizes each of coefficients of the intermediate output signals tmp4[y][x] with the shift amount invShift2 as in the above-described Mathematical Formula (56), and outputs the result as a residual resi′ [y][x]. When the processing in step S661 ends, the inverse orthogonal transform processing ends, and the processing returns to FIG. 37.

Figure 9:
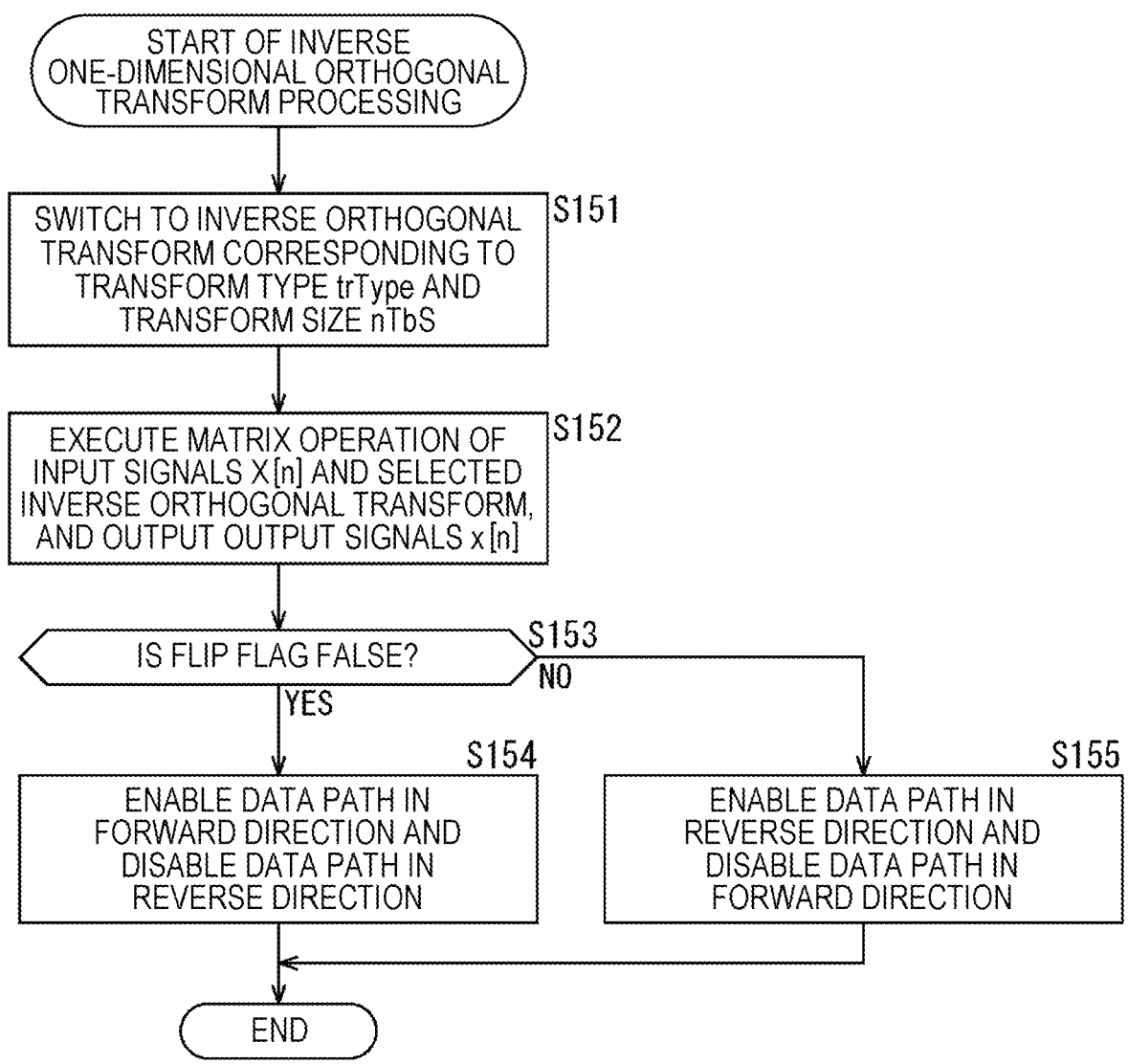
FIG. 9 is a flowchart describing an example of a flow of inverse one-dimensional orthogonal transform processing.
Figure 17:
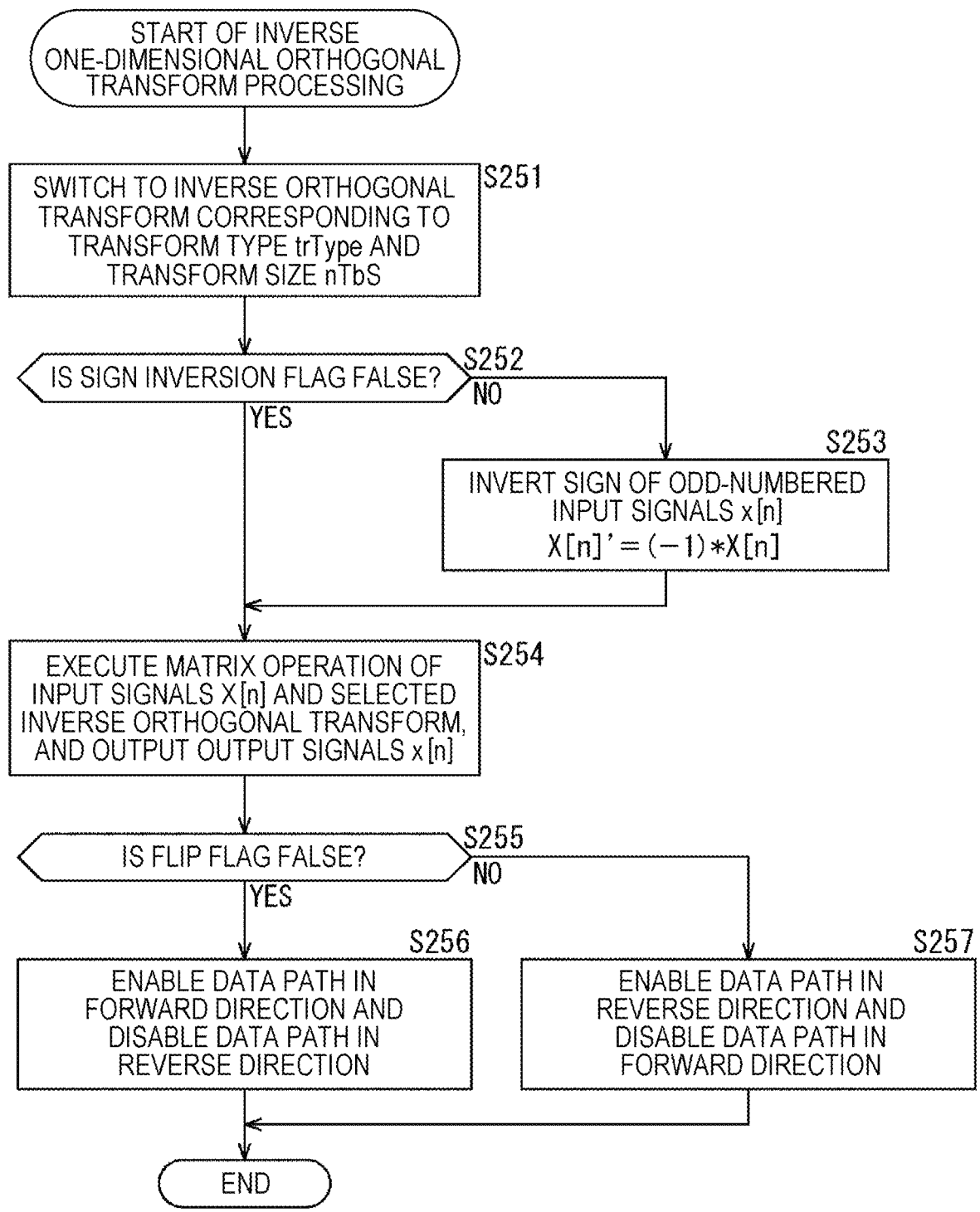
FIG. 17 is a flowchart describing an example of a flow of inverse one-dimensional orthogonal transform processing.

In the inverse orthogonal transform processing as described above, for example, the inverse one-dimensional orthogonal transform processing illustrated in FIG. 9 or the inverse one-dimensional orthogonal transform processing illustrated in FIG. 17 may be applied as inverse one-dimensional orthogonal transform processing in the vertical direction performed in step S654. With this arrangement, the inverse orthogonal transform unit 633 (that is, the image decoding device 600) can obtain, on inverse primary vertical transform, an effect described in the first embodiment or in the second embodiment. Therefore, the image decoding device 600 can reduce an increase in processing delay in inverse orthogonal transform processing.

Furthermore, the inverse one-dimensional orthogonal transform processing illustrated in FIG. 9 or the inverse one-dimensional orthogonal transform processing illustrated in FIG. 17 may be applied as inverse one-dimensional orthogonal transform processing in the horizontal direction performed in step S658. With this arrangement, the inverse orthogonal transform unit 633 (that is, the image decoding device 600) can obtain, on inverse primary horizontal transform, an effect described in the first embodiment or in the second embodiment.

Therefore, the image decoding device 600 can reduce an increase in processing delay in inverse orthogonal transform processing.

Furthermore, the parameter derivation processing illustrated in FIG. 21 may be applied as the parameter derivation processing performed in step S652. With this arrangement, the inverse orthogonal transform unit 633 (that is, the image decoding device 600) can obtain, on inverse primary vertical transform and on inverse primary horizontal transform, an effect described in the third embodiment. Therefore, the image decoding device 600 can reduce an increase in processing delay in inverse orthogonal transform processing.

7. Supplementary Note

<Computer>

The above-described series of processing can be executed by hardware or can be executed by software. In a case where a series of processing is executed by software, a program included in the software is installed on a computer. Here, examples of the computer include a computer incorporated in dedicated hardware, and a general-purpose personal computer, or the like, which is capable of executing various kinds of functions by installing various kinds of programs.

Figure 39:
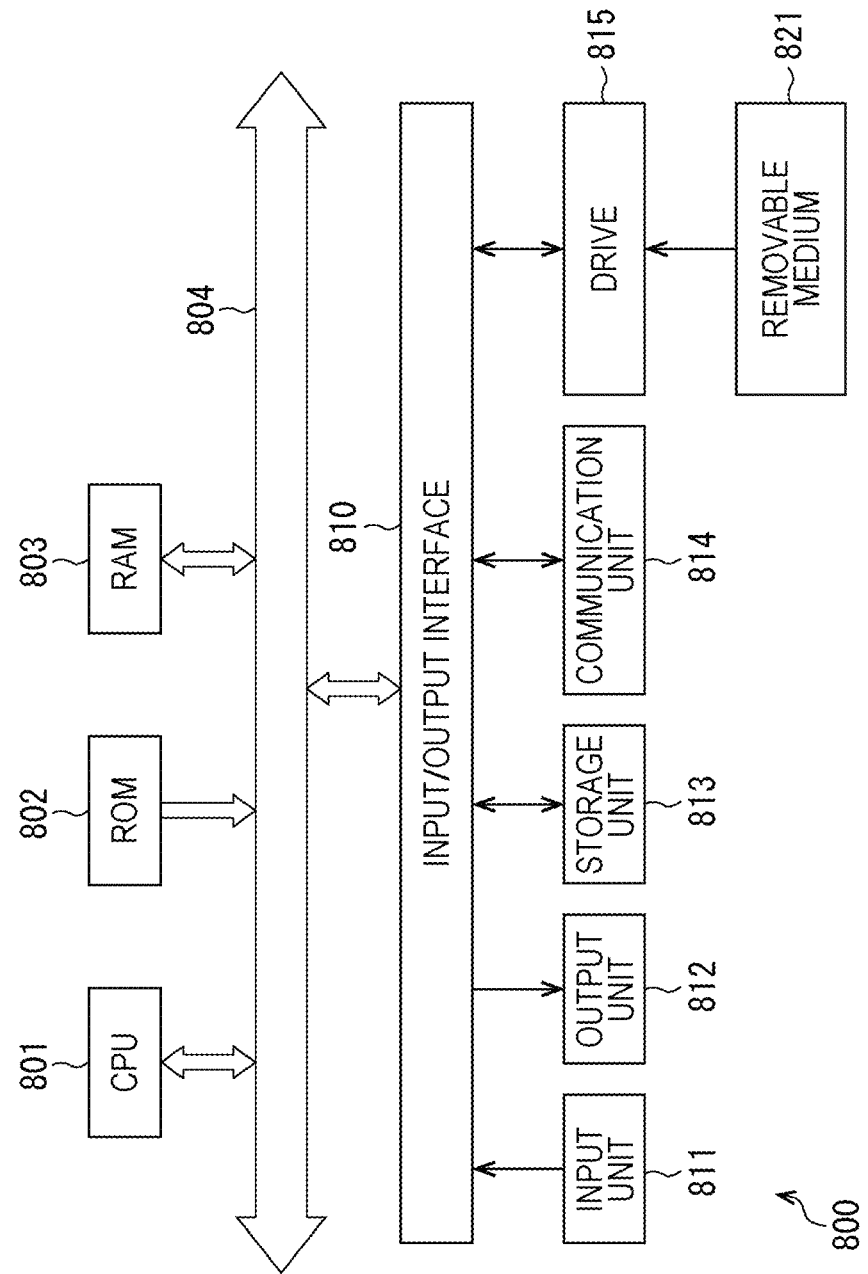
FIG. 39 is a block diagram illustrating a main configuration example of a computer.

FIG. 39 is a block diagram illustrating a configuration example of hardware of a computer that executes the above-described series of processing with a program.

In a computer 800 illustrated in FIG. 39, a central processing unit (CPU) 801, a read only memory (ROM) 802, and a random access memory (RAN) 803 are mutually connected via a bus 804.

Furthermore, an input/output interface 810 is connected to the bus 804. An input unit 811, an output unit 812, a storage unit 813, a communication unit 814, and a drive 815 are connected to the input/output interface 810.

The input unit 811 includes, for example, a keyboard, a mouse, a microphone, a touch panel, an input terminal, or the like. The output unit 812 includes a display, a speaker, an output terminal, or the like, for example. The storage unit 813 includes, for example, a hard disk, a RAM disk, a non-volatile memory, or the like. The communication unit 814 includes, for example, a network interface. The drive 815 drives a removable medium 821 such as a magnetic disk, an optical disk, a magneto-optical disk, or a semiconductor memory.

In a computer configured as above, the series of processing described above is performed by the CPU 801 loading, for example, a program stored in the storage unit 813 to the RAM 803 via the input/output interface 810 and the bus 804 and executing the program. As appropriate, the RAM 803 also stores data necessary for the CPU 801 to execute various kinds of processing.

A program executed by the computer can be applied by being recorded on the removable medium 821 as a package medium, or the like, for example. In this case, the program can be installed on the storage unit 813 via the input/output interface 810 by attaching the removable medium 821 to the drive 815.

Furthermore, the program can also be provided via a wired or wireless transmission medium such as a local area network, the Internet, or digital satellite broadcasting. In this case, the program can be received by the communication unit 814 and installed on the storage unit 813.

In addition, the program can be installed on the ROM 802 or the storage unit 813 in advance.

<Unit of information/processing>

Units of data in which various kinds of information described above are set and units of data for various kinds of processing are arbitrary, and are not limited to the above-described examples. For example, these pieces of information and processing may be set for each transform unit (TU), transform block (TB), prediction unit (PU), prediction block (PB), coding unit (CU), largest coding unit (LCU), sub-block, block, tile, slice, picture, sequence, or component, or may be set for data in these units of data. Needless to say, these units of data may be set for each piece of information or processing, and the units of data of all pieces of information and processing are not required to be unified. Note that a storage location of these pieces of information is arbitrary, and may be stored in a header, parameter set, or the like of the units of data described above. Furthermore, these pieces of information may be stored in a plurality of places.

<Control Information>

The control information regarding the present technology described in each of the above embodiments may be transmitted from the coding side to the decoding side. For example, control information (for example, enabled_flag) for controlling whether or not to permit (or prohibit) application of the above-described present technology may be transmitted. Furthermore, for example, control information (for example, present_flag) indicating an object to which the above-described present technology is applied (or an object to which the present technology is not applied) may be transmitted. For example, control information specifying a block size (upper limit or lower limit or both), frame, component, layer, or the like to which the present technology is applied (or permit or prohibit the application) may be transmitted.

<Object to which Present Technology is Applied>

The present technology may be applied to an arbitrary image coding/decoding method. That is, in so far as there is no conflict with the above-described present technology, specifications of various kinds of processing related to image coding/decoding such as transform (inverse transform), quantization (inverse quantization), coding (decoding), and prediction are arbitrary, and are not limited to the examples described above. Furthermore, in so far as there is no conflict with the above-described present technology, part of the processing may be omitted.

Furthermore, the present technology can be applied to a multi-view image coding/decoding system that codes/decodes a multi-view image including images of a plurality of viewpoints (views). In this case, the present technology is only required to be applied to coding/decoding of each viewpoint (view).

Furthermore, the present technology can be applied to a hierarchical image coding (scalable coding)/decoding system that codes/decodes a hierarchical image layered (hierarchized) so as to have a scalability function for a predetermined parameter. In this case, the present technology is only required to be applied to coding/decoding of each layer (layer).

Furthermore, although there has been described above the one-dimensional orthogonal transform device 100, the inverse one-dimensional orthogonal transform device 150, the one-dimensional orthogonal transform device 200, the inverse one-dimensional orthogonal transform device 250, the parameter derivation device 300, the image coding device 500, and the image decoding device 600 as application examples of the present technology, the present technology may be applied to an arbitrary configuration.

For example, the present technology may be applied to various electronic apparatuses such as a transmitter or receiver (for example, a television receiver or a mobile phone) for satellite broadcasting, wired broadcasting such as cable television, distribution on the Internet, or distribution to a terminal by cellular communication, a device (for example, a hard disk recorder or a camera) that records an image on a medium such as an optical disk, a magnetic disk, or a flash memory, or regenerates an image from the storage medium, or the like.

Furthermore, for example, the present technology can also be implemented as a partial configuration of a device, such as a processor (for example, a video processor) as a system large scale integration (LSI) or the like, a module (for example, a video module) using a plurality of processors or the like, a unit (for example, a video unit) using a plurality of modules or the like, or a set (for example, a video set) obtained by further adding another function to the unit.

Furthermore, for example, the present technology can also be applied to a network system including a plurality of devices. For example, the present technology may be implemented as cloud computing in which the present technology is shared and processed jointly by a plurality of devices via a network. For example, the present technology may be implemented in cloud service that provides a service related to an image (moving image) to an arbitrary terminal such as a computer, an audio visual (AV) apparatus, a portable information processing terminal, or Internet of Things (IoT) device.

Note that, in the present specification, the system means a set of a plurality of components (devices, modules (parts), or the like) without regard to whether or not all the components are in the same housing. Therefore, a plurality of devices housed in separate housings and connected via a network, and one device storing a plurality of modules in one housing are both systems.

<Field/Application to which Present Technology is Applicable>

A system, device, processing unit, or the like to which the present technology is applied may be utilized in an arbitrary field such as traffic, medical care, crime prevention, agriculture, stockbreeding, mining, beauty, factory, home appliance, weather, or nature monitoring, for example. Furthermore, application thereof is also arbitrary.

For example, the present technology can be applied to a system or a device provided for providing content for appreciation or the like. Furthermore, for example, the present technology can also be applied to a system or device provided for traffic, such as traffic condition monitoring or autonomous driving control. Moreover, for example, the present technology can also be applied to a system or a device provided for security. Furthermore, for example, the present technology can be applied to a system or a device provided for automatic control of a machine or the like Moreover, for example, the present technology can also be applied to a system or a device provided for agriculture or stockbreeding. Furthermore, for example, the present technology can also be applied to a system or a device that monitors a state of nature, such as a volcano, forest, or oceans, wildlife, or the like. Moreover, for example, the present technology can also be applied to a system or a device provided for sports.

<Other>

Note that, in the present specification, "flag" is information for identifying a plurality of states, and includes not only information used for identifying two states of true (1) and false (0) but also information capable of identifying three or more states. Therefore, a value used for the "flag" may be, for example, a binary of I/O or a ternary or more. That is, the number of bits included in the "flag" is arbitrary, and may be one bit or a plurality of bits. Furthermore, regarding identification information (including the flag), not only a case where the identification information is included in a bit stream, there may be a case where differential information of certain reference information from the identification information is included in the bit stream, and therefore, "flag" or "identification information" in the present specification includes not only the information, but also differential information of certain reference information.

Furthermore, various kinds of information (metadata or the like) related to coded data (bit stream) may be transmitted or recorded in any form as long as the information is associated with the coded data. Here, the term "associate" means, for example, that, when one datum, is processed, another datum may be utilized (may be linked). That is, data associated with each other may be collected as one data or may be separate data. For example, information associated with coded data (image) may be transmitted on a transmission path different from a transmission line of the coded data (image). Furthermore, for example, information associated with coded data (image) may be recorded on a recording medium different from (or the same as) a recording medium of the coded data (image). Note that the "association" may be applied to a part of data instead of the entire data. For example, an image and information corresponding to the image may be associated with each other in arbitrary units such as in units of a plurality of frames, one frame, or a part in a frame.

Note that, in the present specification, terms such as "combine", "multiplex", "add", "integrate", "include", "store", "contain", "put in", or "insert" mean to collect a plurality of items into one, for example, to collect coded datum and meta datum into one datum, and mean one method for the above-described "association".

Furthermore, embodiments of the present technology are not limited to the above-described embodiments, and various changes can be made without departing from the scope of the present technology.

For example, a configuration described as one device (or processing unit) may be divided and configured as a plurality of devices (or processing units). To the contrary, the configurations described above as a plurality of devices (or processing units) may be collectively configured as one device (or processing unit). Furthermore, needless to say, a configuration other than the configurations described above may be added to a configuration of each device (or each processing unit). Moreover, if a configuration and operation of an entire system are substantially the same, a part of a configuration of a certain device (or processing unit) may be included in a configuration of another device (or another processing unit).

Furthermore, for example, the above-described programs may be executed in an arbitrary device. In that case, the device is only required to have a necessary function (function block, or the like) so that necessary information can be obtained.

Furthermore, for example, each step in one flowchart may be executed by one device, or may be executed by being shared by a plurality of devices. Moreover, in a case where a plurality of pieces of processing is included in one step, the plurality of pieces of processing may be executed by one device, or may be executed by being shared by a plurality of devices. In other words, a plurality of pieces of processing included in one step can be executed as a plurality of steps. To the contrary, pieces of processing described as a plurality of steps can be collectively executed as one step.

Furthermore, for example, a program executed by the computer may be a program in which processing of steps describing the program is executed in time series in an order described in the present specification, or a program in which the processing may be executed in parallel, or separately at a necessary timing such as when a call is made. That is, unless there is a contradiction, the processing of each step may be executed in an order different from the order described above. Moreover, the processing of steps describing the program may be executed in parallel with processing of another program, or may be executed in combination with processing of another program.

Furthermore, for example, a plurality of techniques related to the present technology can be implemented independently as a single piece unless there is a contradiction. Needless to say, a plurality of arbitrary pieces of the present technology can be used in combination. For example, a part or all of the present technology described in any of the embodiments can be implemented in combination with a part or all of the present technology described in another embodiment. Furthermore, an arbitrary part or all of the present technology described above can be implemented in combination with another technology not described above.

Note that the present technology can have the following configurations.

(1) An image processing device including
 a selection unit that switches a data path of a one-dimensional input signal array of residual data in a forward direction or a reverse direction, and
 a matrix operation unit that performs matrix operation of one-dimensional orthogonal transform on the one-dimensional input signal array input via the data path switched by the selection unit.

(2) The image processing device according to (1),
 in which the matrix operation unit performs the matrix operation of one-dimensional orthogonal transform corresponding to a transform type, a transform size, and an enabled region size.

(3) The image processing device according to (2),
 in which the matrix operation unit performs the matrix operation of one-dimensional orthogonal transform corresponding to DCT-2 or the matrix operation of one-dimensional orthogonal transform corresponding to DST-7.

(4) The image processing device according to (2) or (3),
 in which the matrix operation unit performs matrix operation of one-dimensional identity transform.

(5) The image processing device according to any one of (1) to (4), further including
 a transform type derivation unit that derives a transform type on the basis of information regarding orthogonal transform,
 in which the matrix operation unit performs the matrix operation of one-dimensional orthogonal transform of the transform type derived by the transform type derivation unit.

(6) The image processing device according to (5), further including
 a flag derivation unit that derives flag information that controls switching of the selection unit on the basis of the information regarding orthogonal transform,
 in which the selection unit switches the data path on the basis of the flag information.

(7) The image processing device according to (6),
in which the flag derivation unit derives the flag information of a value that causes the data path to switch in a forward direction in a case where two-dimensional orthogonal transform is not skipped, and
the selection unit switches the data path in the forward direction on the basis of the flag information.
(8) The image processing device according to any one of (1) to (7), further including
a sign inversion unit that inverts a sign of an odd-numbered signal with respect to the one-dimensional input signal array on which the matrix operation of one-dimensional orthogonal transform is performed by the matrix operation unit.
(9) The image processing device according to any one of (1) to (8),
in which the selection unit and the matrix operation unit perform switching of the data path and the matrix operation of one-dimensional orthogonal transform on an input signal array in each of a horizontal direction and a vertical direction.
(10) The image processing device according to (9), further including
a normalization unit that normalizes the one-dimensional input signal array on which the matrix operation of one-dimensional orthogonal transform is performed in the horizontal direction by the matrix operation unit, and normalizes the one-dimensional input signal array on which the matrix operation of one-dimensional orthogonal transform is performed in the vertical direction by the matrix operation unit.
(11) The image processing device according to (10), further including
a quantization unit that quantizes a transform coefficient that includes the input signal array on which, in each of the horizontal direction and the vertical direction, the matrix operation of one-dimensional orthogonal transform is performed by the matrix operation unit and the normalization is performed by the normalization unit, and that derives a quantization coefficient.
(12) The image processing device according to (11), further including
a coding unit that codes the quantization coefficient derived by the quantization unit.
(13) An image processing method including
switching a data path of a one-dimensional input signal array of residual data in a forward direction or a reverse direction, and
performing matrix operation of one-dimensional orthogonal transform on the one-dimensional input signal array input via the switched data path.
(14) An image processing device including
a matrix operation unit that performs matrix operation of inverse one-dimensional orthogonal transform on a one-dimensional input signal array of a transform coefficient, and
a selection unit that switches, in a forward direction or in a reverse direction, a data path of the one-dimensional input signal array on which the matrix operation of inverse one-dimensional orthogonal transform is performed by the matrix operation unit.
(15) The image processing device according to (14),
in which the matrix operation unit performs the matrix operation of inverse one-dimensional orthogonal transform corresponding to a transform type, a transform size, and an enabled region size.
(16) The image processing device according to (15),
in which the matrix operation unit performs the matrix operation of inverse one-dimensional orthogonal transform corresponding to $DCT\text{-}2^{-1}$ or the matrix operation of inverse one-dimensional orthogonal transform corresponding to $DST\text{-}7^{-1}$.
(17) The image processing device according to (15) or (16),
in which the matrix operation unit performs matrix operation of one-dimensional identity transform.
(18) The image processing device according to any one of (14) to (17), further including
a sign inversion unit that inverts a sign of an odd-numbered signal with respect to the one-dimensional input signal array,
in which the matrix operation unit performs the matrix operation of inverse one-dimensional orthogonal transform on the one-dimensional input signal array in which a sign of the odd-numbered signal is inverted by the sign inversion unit.
(19) The image processing device according to any one of (14) to (18), further including
a decoding unit that decodes coded data and derives the transform coefficient,
in which the matrix operation unit performs the matrix operation of inverse one-dimensional orthogonal transform on the one-dimensional input signal array of the transform coefficient derived by the decoding unit.
(20) An image processing method including
performing matrix operation of inverse one-dimensional orthogonal transform on a one-dimensional input signal array of a transform coefficient, and
switching, in a forward direction or in a reverse direction, a data path of the one-dimensional input signal array on which the matrix operation of inverse one-dimensional orthogonal transform is performed.

REFERENCE SIGNS LIST

100 One-dimensional orthogonal transform device
101 Selector
102 Matrix operation unit
150 Inverse one-dimensional orthogonal transform device
151 Matrix operation unit
152 Selector
200 One-dimensional orthogonal transform device
201 Selector
202 Matrix operation unit
203 Sign inversion unit
250 Inverse one-dimensional orthogonal transform device
251 Sign inversion unit
252 Matrix operation unit
253 Selector
300 Parameter derivation device
301 Transform type derivation unit
302 Modified transform type derivation unit
303 Flip flag derivation unit
500 Image coding device
513 Transform quantization unit
514 Coding unit
516 Inverse quantization inverse transform unit
532 Orthogonal transform unit
551 Parameter derivation unit
552 Primary horizontal transform unit
553 Normalization unit
554 Buffer
555 Primary vertical transform unit
556 Normalization unit 600 Image decoding device
612 Decoding unit
613 Inverse quantization inverse transform unit
633 Inverse orthogonal transform unit
651 Parameter derivation unit
652 Inverse primary vertical transform unit
653 Normalization unit
654 Clip unit
655 Buffer
656 Inverse primary horizontal transform unit
657 Normalization unit

The invention claimed is:

1. An image processing device comprising:
control circuitry that;
receives an input comprising a flip flag and a one-dimensional input signal array of residual data:
performs a matrix operation of a one-dimensional orthogonal transform on the one-dimensional input signal array, the matrix operation comprising inverse one-dimensional orthogonal transform processing:
determines whether the flip flag is set to true or false;
upon determining that the flip flag is set to false, performs a first operation comprising:
enabling a forward data path,
disabling a reverse data path,
outputting a result of the matrix operation in accordance with the forward data path, and
upon determining that the flip flag is set to true, performs a second operation comprising:
disabling the forward data path,
enabling the reverse data path, and
outputting a result of the matrix operation in accordance with the reverse data path.

2. The image processing device according to claim 1, wherein the control circuitry:
prior to determining whether the flip flag is set to true or false, determines transform parameters of the one-dimensional orthogonal transform that includes each of a transform type, a transform size, and an enabled region size, and
performs the matrix operation of the one-dimensional orthogonal transform in accordance with the transform parameters.

3. The image processing device according to claim 2, wherein the transform parameters indicate that the one-dimensional orthogonal transform comprises one of:
a type 2 Discrete Cosine Transform (DCT-2),
an inverse DCT-2,
a type 7 Discrete Trigonometric Sine Transform (DST-7), or
an inverse DST-7.

4. The image processing device according to claim 2, wherein the transform parameters indicate that the transform comprises a one-dimensional identity transform.

5. The image processing device according to claim 2, wherein the transform parameters indicate that the transform comprises one of the one-dimensional orthogonal transform or an inverse of the one-dimensional orthogonal transform.

6. The image processing device according to claim 2, wherein
the transform type is one of an inverse transform type or a non-inverse transform type, and
based on transform type being the non-inverse transform type, the one-dimensional orthogonal transform performed by the control circuitry is a non-inverse transform.

7. The image processing device according to claim 2, wherein
the transform parameters further comprise a transform skip flag,
the control circuitry performs the respective first or second operation only when the transform skip flag is set to false.

8. The image processing device according to claim 2, wherein
the transform parameters further include a sign inversion flag, and
the control circuitry performs one of a third operation or a fourth operation,
wherein, in the third operation:
after performing the first operation or the second operation, the control circuitry determines whether the sign inversion flag is set to true or false,
based on the sign inversion flag being set to true, the control circuitry inverts a sign of an odd-numbered of output signals from the respective first or second operation, and
based on the sign inversion flag being set to false, the control circuitry does not invert the sign of the odd-numbered output signals from the respective first or second operation, and
wherein, in the fourth operation:
before performing the first operation or the second operation, the control circuitry determines whether the sign inversion flag is set to true or false,
based on the sign inversion flag being set to true, the control circuitry inverts a sign of an odd-numbered of output signals input to the respective first or second operation, and
based on the sign inversion flag being set to false, the control circuitry does not invert the sign of the odd-numbered output signals input to the respective first or second operation.

9. The image processing device according to claim 2, wherein
the transform parameters further include information indicating whether the one-dimensional orthogonal transform comprises each of a horizontal transform and a vertical transform,
the forward data path comprises a forward horizontal data path and a forward vertical data path, and
the reverse data path comprises a reverse horizontal data path and a reverse vertical data path.

10. The image processing device according to claim 9, wherein the control circuitry normalizes the one-dimensional input signal array on which the matrix operation of the one-dimensional orthogonal transform is performed in the respective forward or reverse horizontal data path, and normalizes the one-dimensional input signal array on which the matrix operation of the one-dimensional orthogonal transform is performed in the respective forward or reverse vertical data path.

11. The image processing device according to claim 10, wherein the control circuitry:
quantizes a transform coefficient that includes the input signal array on which, in each of the respective forward or reverse horizontal data path and the respective forward or reverse vertical data path, the matrix operation of the one-dimensional orthogonal transform is performed and the normalization is performed, and
derives a quantization coefficient.

12. The image processing device according to claim 11, wherein the control circuitry codes the derived quantization coefficient.

13. An image processing method performed by an image processing device, the method comprising:
- receiving an input comprising a flip flag and a one-dimensional input signal array of residual data;
- performing a matrix operation of a one-dimensional orthogonal transform on the one-dimensional input signal array, the matrix operation comprising inverse one-dimensional orthogonal transform processing;
- determining whether the flip flag is set to true or false;
- upon determining that the flip flag is set to false, performing a first operation comprising:
  - enabling a forward data path,
  - disabling a reverse data path,
  - outputting a result of the matrix operation in accordance with the forward data path, and
- upon determining that the flip flag is set to true, performing a second operation comprising:
  - disabling the forward data path,
  - enabling the reverse data path, and
  - outputting a result of the matrix operation in accordance with the reverse data path.

\* \* \* \* \*